United States Patent
Rusanovskyy et al.

(10) Patent No.: US 9,930,363 B2
(45) Date of Patent: Mar. 27, 2018

(54) HARMONIZED INTER-VIEW AND VIEW SYNTHESIS PREDICTION FOR 3D VIDEO CODING

(71) Applicant: Nokia Technologies Oy, Espoo (FI)

(72) Inventors: Dmytro Rusanovskyy, Lempäälä (FI); Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 111 days.

(21) Appl. No.: 14/247,108

(22) Filed: Apr. 7, 2014

(65) Prior Publication Data
US 2014/0314147 A1 Oct. 23, 2014

Related U.S. Application Data

(60) Provisional application No. 61/811,240, filed on Apr. 12, 2013.

(51) Int. Cl.
| | | |
|---|---|---|
| *H04N 19/597* | (2014.01) | |
| *H04N 19/517* | (2014.01) | |
| *H04N 19/503* | (2014.01) | |
| *H04N 19/467* | (2014.01) | |
| *H04N 19/33* | (2014.01) | |

(52) U.S. Cl.
CPC .......... *H04N 19/597* (2014.11); *H04N 19/33* (2014.11); *H04N 19/467* (2014.11); *H04N 19/503* (2014.11); *H04N 19/517* (2014.11)

(58) Field of Classification Search
None
See application file for complete search history.

(56) References Cited

U.S. PATENT DOCUMENTS

| | | | | |
|---|---|---|---|---|
| 9,503,702 | B2* | 11/2016 | Chen | H04N 13/0048 |
| 2008/0198924 | A1* | 8/2008 | Ho | H04N 19/597 |
| | | | | 375/240.01 |
| 2009/0296811 | A1* | 12/2009 | Jeon | H04N 19/597 |
| | | | | 375/240.12 |

(Continued)

FOREIGN PATENT DOCUMENTS

| | | |
|---|---|---|
| KR | 20090006095 A | 1/2009 |
| KR | 20100014552 A | 2/2010 |

(Continued)

OTHER PUBLICATIONS

"3DV-CE1.a: Block-based View Synthesis Prediction for 3DV-ATM", Joint Collaborative Team on 3D Video Coding Extension Development of ITU-T SG 16 WP 3 and ISO/IEC JTC 1/SC 29/WG 11, JCT2-A0107, 1st Meeting, Jul. 16-20, 2012, pp. 1-5.

(Continued)

*Primary Examiner* — Mohammad J Rahman
(74) *Attorney, Agent, or Firm* — Alston & Bird LLP

(57) ABSTRACT

There are disclosed various methods, apparatuses and computer program products for video encoding. The type of prediction used for a reference picture index may be signaled in the video bit-stream. The omission of motion vectors from the video bit-stream for a certain image element may also be signaled; signaling may indicate to the decoder that motion vectors used in prediction are to be construed at the decoder. The construction of motion vectors may take place by using disparity information that has been obtained from depth information of the picture being used as a reference.

16 Claims, 12 Drawing Sheets

(56) References Cited

U.S. PATENT DOCUMENTS

| | | | | |
|---|---|---|---|---|
| 2009/0310676 A1* | 12/2009 | Yang | ............... | H04N 19/597 375/240.12 |
| 2010/0046619 A1* | 2/2010 | Koo | ............... | H04N 19/597 375/240.12 |
| 2010/0091845 A1* | 4/2010 | Jeon | ............... | H04N 19/597 375/240.12 |
| 2010/0098157 A1 | 4/2010 | Yang | | |
| 2012/0269270 A1 | 10/2012 | Chen et al. | | |
| 2013/0003850 A1* | 1/2013 | Sugio | ............... | H04N 19/105 375/240.16 |
| 2013/0195188 A1* | 8/2013 | Sugio | ............... | H04N 19/00721 375/240.14 |
| 2014/0176674 A1* | 6/2014 | Kang | ............... | H04N 19/597 348/43 |
| 2014/0185686 A1* | 7/2014 | Wu | ............... | H04N 19/00684 375/240.16 |
| 2014/0192157 A1* | 7/2014 | Chen | ............... | H04N 19/597 348/44 |
| 2014/0241434 A1* | 8/2014 | Lin | ............... | H04N 19/597 375/240.16 |

FOREIGN PATENT DOCUMENTS

| | | |
|---|---|---|
| WO | 2013/030456 A1 | 3/2013 |
| WO | 2013/032512 A1 | 3/2013 |
| WO | WO 2013/030458 | 3/2013 |
| WO | WO 2013053309 A1 * | 4/2013 ........... H04N 19/597 |
| WO | 2013/159330 A1 | 10/2013 |

OTHER PUBLICATIONS

"3D-CE1.a: Generalized View Synthesis Prediction (GVSP) Mode", Joint Collaborative Team on 3D Video Coding Extension Development of ITU-T SG 16 WP 3 and ISO/IEC JTC 1/SC 29/WG 11, JCT2-A0103, Jul. 16-20, 2012, pp. 1-6.

"CE1.h: Backward View Synthesis Prediction using Neighbouring Blocks", Joint Collaborative Team on 3D Video Coding Extension Development of ITU-T SG 16 WP 3 and ISO/IEC JTC 1/SC 29/WG 11, JCT3V-C0152, Jan. 17-23, 2013, pp. 1-5.

International Search Report and Written Opinion received for corresponding Patent Cooperation Treaty Application No. PCT/FI2014/050249, dated Jun. 19, 2014, 15 pages.

Chen et al., "Overview of the MVC + D 3D Video Coding Standard", Journal of Visual Communication and Image Representation, vol. 25, Issue 04, May, 2014, pp. 679-688.

Canadian Office Action for corresponding Canadian Patent Application No. 2,909,309 dated Dec. 22, 2016.

Korean Office Action for corresponding Korean Patent Application No. 10-2015-7032246 dated Jan. 4, 2017, with English translation, 5 pages.

Korean Office Action for corresponding Korean Patent Application No. 10-2015-7032246 dated Jul. 14, 2016, with English translation, 7 pages.

Korean Office Action for corresponding Korean Patent Application No. 9-5-2016-050888350 dated Jul. 14, 2016, 4 pages.

Extended European Search Report for corresponding European Application No. 14783105.1 dated Sep. 14, 2016, 10 pages.

Hannuksela, M. et al., *3DV-ATM EHP high-level syntax: reference picture list modification*, ISO/IEC JTC1/SC29/WG11 MPEG2012/M24890, May 2012, 4 pages.

Su, W. et al., *CE1.a related: Harmonization of inter-view and view synthesis prediction in 3D-AVC*, Joint Collaborative Team on 3D Video Coding Extensions of ITU-T SG 16 WP 3 and ISO/IEC JTC 1/SC 29/WG 11, JCTV3-D0162, 4th Meeting, Apr. 2013, 5 pages.

Office Action for Canadian Application No. 2,909,309 dated Nov. 2, 2017, 4 pages.

* cited by examiner

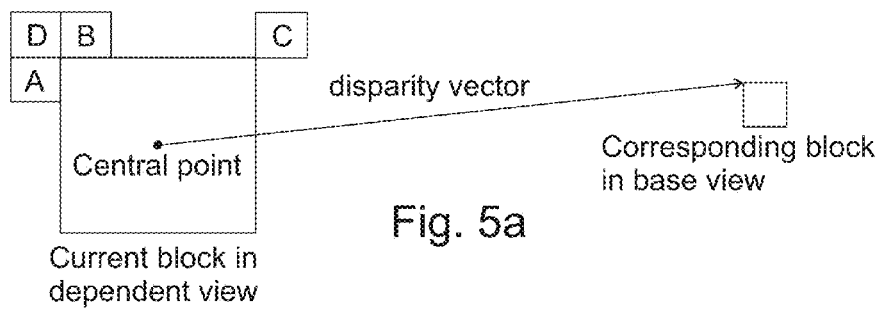
Fig. 5a
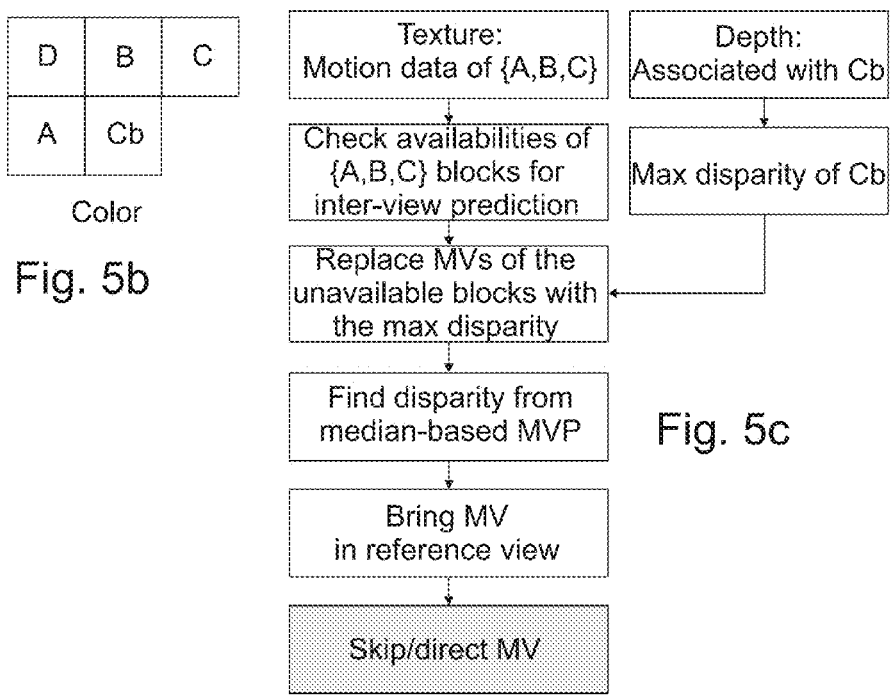
Fig. 5b
Fig. 5c

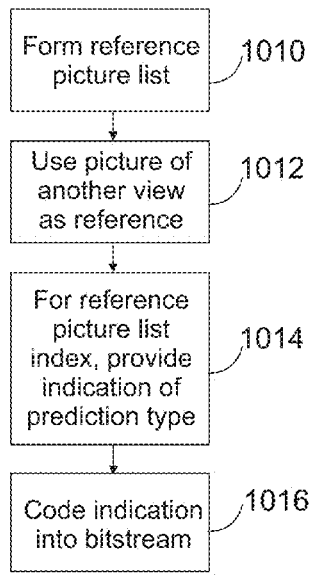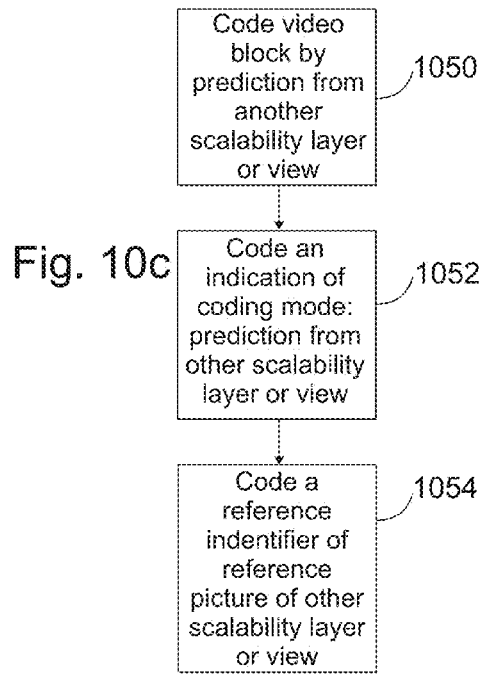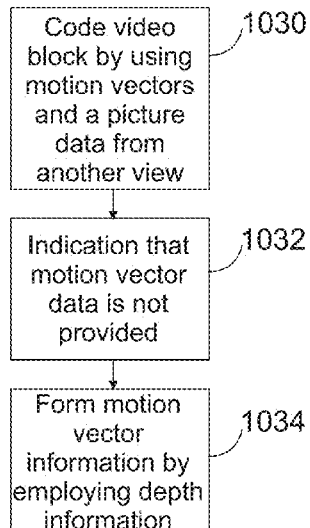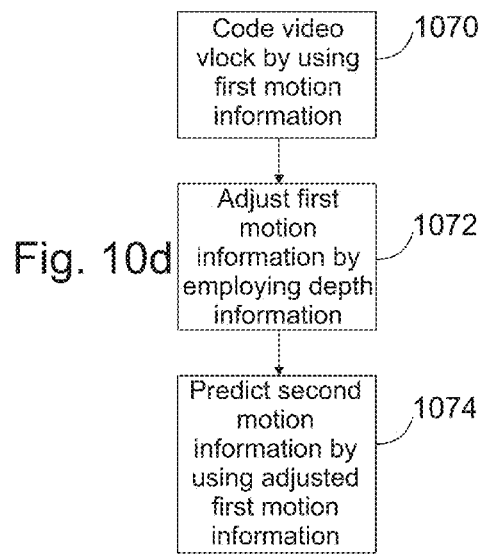
Fig. 10a
Fig. 10b
Fig. 10c
Fig. 10d

HARMONIZED INTER-VIEW AND VIEW SYNTHESIS PREDICTION FOR 3D VIDEO CODING

TECHNICAL FIELD

The various embodiments described in this application relate to depth-enhanced video coding and the use of view synthesis prediction therein. In different aspects, methods, apparatuses, systems and computer program products for depth-enhanced video coding are described, as well as a signal or data structure for depth-enhanced video coding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Modern video codecs utilize various prediction schemes to reduce the amount of redundant information that needs to be stored or sent from the encoder to the decoder. Prediction can be done across time (temporally) such that an earlier pictures are used as reference pictures. In multi-view video coding, prediction can also take place (spatially) by using a picture of another view as a reference picture, or by using a synthesized picture formed by view synthesis as a reference picture. Prediction generally takes place so that picture information (such as pixel values) for a block in the reference picture is used for predicting picture information in the current picture, that is, forming a predicted block. So-called motion vectors may be employed in the prediction, and they indicate the source of picture information in the reference picture for the current block being predicted. The reference pictures to be used are kept in memory, and reference picture lists are used to manage the use of the reference pictures.

The various different types of prediction schemes make it technically more complicated to design encoders and decoders, and they may pose challenges to the speed of the encoding and decoding, or require more memory than simpler arrangements. Yet, at the same time, the different types of prediction schemes aim at lowering the required bandwidth for 3D video coding transmissions. There is, therefore, a need for developing new video coding arrangements for 3D video.

SUMMARY

Some embodiments provide a method for encoding and decoding video information, as well as the corresponding apparatuses and a signal produced by the encoding and usable for the decoding. The encoding or encoder may produce an element into the signal, and a corresponding decoding step or decoder element may be used to decode the element. Therefore, it needs to be understood that even though examples are given for one entity only, say, the encoder, the corresponding decoder structure, and the signal element and its purpose may be deduced from the example. Various aspects of examples of the invention are provided in the detailed description.

According to a first aspect, there are provided encoding methods according to claims 1 to 5. According to a second aspect, there are provided decoding methods according to claims 6 to 10. According to a third aspect, there are provided encoders according to claims 11 to 14. According to a fourth aspect, there are provided decoders according to claims 16 to 19. According to a fifth aspect, there are provided computer program products according to claims 15 and 20.

BRIEF DESCRIPTION OF THE DRAWINGS

For a more complete understanding of example embodiments of the present invention, reference is now made to the following descriptions taken in connection with the accompanying drawings in which:

FIG. 5a illustrates a naming convention utilized in neighboring blocks based disparity derivation according to an embodiment;

FIGS. 5b and 5c show disparity vector derivation procedure for Skip/Direct motion vector prediction according to an embodiment;

FIGS. 10a, 10b, 10c and 10d show flowcharts of video coding according to one or more embodiments;

DETAILED DESCRIPTION OF SOME EXAMPLE EMBODIMENTS

Figure 1A:
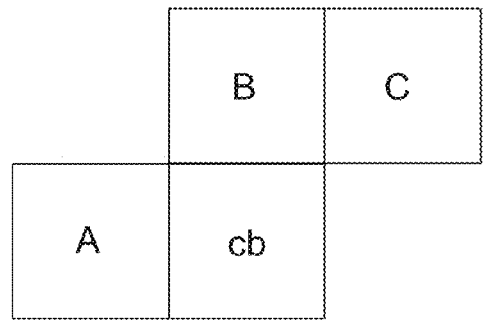
FIGS. 1a and 1b illustrate the use of spatial (a) and temporal (b) neighborhood for motion vector prediction of the currently coded macroblock (cb) according to an embodiment.

Some definitions, bitstream and coding structures, and concepts of the Advanced Video Coding standard (H.264/AVC) and the High Efficiency Video Coding standard (H.265/HEVC) are described in this section as an example of a video encoder, decoder, encoding method, decoding method, and a bitstream structure. The invention is not limited to H.264/AVC or H.265/HEVC, but rather the description is given for one possible basis on top of which the invention may be partly or fully realized. In the following some examples will be provided. The examples should not be understood as limiting the scope of the claims but rather to provide a description for making and using the invention. Combinations of the features of different examples can be performed, or the features of individual examples can be used alone.

When describing H.264/AVC and HEVC as well as in example embodiments, common notation for arithmetic operators, logical operators, relational operators, bit-wise operators, assignment operators, and range notation e.g. as specified in H.264/AVC or HEVC may be used. Furthermore, common mathematical functions e.g. as specified in H.264/AVC or HEVC may be used and a common order of precedence and execution order (from left to right or from right to left) of operators e.g. as specified in H.264/AVC or HEVC may be used.

When describing H.264/AVC and HEVC as well as in example embodiments, the following descriptors may be used to specify the parsing process of each syntax element.

b(8): byte having any pattern of bit string (8 bits).

se(v): signed integer Exp-Golomb-coded syntax element with the left bit first.

u(n): unsigned integer using n bits. When n is "v" in the syntax table, the number of bits varies in a manner dependent on the value of other syntax elements. The parsing process for this descriptor is specified by n next bits from the bitstream interpreted as a binary representation of an unsigned integer with the most significant bit written first.

ue(v): unsigned integer Exp-Golomb-coded syntax element with the left bit first.

ae(v): context-adaptive arithmetic entropy-coded syntax element.

te(v): truncated Exp-Golomb-coded syntax element with left bit first.

An Exp-Golomb bit string may be converted to a code number (codeNum) for example using the following table:

| Bit string | codeNum |
|---|---|
| 1 | 0 |
| 010 | 1 |
| 011 | 2 |
| 00100 | 3 |
| 00101 | 4 |
| 00110 | 5 |
| 00111 | 6 |
| 0001000 | 7 |
| 0001001 | 8 |
| 0001010 | 9 |
| ... | ... |

A code number corresponding to an Exp-Golomb bit string may be converted to se(v) for example using the following table:

| codeNum | syntax element value |
|---|---|
| 0 | 0 |
| 1 | 1 |
| 2 | −1 |
| 3 | 2 |
| 4 | −2 |
| 5 | 3 |
| 6 | −3 |
| ... | ... |

When describing H.264/AVC and HEVC as well as in example embodiments, syntax structures, semantics of syntax elements, and decoding process may be specified as follows. Syntax elements in the bitstream are represented in bold type. Each syntax element is described by its name (all lower case letters with underscore characters), optionally its one or two syntax categories, and one or two descriptors for its method of coded representation. The decoding process behaves according to the value of the syntax element and to the values of previously decoded syntax elements. When a value of a syntax element is used in the syntax tables or the text, it appears in regular (i.e., not bold) type. In some cases the syntax tables may use the values of other variables derived from syntax elements values. Such variables appear in the syntax tables, or text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the context in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

When describing H.264/AVC and HEVC as well as in example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

LIST OF ABBREVIATIONS AND ACRONYMS

In the following, some abbreviations and acronyms used in the description are explained H.264/AVC—Advanced Video Coding, a video coding standard MVC—Multiview Video Coding. a coding standard HEVC—High Efficiency Video Coding, video coding technology under development by the JCT-VC group 3DV—Three-Dimensional Video DIBR—depth-image-based rendering MCP—motion compensated prediction MVP—motion vector prediction or motion vector predictor
VSP—view synthesis prediction (view synthesis is implemented in loop)
MVD—multiview video+depth
MVC-VSP—MVC with view synthesis prediction in the coding loop
3DV-ATM—reference software and/or codec description for AVC-compatible 3D video standard development Video Coding Concepts Video codec may comprise an encoding entity (encoder) that compresses input data into a representation suited for storage/transmission and decoding entity (decoder) that performs inverse operations. In the description below, a codec may refer to an encoder or a decoder or both to an encoder and a decoder.

Data compression may be achieved by employing spatial, temporal and statistical redundancies inherited in multidimensional data such as video. Typically, significant compression efficiency of state-of-the-art codecs is achieved by lossy coding which compromises the fidelity of video representation with the bitrate.

Most of the state-of-the-art coding standards, such as ITU-T H.261, H.263, H.264 and H.265 are built at the same hybrid video coding concept and utilize following elements:

1) Picture-Level Processing 2D video is coded as a sequence of pictures with a clearly specified and repetitive procedure. 2D pictures can be coded with different coding modes, such as intra coding, and/or be predicted from earlier coded picture(s).

2) Block Processing

Each of the 2D pictures is coded as a sequence of non-overlapped blocks of video samples. The size of processing block can typically be selected by an encoder and/or may be constrained by a coding standard to facilitate more efficient coding and implementation, e.g. 4×4 blocks are used in motion partitions of H.264/AVC and e.g. 64×64 blocks may be utilized as Coding Unit (CU) in H.265 design. Each block is processed mostly independently, although codecs may utilize redundancies inherited from different blocks of video data. Non-limiting example of tools utilizing such redundancy are Motion Compensated Prediction (MCP) and Motion vector prediction (MVP).

In some video codecs, a picture may comprise an array of luma samples, when a monochrome format is in use, or an array of luma samples and two corresponding arrays of chroma samples. In a case that a picture comprises three sample arrays, the picture may in some cases be coded as separate color planes, where each sample array may be coded similarly to a monochrome picture.

In some video codecs a coding tree unit (CTU) comprises a coding tree block of luma samples and two corresponding coding tree blocks of chroma samples of a picture that has three sample arrays. A CTU comprises a coding tree block of samples of a monochrome picture or a picture that is coded using three separate color planes. and syntax structures used to code the samples. A coding tree block (CTB) is an N×N block of samples for some value of N such that the division of a component into coding tree blocks is a partitioning. A partitioning may be defined as a division of a set into subsets such that each element of the set is in exactly one of the subsets.

In some video codecs a coding unit is a coding block of luma samples and two corresponding coding blocks of chroma samples of a picture that has three sample arrays, or a coding block of samples of a monochrome picture or a picture that is coded using three separate color planes. A coding block is an N×N block of samples for some value of N such that the division of a coding tree block into coding blocks is a partitioning.

In some video codecs a prediction unit is a prediction block of luma samples and two corresponding prediction blocks of chroma samples of a picture that has three sample arrays, or a prediction block of samples of a monochrome picture or a picture that is coded using three separate color planes. A prediction block may be defined as a rectangular M×N block of samples on which the same prediction is applied.

In some video codecs a transform unit comprises one or more transform blocks of luma samples and corresponding transform blocks of chroma samples of a picture that has three sample arrays, or one or more transform blocks of luma samples of a monochrome picture or a picture that is coded using three separate color planes. The available block sizes and number of luma sample blocks for a transform unit may be constrained for example by a coding standard. For example, in H.265 a transform unit is a transform block of luma samples of size 8×8, 16×16, or 32×32 or four transform blocks of luma samples of size 4×4, two corresponding transform blocks of chroma samples of a picture that has three sample arrays, or a transform block of luma samples of size 8×8, 16×16, or 32×32 or four transform blocks of luma samples of size 4×4 of a monochrome picture or a picture that is coded using three separate color planes.

In some video codecs it may be considered that pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size is typically named as CTU (coding tree unit) and a picture may be divided into non-overlapping CTUs. A CTU can be further split into a combination of smaller CUs, e.g. by recursively splitting the CTU and resultant CUs. Each resulting CU typically has at least one PU and at least one TU associated with it. A CU may be partitioned into one or more PUs and TUs in order to obtain finer granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the said TU (including e.g. DCT coefficient information). It is typically signaled at CU level whether prediction error coding is applied or not for each CU. In the case there is no prediction error residual associated with the CU, it can be considered there are no TUs for the said CU. The division of the picture into CUs, and division of CUs into PUs and TUs is typically signaled in the bitstream allowing the decoder to reproduce the intended structure of these units.

In some video codecs a macroblock may be defined as a 16×16 block of luma samples and two corresponding blocks of chroma samples of a picture that has three sample arrays, or a 16×16 block of samples of a monochrome picture or a picture that is coded using three separate color planes. A picture may be considered to be partitioned into macroblocks covering the area of the picture.

In some video codecs a macroblock partition may be defined as a block of luma samples and two corresponding blocks of chroma samples resulting from a partitioning of a macroblock for inter prediction for a picture that has three sample arrays or a block of luma samples resulting from a partitioning of a macroblock for inter prediction for a monochrome picture or a picture that is coded using three separate color planes.

In some video codecs a sub-macroblock may be defined as one quarter of the samples of a macroblock, i.e., an 8×8 luma block and two corresponding chroma blocks of which one corner is located at a corner of the macroblock for a picture that has three sample arrays or an 8×8 luma block of which one corner is located at a corner of the macroblock for a monochrome picture or a picture that is coded using three separate color planes.

In some video codecs a sub-macroblock partition may be defined as a block of luma samples and two corresponding blocks of chroma samples resulting from a partitioning of a sub-macroblock for inter prediction for a picture that has three sample arrays or a block of luma samples resulting from a partitioning of a sub-macroblock for inter prediction for a monochrome picture or a picture that is coded using three separate color planes.

3) Data Prediction

This concept is utilized to benefit from spatial, temporal or inter-view/inter-layer redundancies present in video data.

A block of video samples can be coded individually, for example in certain intra coding modes, as well as it can be predicted. Different types of prediction can be applied, such as:

Sample Prediction

Sample prediction enables prediction of sample values of a current block (Cb) from sample values of a reference block (Rb).

Sample prediction may comprise motion-compensated prediction, where motion information is applied to determine the location of the reference block. Motion information is typically indicated with motion vectors associated with each motion compensated block Cb. Each of these motion vectors represents the displacement or the location difference of the block Cb in the picture to be coded (in the encoder side) or decoded (in the decoder side) and the reference block Rb in one of the previously coded, decoded or synthesized pictures.

Different versions of such prediction include inter prediction, when Cb and Rb are located in different pictures or intra prediction, when samples of Cb and Rb are located in the same picture.

Inter prediction may be further categorized in inter-view prediction, when an earlier coded/decoded picture is used as reference, diagonal inter-view prediction, when picture present in another coded view but not coinciding in time with the current picture (e.g. not having the same capture or output time as the current picture) is utilized as a reference, view synthesis prediction, when a synthesized (rendered) picture is utilized as a reference and inter-layer prediction where picture present in another coded layer is utilized as reference.

Motion Parameters Prediction

Motion parameters prediction—when parameters of motion model applicable for Cb are predicted from motion model utilized for coding of Rb. Examples of such prediction include MVP or motion vector inheritance (MVI).

In typical video codecs the predicted motion vectors are created in a predefined way, for example by calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In order to represent motion vectors efficiently those are typically coded differentially with respect to block-specific predicted motion vectors. In addition to predicting the motion vector values, the reference index pointing or referring to a previously coded/decoded picture can be predicted. The reference index is typically predicted from adjacent blocks and/or or co-located blocks in a reference picture. Moreover, video codecs may employ an additional motion information coding/decoding mechanism, often called merging/merge mode, where all the motion field information, which includes a motion vector and a corresponding reference picture index for each available or used (e.g. as determined by the coding mode) reference picture list, is predicted and used without any modification/correction. Similarly, predicting the motion field information is carried out using the motion field information of adjacent blocks and/or co-located blocks in reference pictures and the used motion field information is signaled among a list of motion field candidate list filled with motion field information of available adjacent/co-located blocks.

In the case of coding multi-components types of data, such as Multiview Video Plus Depth. inter-component prediction can be utilized. For example motion information describing the video data model can be utilized for predicting motion information of describing depth data.

Transform Coding

This concept is typically utilized to benefit from spatial redundancies present in video data.

A block of video samples (original or predicted) is typically processed with 1D, 2D or 3D transforms to produce more compact frequency-based representation. The transform type utilized for this purpose is typically selected as such that provides high coding gain for certain type of signals and represents input block of samples with minimal amount of non-zero transform coefficients. Examples of such transform are a 2D separable Discreet Cosine Transform (DCT), Sine Transforms, or their variants.

Entropy Coding

Once samples of video data are modeled with prediction and transform coefficients and/or variables, parameters of this model may still preserve statistical redundancy. Various entropy coding methods are utilized to represent this information in a more compact way. Non-limiting examples of such method include Variable Length Coding (VLC) or Context Adaptive Binary Arithmetic Coding (CABAC).

Motion-Compensated Prediction (MCP) in Video Coding

In MCP, samples of a current block Cb are predicted from samples of a reference block Rb. Parameters of MCP may include motion information, which may comprise one or more reference indexes which identifies the source (reference picture), a block size (partition or Prediction unit PU) and one or more motion vectors. Each of these motion vectors may represent the displacement of the block in the picture to be coded (in the encoder side) or decoded (in the decoder side) and the prediction source block in one of the previously reconstructed or decoded pictures. For a prediction unit using inter prediction a similar block in one of the reference pictures may be indicated and if bi-prediction is used a second similar block in one of the reference pictures may be indicated too. The location of the prediction block(s) is coded as motion vector(s) that indicate the position(s) of the prediction block(s) compared to the block being coded.

In order to represent motion vectors efficiently, those may be coded differentially with respect to block-specific predicted motion vectors. In many video codecs the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in reference pictures and signaling the chosen candidate as the motion vector predictor.

Many coding standards allow the use of multiple reference pictures for inter prediction. Many coding standards, such as H.264/AVC and HEVC, include syntax structures in the bitstream that enable decoders to create one or more reference picture lists to be used in inter prediction when more than one reference picture may be used. A reference picture index to a reference picture list may be used to indicate which one of the multiple reference pictures is used for inter prediction for a particular block. A reference picture index or any other similar information identifying a reference picture may therefore be associated with or considered part of a motion vector. A reference picture index may be coded by an encoder into the bitstream is some inter coding modes or it may be derived (by an encoder and a decoder) for example using neighboring blocks in some other inter coding modes. In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive or bi-predicted (B) slice, and one reference picture list (reference picture list 0) is formed for each inter-coded or uni-predicted (P) slice. In addition, for a B slice in a draft HEVC standard, a combined list (List C) may be constructed after the final reference picture lists (List 0 and List 1) have been constructed. The combined list may be used for uni-prediction (also known as uni-directional prediction) within B slices.

AMVP may operate for example as follows, while other similar realizations of AMVP are also possible for example with different candidate position sets and candidate locations with candidate position sets. Two spatial motion vector predictors (MVPs) may be derived and a temporal motion vector predictor (TMVP) may be derived. They are selected among the positions shown in FIG. 2a: three spatial MVP candidate positions located above the current prediction block (B0, B1, B2) and two on the left (A0, A1). The first motion vector predictor that is available (e.g. resides in the same slice, is inter-coded, etc.) in a pre-defined order of each candidate position set, (B0, B1, B2) or (A0, A1), may be selected to represent that prediction direction (up or left) in the motion vector competition. A reference index for TMVP may be indicated by the encoder in the slice header (e.g. as collocated_ref_idx_syntax element). The motion vector obtained from the co-located picture may be scaled according to the proportions of the picture order count differences of the reference picture of TMVP, the co-located picture, and the current picture. Moreover, a redundancy check may be performed among the candidates to remove identical candidates, which can lead to the inclusion of a zero MV in the candidate list. The motion vector predictor may be indicated in the bitstream for example by indicating the direction of the spatial MVP (up or left) or the selection of the TMVP candidate.

In addition to predicting the motion vector values, the reference index of previously coded/decoded picture can be predicted. The reference index may be predicted from adjacent blocks and/or from co-located blocks in a temporal reference picture.

Moreover, many high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

In a merge mode, all the motion information of a block/PU may be predicted and used without any modification/correction. The aforementioned motion information for a PU may comprise
1. The information whether 'the PU is uni-predicted using only reference picture list0' or 'the PU is un-predicted using only reference picture list1' or 'the PU is bi-predicted using both reference picture list0 and list1'
2. Motion vector value corresponding to the reference picture list0
3. Reference picture index in the reference picture list0
4. Motion vector value corresponding to the reference picture list1
5. Reference picture index in the reference picture list1.

Similarly, predicting the motion information is carried out using the motion information of adjacent blocks and/or co-located blocks in temporal reference pictures. Typically, a list, often called as merge list, is constructed by including motion prediction candidates associated with available adjacent/co-located blocks and the index of selected motion prediction candidate in the list is signalled. Then the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism is also employed for individual PUs (not necessarily the whole CU as in skip mode) and in this case, prediction residual may be utilized to improve prediction quality. This type of prediction mode is typically named as inter-merge mode.

One of the candidates in the merge list may be a TMVP candidate, which may be derived from the collocated block within an indicated or inferred reference picture, such as the reference picture indicated for example in the slice header for example using the collocated_ref_idx syntax element or alike.

In HEVC the so-called target reference index for temporal motion vector prediction in the merge list is set as 0 when the motion coding mode is the merge mode. When the motion coding mode in HEVC utilizing the temporal motion vector prediction is the advanced motion vector prediction mode, the target reference index values are explicitly indicated (e.g. per each PU).

When the target reference index value has been determined, the motion vector value of the temporal motion vector prediction may be derived as follows: Motion vector at the block that is co-located with the bottom-right neighbor of the current prediction unit is calculated. The picture where the co-located block resides may be e.g. determined according to the signalled reference index in the slice header (collocated_ref_idx) as described above. The determined motion vector at the co-located block is scaled with respect to the ratio of a first picture order count difference and a second picture order count difference. The first picture order count difference is derived between the picture containing the co-located block and the reference picture of the motion vector of the co-located block. The second picture order count difference is derived between the current picture and the target reference picture. If one but not both of the target reference picture and the reference picture of the motion vector of the co-located block is a long-term reference picture (while the other is a short-term reference picture), the TMVP candidate may be considered unavailable. If both of the target reference picture and the reference picture of the motion vector of the co-located block are long-term reference pictures, no POC-based motion vector scaling may be applied.

Scalable Video Coding

Scalable video coding refers to coding structure where one bitstream can contain multiple representations of the content at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

A scalable video codec for quality scalability (also known as Signal-to-Noise or SNR) and/or spatial scalability may be implemented as follows. For a base layer, a conventional non-scalable video encoder and decoder are used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use typically with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

Another type of scalability is standard scalability. In this type, the base layer and enhancement layer belong to different video coding standards. An example case is where the base layer is coded with H.264/AVC whereas the enhancement layer is coded with HEVC. The motivation behind this type of scalability is that in this way, the same bitstream can be decoded by both legacy H.264/AVC based systems as well as new HEVC based systems.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

While a scalable video codec with two scalability layers with an enhancement layer and a base layer was described above, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded.

In scalable multiview coding, the same bitstream may contain coded view components of multiple views and at least some coded view components may be coded using quality and/or spatial scalability.

Work is ongoing to specify scalable and multiview extensions to the HEVC standard. The multiview extension of HEVC, referred to as MV-HEVC, is similar to the MVC extension of H.264/AVC. Similarly to MVC, in MV-HEVC, inter-view reference pictures can be included in the reference picture list(s) of the current picture being coded or decoded. The scalable extension of HEVC, referred to as SHVC, is planned to be specified so that it uses multi-loop decoding operation (unlike the SVC extension of H.264/AVC). Currently, two designs to realize scalability are investigated for SHVC. One is reference index based, where an inter-layer reference picture can be included in a one or more reference picture lists of the current picture being coded or decoded (as described above). Another may be referred to as IntraBL or TextureRL, where a specific coding mode, e.g. in CU level, is used for using decoded/reconstructed sample values of a reference layer picture for prediction in an enhancement layer picture. The SHVC development has concentrated on development of spatial and coarse grain quality scalability.

It is possible to use many of the same syntax structures, semantics, and decoding processes for MV-HEVC and reference-index-based SHVC. Furthermore, it is possible to use the same syntax structures, semantics, and decoding processes for depth coding too. Hereafter, term scalable multiview extension of HEVC (SMV-HEVC) is used to refer to a coding process, a decoding process, syntax, and semantics where largely the same (de)coding tools are used regardless of the scalability type and where the reference index based approach without changes in the syntax, semantics, or decoding process below the slice header is used. SMV-HEVC might not be limited to multiview, spatial, and coarse grain quality scalability but may also support other types of scalability, such as depth-enhanced video.

For the enhancement layer coding, the same concepts and coding tools of HEVC may be used in SHVC, MV-HEVC, and/or SMV-HEVC. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or SMV-HEVC codec.

In MV-HEVC, SMV-HEVC, and reference index based SHVC solution, the block level syntax and decoding process are not changed for supporting inter-layer texture prediction. Only the high-level syntax has been modified (compared to that of HEVC) so that reconstructed pictures (upsampled if necessary) from a reference layer of the same access unit can be used as the reference pictures for coding the current enhancement layer picture. The inter-layer reference pictures as well as the temporal reference pictures are included in the reference picture lists. The signalled reference picture index is used to indicate whether the current Prediction Unit (PU) is predicted from a temporal reference picture or an inter-layer reference picture. The use of this feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

The reference list(s) in MV-HEVC, SMV-HEVC, and a reference index based SHVC solution may be initialized using a specific process in which the inter-layer reference picture(s), if any, may be included in the initial reference picture list(s). are constructed as follows. For example, the temporal references may be firstly added into the reference lists (L0, L1) in the same manner as the reference list construction in HEVC. After that, the inter-layer references may be added after the temporal references. The inter-layer reference pictures may be for example concluded from the layer dependency information, such as the RefLayerId[i] variable derived from the VPS extension as described above. The inter-layer reference pictures may be added to the initial reference picture list L0 if the current enhancement-layer slice is a P-Slice, and may be added to both initial reference picture lists L0 and L1 if the current enhancement-layer slice is a B-Slice. The inter-layer reference pictures may be added to the reference picture lists in a specific order, which can but need not be the same for both reference picture lists. For example, an opposite order of adding inter-layer reference pictures into the initial reference picture list 1 may be used compared to that of the initial reference picture list 0. For example, inter-layer reference pictures may be inserted into the initial reference picture 0 in an ascending order of nuh_layer_id, while an opposite order may be used to initialize the initial reference picture list 1.

In the coding and/or decoding process, the inter-layer reference pictures may be treated as a long term reference pictures.

In SMV-HEVC and a reference index based SHVC solution, inter-layer motion parameter prediction may be performed by setting the inter-layer reference picture as the collocated reference picture for TMVP derivation. A motion field mapping process between two layers may be performed for example to avoid block level decoding process modification in TMVP derivation. A motion field mapping could also be performed for multiview coding, but a present draft of MV-HEVC does not include such a process. The use of the motion field mapping feature may be controlled by the encoder and indicated in the bitstream for example in a video parameter set, a sequence parameter set, a picture parameter, and/or a slice header. The indication(s) may be specific to an enhancement layer, a reference layer, a pair of an enhancement layer and a reference layer, specific TemporalId values, specific picture types (e.g. RAP pictures), specific slice types (e.g. P and B slices but not I slices), pictures of a specific POC value, and/or specific access units, for example. The scope and/or persistence of the indication(s) may be indicated along with the indication(s) themselves and/or may be inferred.

In a motion field mapping process for spatial scalability, the motion field of the upsampled inter-layer reference picture is attained based on the motion field of the respective reference layer picture. The motion parameters (which may e.g. include a horizontal and/or vertical motion vector value and a reference index) and/or a prediction mode for each block of the upsampled inter-layer reference picture may be derived from the corresponding motion parameters and/or prediction mode of the collocated block in the reference layer picture. The block size used for the derivation of the motion parameters and/or prediction mode in the upsampled inter-layer reference picture may be for example 16×16. The 16×16 block size is the same as in HEVC TMVP derivation process where compressed motion field of reference picture is used.

The TMVP process of HEVC is limited to one target picture per slice in the merge mode and one collocated picture (per slice). When applying the reference index based scalability on top of HEVC, the TMVP process of HEVC has limited applicability as explained in the following in the case of the merge mode. In the example, the target reference picture (with index 0 in the reference picture list) is a short-term reference picture. The motion vector in the collocated PU, if referring to a short-term (ST) reference picture, is scaled to form a merge candidate of the current PU (PU0), wherein MV0 is scaled to MV0' during the merge mode process. However, if the collocated PU has a motion vector (MV1) referring to an inter-view reference picture, marked as long-term, the motion vector is not used to predict the current PU (PU1).

There might be a significant amount of collocated PUs (in the collocated picture) which contain motion vectors referring to an inter-view reference picture while the target reference index (being equal to 0) indicates a short-term reference picture. Therefore, disabling prediction from those motion vectors makes the merge mode less efficient. There have been proposals to overcome this issue, some of which are explained in the following paragraphs.

An additional target reference index may be indicated by the encoder in the bitstream and decoded by the decoder from the bitstream and/or inferred by the encoder and/or the decoder. MV1 of the co-located block of PU1 can be used to form a disparity motion vector merging candidate. In general, when the reference index equal to 0 represents a short-term reference picture, the additional target reference index is used to represent a long-term reference picture. When the reference index equal to 0 represents a long-term reference picture, the additional target reference index is used to represent a short-term reference picture.

The methods to indicate or infer the additional reference index include but are not limited to the following:

Indicating the additional target reference index in the bitstream, for example within the slice segment header syntax structure.

Deriving the changed target reference index to be equal to the smallest reference index which has a different marking (as used as short-term or long-term reference) from that of reference index 0.

In the case the co-located PU points to a reference picture having a different layer identifier (equal to layerA) than that for reference index 0, deriving the changed target reference index to be equal to the smallest reference index that has layer identifier equal to layerA.

In the merge mode process the default target picture (with reference index 0) is used when its marking as short-term or long-term reference picture is the same as that of the reference picture of the collocated block. Otherwise (i.e., when the marking of the reference picture corresponding to the additional reference index as short-term or long-term reference picture is the same as that of the reference picture of the collocated block), the target picture identified by the additional reference index is used.

An access unit and a coded picture may be defined for example in one of the following ways in various HEVC extensions:

A coded picture may be defined as a coded representation of a picture comprising VCL NAL units with a particular value of nuh_layer_id and containing all coding tree units of the picture. An access unit may be defined as set of NAL units that are associated with each other according to a specified classification rule, are consecutive in decoding order, and contain exactly one coded picture.

A coded picture may be defined a coded representation of a picture comprising VCL NAL units with a particular value of nuh_layer_id and containing all coding tree units of the picture. An access unit may be defined to comprise a coded picture with nuh_layer_id equal to 0 and zero or more coded picture pictures with non-zero nuh_layer_id.

A coded picture may be defined as a coded picture to comprise VCL NAL units of nuh_layer_id equal to 0 (only), a layer picture may be defined to comprise VCL NAL units of a particular non-zero nuh_layer_id. An access unit may be defined to comprise a coded picture and zero or more layer pictures.

Term temporal instant or time instant or time instance or time entity may be defined to represent a same capturing time or output time or output order. For example, if a first view component of a first view is captured at the same time as a second view component in a second view, these two view components may be considered to be of the same time instant. An access unit may be defined to contain pictures (or view components) of the same time instant, and hence in this case pictures residing in an access unit may be considered to be of the same time instant. Pictures of the same time instant may be indicated (e.g. by the encoder) using multiple means and may be identified (e.g. by the decoding) using multiple means, such as a picture order count (POC) value or a timestamp (e.g. an output timestamp).

Multi-View Extension of H.264/AVC

The H.264/AVC standard was developed by the Joint Video Team (JVT) of the Video Coding Experts Group (VCEG) of the Telecommunications Standardisation Sector of International Telecommunication Union (ITU-T) and the Moving Picture Experts Group (MPEG) of International Standardisation Organisation (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

Similarly to earlier video coding standards, the bitstream syntax and semantics as well as the decoding process for error-free bitstreams are specified in H.264/AVC. The encoding process is not specified, but encoders must generate conforming bitstreams. Bitstream and decoder conformance can be verified with the Hypothetical Reference Decoder (HRD), which is specified in Annex C of H.264/AVC. The standard contains coding tools that help in coping with transmission errors and losses, but the use of the tools in encoding is optional and no decoding process has been specified for erroneous bitstreams.

The elementary unit for the input to an H.264/AVC encoder and the output of an H.264/AVC decoder is a picture. A picture may either be a frame or a field. A frame comprises a matrix of luma samples and corresponding chroma samples. A field is a set of alternate sample rows of a frame and may be used as encoder input, when the source signal is interlaced. A macroblock is a 16×16 block of luma samples and the corresponding blocks of chroma samples. A picture is partitioned to one or more slice groups, and a slice group contains one or more slices. A slice consists of an integer number of macroblocks ordered consecutively in the raster scan within a particular slice group.

The elementary unit for the output of an H.264/AVC encoder and the input of an H.264/AVC decoder is a Network Abstraction Layer (NAL) unit. Decoding of partially lost or corrupted NAL units is typically difficult. For transport over packet-oriented networks or storage into structured files, NAL units are typically encapsulated into packets or similar structures. A bytestream format has been specified in H.264/AVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention is performed always regardless of whether the bytestream format is in use or not.

Slices and Slice Groups

H.264/AVC, as many other video coding standards, allows splitting of a coded picture into slices. In-picture prediction is disabled across slice boundaries. Thus, slices can be regarded as a way to split a coded picture into independently decodable pieces, and slices are therefore elementary units for transmission.

Some profiles of H.264/AVC enables the use of up to eight slice groups per coded picture. When more than one slice group is in use, the picture is partitioned into slice group map units, which are equal to two vertically consecutive macroblocks when the macroblock-adaptive frame-field (MBAFF) coding is in use and equal to a macroblock otherwise. The picture parameter set contains data based on which each slice group map unit of a picture is associated with a particular slice group. A slice group can contain any slice group map units, including non-adjacent map units. When more than one slice group is specified for a picture, the flexible macroblock ordering (FMO) feature of the standard is used.

In H.264/AVC, a slice consists of one or more consecutive macroblocks (or macroblock pairs, when MBAFF is in use) within a particular slice group in raster scan order. If only one slice group is in use, H.264/AVC slices contain consecutive macroblocks in raster scan order and are therefore similar to the slices in many previous coding standards. In some profiles of H.264/AVC slices of a coded picture may appear in any order relative to each other in the bitstream, which is referred to as the arbitrary slice ordering (ASO) feature. Otherwise, slices must be in raster scan order in the bitstream.

In HEVC, a picture can be partitioned in tiles, which are rectangular and contain an integer number of CTUs. The partitioning to tiles may form a regular grid, where heights and widths of tiles differ from each other by one LCU at the maximum. The decoding order (and the bitstream order) of CTUs is such that the CTUs of a tile are contiguous in the decoding order (and the bitstream order). Within a tile, the decoding order (and the bitstream order) of CTUs is the so-called raster-scan order. However, it is to be noted that HEVC includes a so-called wavefront coding tool, which can enable parallel decoding of CTU rows within a tile. A default decoding order (and the bitstream order, also referred to as the tile scan order) of tiles is also the raster-scan order. However, tiles may be decoded independently from each other, apart from potential filtering across tile boundaries (the use of which may be controlled and indicated in the bitstream by the encoder).

In HEVC, a slice may be defined as an integer number of coding tree units contained in one independent slice segment and all subsequent dependent slice segments (if any) that precede the next independent slice segment (if any) within the same access unit. In HEVC, a slice segment may be defined to be an integer number of coding tree units ordered consecutively in the tile scan and contained in a single NAL unit. The division of each picture into slice segments is a partitioning. In HEVC, an independent slice segment may be defined to be a slice segment for which the values of the syntax elements of the slice segment header are not inferred from the values for a preceding slice segment, and a dependent slice segment may be defined to be a slice segment for which the values of some syntax elements of the slice segment header are inferred from the values for the preceding independent slice segment in decoding order. In HEVC, a slice header may be defined to be the slice segment header of the independent slice segment that is a current slice segment or is the independent slice segment that precedes a current dependent slice segment, and a slice segment header may be defined to be a part of a coded slice segment containing the data elements pertaining to the first or all coding tree units represented in the slice segment.

Network Abstraction Layer (NAL) Units

NAL units of H.264/AVC and its extensions comprise a header and a payload. In H.264/AVC and its extensions, the NAL unit header indicates the type of the NAL unit and whether a coded slice contained in the NAL unit is a part of a reference picture or a non-reference picture. The header for SVC and MVC NAL units additionally contains various indications related to the scalability and multiview hierarchy.

In H.264/AVC and its extensions, NAL units can be categorized into Video Coding Layer (VCL) NAL units and non-VCL NAL units. VCL NAL units are either coded slice NAL units, coded slice data partition NAL units, or VCL prefix NAL units. Coded slice NAL units contain syntax elements representing one or more coded macroblocks, each of which corresponds to a block of samples in the uncompressed picture. There are four types of coded slice NAL units: coded slice in an Instantaneous Decoding Refresh (IDR) picture, coded slice in a non-IDR picture, coded slice of an auxiliary coded picture (such as an alpha plane) and coded slice extension (for SVC slices not in the base layer or MVC slices not in the base view). A set of three coded slice data partition NAL units contains the same syntax elements as a coded slice. Coded slice data partition A comprises macroblock headers and motion vectors of a slice, while coded slice data partition B and C include the coded residual data for intra macroblocks and inter macroblocks, respectively. It is noted that the support for slice data partitions is only included in some profiles of H.264/AVC. A VCL prefix NAL unit precedes a coded slice of the base layer in SVC and MVC bitstreams and contains indications of the scalability hierarchy of the associated coded slice.

A non-VCL NAL unit may be of one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets are essential for the reconstruction of decoded pictures, whereas the other non-VCL NAL units are not necessary for the reconstruction of decoded sample values and serve other purposes presented below.

Parameters that remain unchanged through a coded video sequence are included in a sequence parameter set. In addition to the parameters that are essential to the decoding process, the sequence parameter set may optionally contain video usability information (VUI), which includes parameters that are important for buffering, picture output timing, rendering, and resource reservation. A picture parameter set contains such parameters that are likely to be unchanged in several coded pictures. No picture header is present in H.264/AVC bitstreams but the frequently changing picture-level data is repeated in each slice header and picture parameter sets carry the remaining picture-level parameters. H.264/AVC syntax allows many instances of sequence and picture parameter sets, and each instance is identified with a unique identifier. Each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets using a more reliable transmission mechanism compared to the protocols used for the slice data. For example, parameter sets can be included as a parameter in the session description for H.264/AVC RTP sessions. If parameter sets are transmitted in-band, they can be repeated to improve error robustness.

An SEI NAL unit contains one or more SEI messages, which are not required for the decoding of output pictures but assist in related processes, such as picture output timing, rendering, error detection, error concealment, and resource reservation. Several SEI messages are specified in H.264/AVC, and the user data SEI messages enable organizations and companies to specify SEI messages for their own use. H.264/AVC contains the syntax and semantics for the specified SEI messages but no process for handling the messages in the recipient is defined. Consequently, encoders are required to follow the H.264/AVC standard when they create SEI messages, and decoders conforming to the H.264/AVC standard are not required to process SEI messages for output order conformance. One of the reasons to include the syntax and semantics of SEI messages in H.264/AVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In H.264/AVC and its extensions, a coded picture consists of the VCL NAL units that are required for the decoding of the picture. A coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded.

In H.264/AVC and its extensions, an access unit consists of a primary coded picture and those NAL units that are associated with it. The appearance order of NAL units within an access unit is constrained as follows. An optional access unit delimiter NAL unit may indicate the start of an access unit. It is followed by zero or more SEI NAL units. The coded slices or slice data partitions of the primary coded picture appear next, followed by coded slices for zero or more redundant coded pictures.

In H.264/AVC and its extensions, a coded video sequence is defined to be a sequence of consecutive access units in decoding order from an IDR access unit, inclusive, to the next IDR access unit, exclusive, or to the end of the bitstream, whichever appears earlier.

A group of pictures (GOP) is and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. A closed GOP is such a group of pictures in which all pictures can be correctly decoded when the decoding starts from the initial intra picture of the closed GOP. In other words, no picture in a closed GOP refers to any pictures in previous GOPs. In H.264/AVC, a closed GOP starts from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

Reference Picture Buffer Construction

In H.264/AVC, a reference picture list is utilized to store a set of reference pictures used for inter prediction of P, B, or SP slice. For P or SP slice, there is one reference picture list, denoted as list1. For B slice, there are two reference picture lists, denoted as list0 and list 1. The reference pictures which are earlier than current picture in play order are put into list0 according to the decreasing order, and the reference pictures which are later than the current picture are put into list 1 according to the increasing order. The reference pictures are sorted according to the distance between the reference picture and current picture.

Since multiview video provides codec possibility to utilize inter-view redundancy, decoded inter-view frames are included in the reference picture buffer as well.

According to the H.264/MVC extension, the temporal reference pictures are first put into the reference picture list, and then the inter-view reference pictures are appended at the end of the list if the inter-view prediction is available. In addition, MVC provides Reference Picture List Reordering (RPLR) mechanism, which for example allows encoder and decoder to move (switch) inter-view reference picture ahead of temporal reference picture in the reference picture list.

Motion Vectors

In many video codecs, including H.264/AVC and HEVC, motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). H.264/AVC and HEVC, as many other video compression standards, divide a picture into a mesh of rectangles, for each of which a similar block in one of the reference pictures is indicated for inter prediction. The location of the prediction block is coded as a motion vector that indicates the position of the prediction block relative to the block being coded.

Inter prediction process may be characterized for example using one or more of the following factors.

The Accuracy of Motion Vector Representation.

For example, motion vectors may be of quarter-pixel accuracy, half-pixel accuracy or full-pixel accuracy and sample values in fractional-pixel positions may be obtained using a finite impulse response (FIR) filter. A different filter and/or different filter tap values may be used depending on the fractional sample position relative to the integer sample position and/or filters may be cascaded. For example, a 6-tap filter may be used to obtain sample values at half-pixel positions, while a bi-linear filter may be used to obtain sample values at quarter-pixel positions out of the sample values at integer- and half-pixel positions. A different filter and/or filter tap values may be used for different color components. For example, a bi-linear filter may be used for the chroma components, while a filter with a greater number of taps may be used for the luma component.

Block Partitioning for Inter Prediction.

Many coding standards, including H.264/AVC and HEVC, allow selection of the size and shape of the block for which a motion vector is applied for motion-compensated prediction in the encoder, and indicating the selected size and shape in the bitstream so that decoders can reproduce the motion-compensated prediction done in the encoder.

Number of Reference Pictures for Inter Prediction.

The sources of inter prediction are previously decoded pictures. Many coding standards, including H.264/AVC and HEVC, enable storage of multiple reference pictures for inter prediction and selection of the used reference picture on a block basis. For example, reference pictures may be selected on macroblock or macroblock partition basis in H.264/AVC and on PU or CU basis in HEVC. Many coding standards, such as H.264/AVC and HEVC, include syntax structures in the bitstream that enable decoders to create one or more reference picture lists. A reference picture index to a reference picture list may be used to indicate which one of the multiple reference pictures is used for inter prediction for a particular block. A reference picture index may be coded by an encoder into the bitstream in some inter coding modes or it may be derived (by an encoder and a decoder) for example using neighboring blocks in some other inter coding modes.

The functionality to use multiple reference pictures may cause a to identify or label pictures so that they can be referred to e.g. by syntax elements and processes. For example, a picture or frame number or picture order count (POC) may be used for identifying or labeling pictures among other things. These concepts are briefly described in the following paragraphs.

Some video coding formats, such as H.264/AVC, include the frame_num syntax element, which is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

H.264/AVC and HEVC include a concept of picture order count (POC). A value of POC is derived for each picture and is non-decreasing with increasing picture position in output order. POC therefore indicates the output order of pictures. POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

Motion Vector Prediction.

In order to represent motion vectors efficiently in bitstreams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Multi-Hypothesis Motion-Compensated Prediction.

H.264/AVC and HEVC enable the use of a single prediction block in P slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P slices may be uni-predicted or intra-predicted. The reference pictures for a bi-predictive picture may not be limited to be the subsequent picture and the previous picture in output order, but rather any reference pictures may be used. In many coding standards, such as H.264/AVC and HEVC, one reference picture list, referred to as reference picture list 0, is constructed for P slices, and two reference picture lists, list 0 and list 1, are constructed for B slices. For B slices, when prediction in forward direction may refer to prediction from a reference picture in reference picture list 0, and prediction in backward direction may refer to prediction from a reference picture in reference picture list 1, even though the reference pictures for prediction may have any decoding or output order relation to each other or to the current picture.

Weighted Prediction.

Many coding standards use a prediction weight of 1 for prediction blocks of inter (P) pictures and 0.5 for each prediction block of a B picture (resulting into averaging). H.264/AVC allows weighted prediction for both P and B slices. In implicit weighted prediction, the weights are proportional to picture order counts, while in explicit weighted prediction, prediction weights are explicitly indicated. The weights for explicit weighted prediction may be indicated for example in one or more of the following syntax structure: a slice header, a picture header, a picture parameter set, an adaptation parameter set or any similar syntax structure.

In many video codecs, the prediction residual after motion compensation is first transformed with a transform kernel (like DCT) and then coded. The reason for this is that often there still exists some correlation among the residual and transform can in many cases help reduce this correlation and provide more efficient coding.

In a draft HEVC, each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the TU (including e.g. DCT coefficient information). It may be signaled at CU level whether prediction error coding is applied or not for each CU. In the case there is no prediction error residual associated with the CU, it can be considered there are no TUs for the CU.

In some coding formats and codecs, a distinction is made between so-called short-term and long-term reference pictures. This distinction may affect some decoding processes such as motion vector scaling in the temporal direct mode or alike, or implicit weighted prediction. If both of the reference pictures used for the temporal direct mode or alike are short-term reference pictures, the motion vector used in the prediction may be scaled according to the picture order count (POC) difference between the current picture and each of the reference pictures. However, in some coding systems, if at least one reference picture for the temporal direct mode or alike is a long-term reference picture, default scaling of the motion vector may be used, for example scaling the motion to half may be used, or the motion vector may not be scaled. Similarly, if a short-term reference picture is used for implicit weighted prediction, the prediction weight may be scaled according to the POC difference between the POC of the current picture and the POC of the reference picture. However, if a long-term reference picture is used for implicit weighted prediction, a default prediction weight may be used, such as 0.5 in implicit weighted prediction for bi-predicted blocks.

Motion parameter types or motion information may include but are not limited to one or more of the following types:

1) an indication of a prediction type (e.g. intra prediction, uni-prediction, bi-prediction) and/or a number of reference pictures;
2) an indication of a prediction direction, such as inter (a.k.a. temporal) prediction, inter-layer prediction, inter-view prediction, view synthesis prediction (VSP), and inter-component (which may be indicated per reference picture and/or per prediction type and where in some embodiments inter-view and view-synthesis prediction may be jointly considered as one prediction direction) and/or
3) an indication of a reference picture type, such as a short-term reference picture and/or a long-term reference picture and/or an inter-layer reference picture (which may be indicated e.g. per reference picture)
4) a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);
5) a horizontal motion vector component (which may be indicated e.g. per prediction block or per reference index or alike);
6) a vertical motion vector component (which may be indicated e.g. per prediction block or per reference index or alike);
7) one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);
8) coordinates of a block to which the motion parameters and/or motion information applies, e.g. coordinates of the top-left sample of the block in luma sample units;
9) extents (e.g. a width and a height) of a block to which the motion parameters and/or motion information applies.

A motion field associated with a picture may be considered to comprise of a set of motion information produced for every coded block, such as a prediction unit, of the picture. A motion field may be accessible by coordinates of a block, for example. A motion field may be used for example in temporal motion vector prediction (TMVP) or any other motion prediction mechanism where a source or reference for prediction other than the current (de)coded picture is used.

Different spatial granularity or units may be applied to represent and/or store a motion field. For example, a regular grid of spatial units may be used. For example, a picture may be divided into rectangular blocks of certain size (with the possible exception of blocks at the edges of the picture, such as on the right edge and bottom edge). For example, the size of the spatial unit may be equal to the smallest size for which a distinct motion can be indicated by the encoder in the bitstream, such as a 4×4 block in luma sample units. For example, a so-called compressed motion field may be used, where the spatial unit may be equal to a pre-defined or indicated size, such as a 16×16 block in luma sample units, which size may be greater than the smallest size for indicating distinct motion. For example, an HEVC encoder and/or decoder may be implemented in a manner that a motion data storage reduction (MDSR) is performed for each decoded motion field (prior to using the motion field for any prediction between pictures). In an HEVC implementation, MDSR may reduce the granularity of motion data to 16×16 blocks in luma sample units by keeping the motion applicable to the top-left sample of the 16×16 block in the compressed motion field. The encoder may encode indication(s) related to the spatial unit of the compressed motion field as one or more syntax elements and/or syntax element values for example in a sequence-level syntax structure, such as a video parameter set or a sequence parameter set. In some (de)coding methods and/or devices, a motion field may be represented and/or stored according to the block partitioning of the motion prediction (e.g. according to prediction units of the HEVC standard). In some (de)coding methods and/or devices, a combination of a regular grid and block partitioning may be applied so that motion associated with partitions greater than a pre-defined or indicated spatial unit size is represented and/or stored associated with those partitions, whereas motion associated with partitions smaller than or unaligned with a pre-defined or indicated spatial unit size or grid is represented and/or stored for the pre-defined or indicated units.

Motion Vector (MV) Prediction in H.264/AVC and Extensions

Motion vector (MV) prediction specified in H.264/AVC/MVC utilizes correlation which is present in neighboring blocks of the same image (spatial correlation) or in the previously coded image (temporal correlation).

Figure 1B:
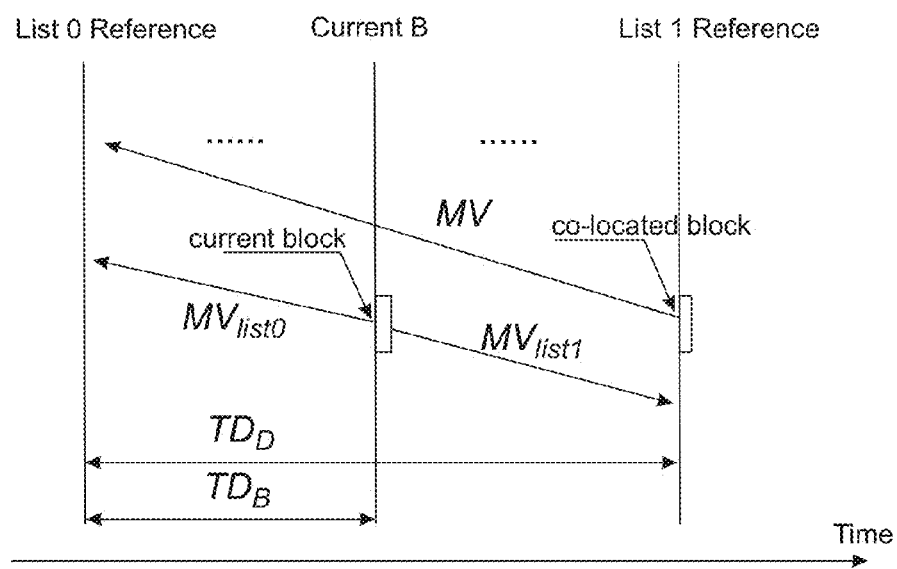

FIG. 1 shows the spatio-temporal neighborhood of the currently coded block (cb) which serve a candidate for MVP in H.264/AVC. FIG. 1a shows the spatially neighboring blocks of the current block cb: A is the block immediately to the left, B is the block above and C is the block diagonally above the current block cb. FIG. 1b illustrates the temporal neighborhood: a temporally neighboring block to the current block is co-located in the same place as the current block with respect to the picture, but occurs at a different time instance. It may be considered that a motion vector MV indicates where the corresponding block exists in a (reference) picture. In many coding schemes, a motion vector may be considered to include or be associated with an indication of the reference picture. In the case of uni-prediction, one motion vector may be associated with a prediction unit or alike. In the case of bi-prediction, two motion vectors may be associated with a prediction unit or alike.

MVs of cb may be estimated through the motion estimation and motion compensation process in an encoder and may be coded with differential pulse code modulation (DPCM) and may be included in a bitstream in the form of the residual between the motion vector prediction (MVp) and the actual MV as MVd(x, y)=MV(x, y)−MVp(x, y).

Generic MVP in H.264/AVC

In MVP of H.264/AVC and MVC a median value of the motion vectors of the macroblock partitions or sub-macroblock partitions immediately above (block B), diagonally above and to the right (block C), and immediately left of the current partition or sub-partition (block A) may be computed.

In more details, a generic process of MVp estimation in the H.264/AVC may be described as follows:
1. When only one of the spatial neighboring blocks (A, B, C) has identical reference index as the current block (cb):

$$MVp = mvLXN \qquad (2)$$

2. When more than one or no neighboring blocks (A, B, C) have identical reference index as the cb:

$$MVp = \text{median}\{mvLXA, mvLXB, mvLXC\}, \qquad (3)$$

where mvLXA, mvLXB, mvLXC are either horizontal or vertical motion vector components (without reference frame id) of the spatially neighboring blocks.

Figure 1C:
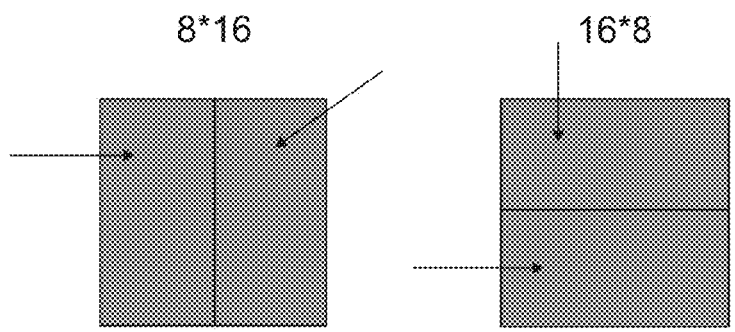
FIG. 1c illustrates motion vector prediction in the special cases of 8×16 and 16×8 macroblock partitions according to an embodiment.

3. Special cases for 16×8 and 8×16 macroblock partitions is shown in FIG. 1c, where the arrows indicate the macroblock partition to be used for predicting the motion vectors of the current macroblock partition.

In addition to this, H.264/AVC specifies several special cases which may be described as follows.

P SKIP Mode

1) Reference frame index of cb is always 0 and utilized list is 0 (refIdxL0=0).
2) MV are estimated with process specified in (2) and limited to blocks A and B only.
3) Zero-value MVp is used if no A and B neighbors are available.
4) No dMV is included in the bitstream. The MV of cb is equal to MVp.

B Skip (B Direct 16×16, and B Direct 8×8)

1) One of the following two MVP estimation processes may be used:
   a) Spatial Direct Mode: MVP computed from spatial neighboring blocks
   b) Temporal Direct Mode: MVP computed from temporal neighboring blocks
2) MVP process includes estimation of the following values:
   a) reference indices refIdxL0, refIdxL1
   b) motion vectors mvL0 and mvL1
3) Spatial Direct mode is estimated in the following:
   a) Process of reference index prediction and motion vector prediction is run independently for Reference Picture List 0 and for Reference Picture List 1.
   b) Minimal positive reference index is selected in each of lists
   c) Generic MVP process described in (2) and (3) is applied for each reference picture list to produce mvpL0 and mvpL1. Each component of the motion vector prediction mvpLX is given by the median of the corresponding vector components of the motion vector mvLXA, mvLXB, and mvLXC:

$$mvpLX[0]=\text{Median}(mvLXA[0],mvLXB[0],mvLXC[0])$$

$$mvpLX[1]=\text{Median}(mvLXA[1],mvLXB[1],mvLXC[1])$$

4) Temporal Direct mode is estimated in the following:
   a) MV of the current block to the list 0 and List 1 are calculated through temporal interpolation of MV from neighboring (in temporal direction) blocks
   b) With reference to FIG. 1b, POC distance from current frame to the referenced frame is utilized as factor of interpolation:

$$mvL0=MV_{list0}=MV*(TD_B/TD_D)$$

$$mvL1=MV_{list1}=MV*(TD_B-TD_D)/TD_D$$

where
   $TD_B$ is POC distance between current frame and reference frame in list1.
   $TD_D$ is POC distance between referenced frames in list0 and list1.
   MV is motion vector of the collocated block from reference picture list 1.

Motion Vector Prediction (MVP) in HEVC and Extensions

HEVC specifies two motion vector prediction modes: AMVP and MERGE.

AMVP in HEVC

Figure 2A:
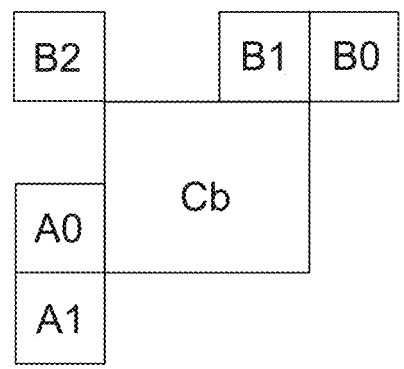
FIG. 2a illustrates an example of a spatial neighborhood of the current block Cb, for which motion vector prediction is performed.
Figure 2B:
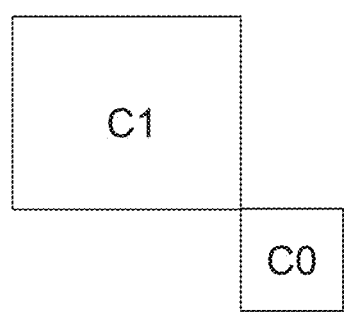
FIG. 2b illustrates an example of a temporal neighborhood of the current block Cb, for which motion vector prediction is performed.

HEVC specifies, that motion of the current block (Cb) is predicted from predicted units (PU blocks) located in the spatio-temporal neighborhood of the Cb. Block layout and utilized naming convention are shown in FIG. 2a, where motion information (vectors) of currently coded block (Cb) is predicted from motion information of PUs (A0 . . . B2) located in spatial proximity to the Cb. FIG. 2b shows blocks layout and naming convention for temporal collocated blocks utilized in AMVP. This naming convention is used below, with symbols referring to FIGS. 2a and 2b.

MVP Derivation from Spatial Neighborhood

Motion information in spatial neighborhood is utilized as following.

Consider current block Cb is predicted with reference index refIdx(Cb) and motion vectors MV(Cb). In this notation, refIdx(*) and MV(*) are functions returning actual values of reference index and motion vector utilized for current block. AMVP parses blocks A0 . . . B2 and produces two candidates for motion vector prediction MVP0 and MVP1. These candidates are determined with the following logic:

$$MVP0=\text{fun1}(Cb,A0,A1) \quad (1)$$

$$MVP1=\text{fun1}(Cb,B0,B1,B2) \quad (2)$$

where fun is a function that performs reference index match for Cb and blocks Ax and Bx and returns motion vector of block Ax(Bx) if those reference index match:

$$MVPx=\text{fun1}(Cb,x1,x2,x3) \quad (3)$$

```
{
    If (refIdx(Cb) == refIdx(x0))
        Return MV(x0)
    Else If (refIdx(Cb) == refIdx(x1))
        Return MV(x1)
    Else If (refIdx(Cb) == refIdx(x2))
        Return MV(x2)
    Else
        Return "Null".
}
```

Once MVP0 and MVP1 are derived, encoder selects the predictor (e.g. as an index referring to either MVP0 or MVP1) to be used in indicates it in the bitstream. For example, the encoder may compute a cost, such as a rate-distortion cost, of these predictors and signal optimal predictor to the decoder side. Receiving the MVP index or alike from a bitstream, the decoder may derive the motion vector predictor by executing either (1) or (2).

In some cases, expressions (1) or (2) may not result in determination of motion vector predictors, for example if none of blocks {A0, . . . B2} share the same refIdx as Cb. In this case, motion vector determination for not-available MVP candidate is performed as following:

If MPV0==Null $$MVP0=\text{fun2}(Cb,A0,A1) \quad (4)$$

If MPV1==Null $$MVP1=\text{fun2}(Cb,B0,B1,B2) \quad (5)$$

where function fun2 is determined:

$$MVPx=\text{fun2}(Cb,x1,x2,x3) \quad (6)$$

```
{
    If (refIdx(Cb) != refIdx(x0)) && refIdx(x0) !=-1)
        Return scaleMV(x0)
    If (refIdx(Cb) != refIdx(x1)) && refIdx(x1) !=-1)
        Return scaleMV(x1)
    If (refIdx(Cb) != refIdx(x2)) && refIdx(x2) !=-1)
        Return scaleMV(x2)
    Else
        Return "Null".
}
``` where scaleMV is a function that returns the motion information of neighboring blocks, scaled to meet a POC distance covered by the refIdx(Cb).

$$MVP = scaleMV(x, refIdx(Cb), refIdx(x)) \qquad (7)$$

```
{
    Scale = dPOC(Cb) / dPOC(x)
    Return Scale * MV(x);
}
``` where dPOC(x) is a function that returns POC distance between the picture hosting block x and the picture referred by motion prediction utilized for current block x through the refIdx term.

Distance=dPOC(x)
{return abs(POC(x)-POC(refIdx(x));}

Thus, if the POC of the current Cb is C and POC of reference index utilized for Cb is R:

dPOC=abs(C−R);

Concluding the description of this section, it is mentioned, that processing specified by equations (1-2) and (4-5) results in motion vector, if blocks in the scope are inter-coded, having refIdx !=−1.

MVP Derivation from Temporal Neighborhood

AMVP specified by HEVC requires that two MVP candidates are to be derived. If some cases, one or both spatial MVP candidates remained not available, motion information from temporally collocated block is utilized as MVP.

In HEVC, the collocated picture chosen for temporal MVP (TMVP) may be indicated using the collocated_from_l0_flag and collocated_ref_idx syntax element, both included in the slice segment header syntax structure.

Assuming that top-left corner of the current block Cb is located at spatial coordinates (x,y), location of collocated block ColocB is derived with following procedure:

refIdx_ColocB=collocated_from_l0_flag?
RefList0[collocated_ref_idx]: RefList1[collocated_ref_idx];
{y_ColocB, x_ColocB}={y, x};

To adjust motion information MV(ColocB) to motion information mV(Cb), motion vector scaling may be performed, where the scaling factor is a ratio of two POC differences, the first being the POC difference of the collocated motion vector (i.e. the POC difference of the collocated picture and the reference picture pointed to by the collocated motion vector) and the second one is the POC difference between the current picture and the picture identified by the reference index of the current block (i.e. so-called target picture). Resulting temporal MVP replaces any of MVP1/MVP2 if they are not available. In the case if temporal MVP is not available, or in the case when there is still one MVP not-available, zero motion vectors are utilized as predictors.

Depth-Enhanced Video

Let assume that we would like to view a stereoscopic video content on a stereo display.

Stereoscopic video content may be considered to consist of pairs of images that are shown separately to the left and right eye of the viewer. These image pairs may be captured with a specific stereoscopic camera setup, which has a particular stereo baseline distance between cameras.

Figure 3A:
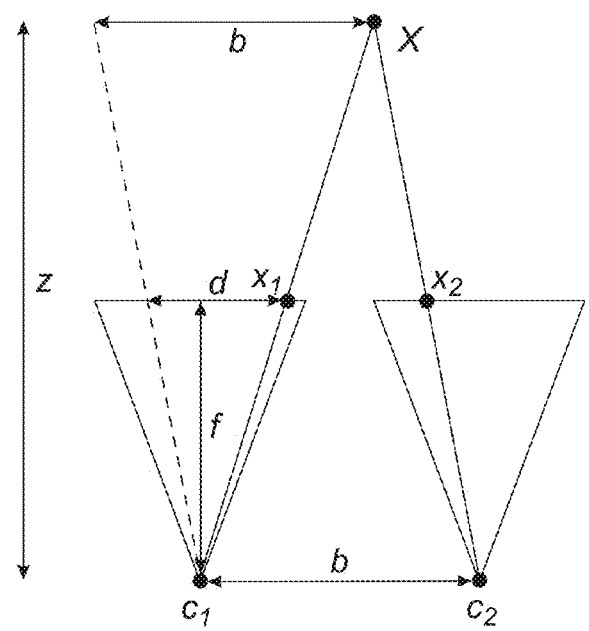
FIG. 3a shows a 2D model of stereoscopic camera setup according to an embodiment.
Figure 3B:
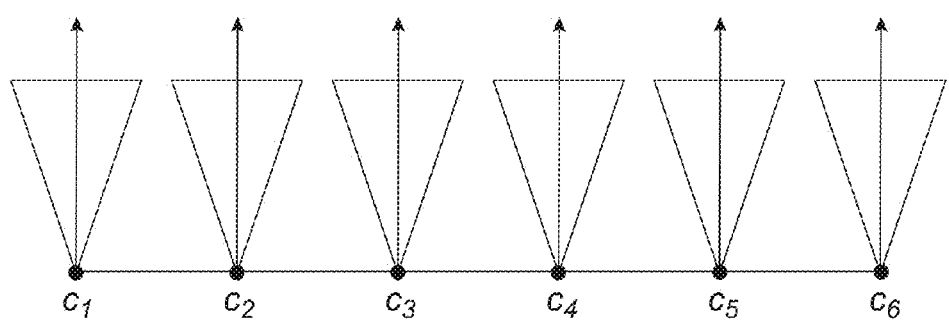
FIG. 3b shows a simplified 2D model of a multiview camera setup according to an embodiment.

FIG. 3 shows a simplified 2D model of such stereoscopic camera setup. Terms C1, C2 are stated for cameras center locations, b is a distance between centers of two cameras (stereo baseline), f—is focal length of cameras and X is an object in the real 3D scene that being captured. A real world object X is projected to different to locations in images captured by cameras C1 and C2, these locations are x1 and x2 respectively. The horizontal distance between x1 and x2 in absolute coordinates of the image may be called disparity.

Images that are captured with such camera setup may be called stereoscopic images. Disparity that is presented in these images would lead to creating or enhancing of the illusion or impression of depth.

However, currently available stereoscopic displays may significantly differ from each other in such characteristics as viewing distances and disparity shifts. Consequently, the depth or disparity range in a displayed stereo video may not match a comfortable depth range on a viewing device. A mismatch of these parameters may lead to reduced stereo experience and even to viewer's eye fatigue or nausea. In order to avoid these undesirable effects, stereo display and/or video player devices or alike connected with a stereo display should be able to adapt disparity in stereoscopic content automatically, or by providing this functionality to a viewer on demand.

Figure 4:
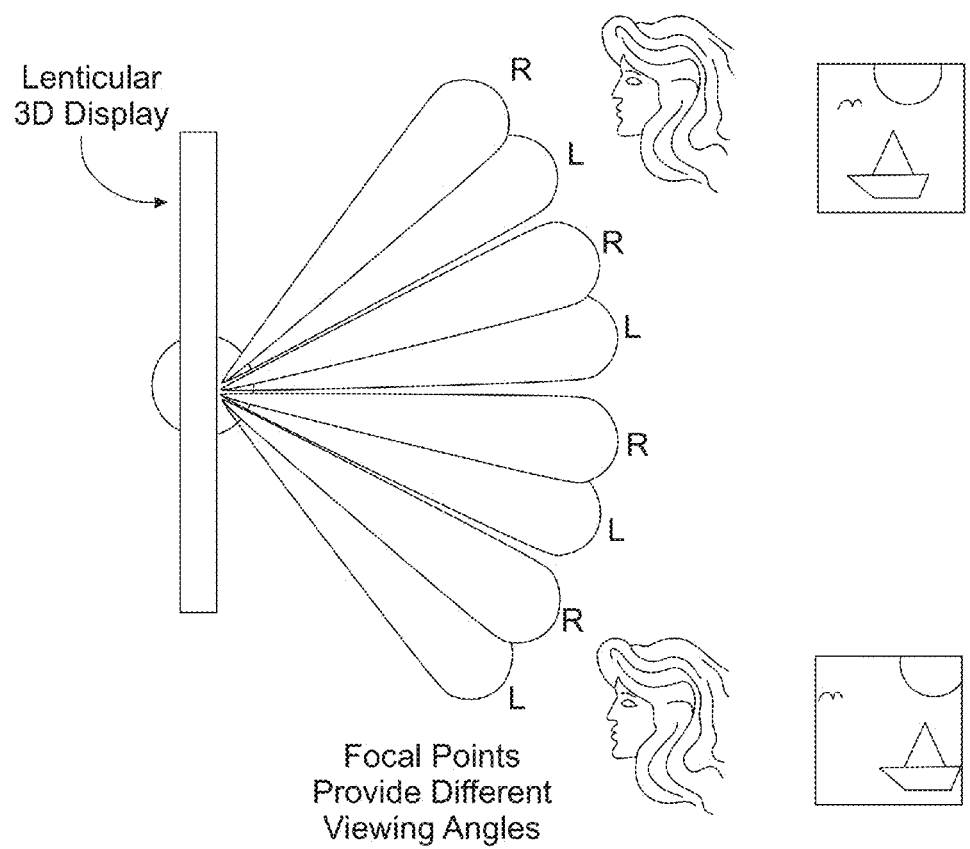
FIG. 4 shows a simplified model of multiview Auto-Steroscopic Display (ASD) according to an embodiment.

However, disparity adaptation is not a straightforward process. It requires either having additional camera views with different baseline distances (b is variable) or rendering of virtual camera views which might not have been captured by the camera setup and/or might not be represented by the coded video bitstream. FIG. 4 shows a simplified model of such multiview camera setup that suits to this solution. This setup is able to provide stereoscopic video content captured with several discrete values for stereoscopic baseline and thus allow stereoscopic display to select a pair of cameras that suits to the viewing conditions.

A more advanced approach for 3D vision is having a multiview autostereoscopic display (ASD) that does not require viewing glasses. ASD emits more than one view at a time but emitting is localized in the space in such a way that a viewer sees only a stereo pair from a specific viewpoint, see FIG. 4. Moreover, a viewer is able see another stereo pair from a different viewpoint, thus motion parallax viewing is supported if consecutive views are stereo pairs and arranged properly.

The ASD technologies may be capable of showing for example 52 or more different images at the same time, of which only a stereo pair is visible from a specific viewpoint. This supports multiuser 3D vision without viewing glasses for example in a living room environment.

The above-described stereoscopic and ASD applications and/or alike may require multiview video to be available at the display.

A multiview extension of H.264/AVC video coding standard, known as Multiview Video Coding (MVC), has been standardized as an annex to H.264/AVC. The base view of MVC bitstreams can be decoded by any H.264/AVC decoder, which facilitates introduction of stereoscopic and multiview content into existing services. MVC allows interview prediction, which can result into significant bitrate saving compared to independent coding of all views, depending on how correlated the adjacent views are. As no new low-level coding tools were introduced in MVC, existing hardware implementations of H.264/AVC are typically applicable as such for MVC.

3D Video (3DV) Coding

However, H.264/MVC offered a limited solution to the problem described above. Despite the fact that H.264/MVC is more efficient than H.264/AVC simulcast, the rate of MVC coded video is proportional to the number of views. Considering that ASD may require for example 52 views as input, the total bitrate for such number of view will in many cases overcome constraints on transmitting channel bandwidth. In addition, it is worth to mention possible complications in content production, when a great number of views needs to be captured, encoded and transmitted at the same time.

Figure 6:
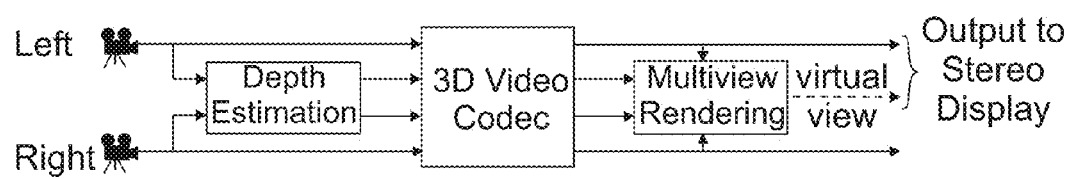
FIG. 6 shows an example of DIBR-based 3DV solution for multiview applications.

The three-dimensional video (3DV) ad-hoc group of the Moving Picture Experts Group (MPEG) and subsequently the Joint Collaborative Team on 3D Video Coding Extension Development (JCT-3V) have explored solutions for multiview applications. It was found that a more feasible solution for such a multiview application is to have a limited number of input views, e.g. mono or stereo plus supplementary data, and to render (synthesize) all required views locally in the decoding side, e.g. in the display. There are several technologies for view rendering are available, and depth-image-based rendering (DIBR) may be considered to be a competitive and well-established alternative. A typical implementation of DIBR takes a stereoscopic video and corresponding depth information with stereoscopic baseline b0 as input and synthesizes a desired number of virtual views between two input views with baseline (bi<b0). However, in order to enable DIBR-based multiview rendering, texture data should be available at the decoder side along with the corresponding depth data. A simplified model of such a DIBR-based 3DV system is shown in FIG. 6.

In such a 3DV system, depth information is typically produced at the encoder side in a form of depth pictures (also known as depth maps) for each video frame. A depth map is an image with per-pixel depth or ranging information. Each sample in a depth map may represent the distance of the respective texture sample from the plane on which the camera lies. In other words, if the z axis is along the shooting axis of the cameras (and hence orthogonal to the plane on which the cameras lie), a sample in a depth map represents the value on the z axis. Ranging information for a particular view represents distance information of a texture sample from the camera sensor, disparity or parallax information between a texture sample and a respective texture sample in another view, or similar information.

Depth-enhanced video refers to texture video having one or more views associated with depth video having one or more depth views. A number of approaches may be used for representing of depth-enhanced video, including the use of video plus depth (V+D), multiview video plus depth (MVD), and layered depth video (LDV). In the video plus depth (V+D) representation, a single view of texture and the respective view of depth are represented as sequences of texture picture and depth pictures, respectively. The MVD representation contains a number of texture views and respective depth views. In the LDV representation, the texture and depth of the central view are represented conventionally, while the texture and depth of the other views are partially represented and cover only the dis-occluded areas required for correct view synthesis of intermediate views.

In a scheme referred to as unpaired multiview video-plus-depth (MVD), there may be an unequal number of texture and depth views, and/or some of the texture views might not have a co-located depth view, and/or some of the depth views might not have a co-located texture view, some of the depth view components might not be temporally coinciding with texture view components or vice versa, co-located texture and depth views might cover a different spatial area, and/or there may be more than one type of depth view components. Encoding, decoding, and/or processing of unpaired MVD signal may be facilitated by a depth-enhanced video coding, decoding, and/or processing scheme.

Terms co-located, collocated, and overlapping may be used interchangeably to indicate that a certain sample or area in a texture view component represents the same physical objects or fragments of a 3D scene as a certain co-located/collocated/overlapping sample or area in a depth view component. In some embodiments, the sampling grid of a texture view component may be the same as the sampling grid of a depth view component, i.e. one sample of a component image, such as a luma image, of a texture view component corresponds to one sample of a depth view component, i.e. the physical dimensions of a sample match between a component image, such as a luma image, of a texture view component and the corresponding depth view component. In some embodiments, sample dimensions (twidth×theight) of a sampling grid of a component image, such as a luma image, of a texture view component may be an integer multiple of sample dimensions (dwidth×dheight) of a sampling grid of a depth view component, i.e. twidth=m×dwidth and theight=n×dheight, where m and n are positive integers. In some embodiments, dwidth=m× twidth and dheight=n×theight, where m and n are positive integers. In some embodiments, twidth=m×dwidth and theight=n×dheight or alternatively dwidth=m×twidth and dheight=n×theight, where m and n are positive values and may be non-integer. In these embodiments, an interpolation scheme may be used in the encoder and in the decoder and in the view synthesis process and other processes to derive co-located sample values between texture and depth. In some embodiments, the physical position of a sampling grid of a component image, such as a luma image, of a texture view component may match that of the corresponding depth view and the sample dimensions of a component image, such as a luma image, of the texture view component may be an integer multiple of sample dimensions (dwidth× dheight) of a sampling grid of the depth view component (or vice versa)—then, the texture view component and the depth view component may be considered to be co-located and represent the same viewpoint. In some embodiments, the position of a sampling grid of a component image, such as a luma image, of a texture view component may have an integer-sample offset relative to the sampling grid position of a depth view component, or vice versa. In other words, a top-left sample of a sampling grid of a component image, such as a luma image, of a texture view component may correspond to the sample at position (x, y) in the sampling grid of a depth view component, or vice versa, where x and y are non-negative integers in a two-dimensional Cartesian coordinate system with non-negative values only and origo in the top-left corner. In some embodiments, the values of x and/or y may be non-integer and consequently an interpolation scheme may be used in the encoder and in the decoder and in the view synthesis process and other processes to derive co-located sample values between texture and depth. In some embodiments, the sampling grid of a component image, such as a luma image, of a texture view component may have unequal extents compared to those of the sampling grid of a depth view component. In other words, the number of samples in horizontal and/or vertical direction in a sampling grid of a component image, such as a luma image, of a texture view component may differ from the number of samples in horizontal and/or vertical direction, respectively, in a sampling grid of a depth view component and/or the physical width and/or height of a sampling grid of a component image, such as a luma image, of a texture view component may differ from the physical width and/or height, respectively, of a sampling grid of a depth view component. In some embodiments, non-uniform and/or non-matching sample grids can be utilized for texture view and/or depth component. A sample grid of depth view component is non-matching with the sample grid of a texture view component when the sampling grid of a component image, such as a luma image, of the texture view component is not an integer multiple of sample dimensions (dwidth×dheight) of a sampling grid of the depth view component or the sampling grid position of a component image, such as a luma image, of the texture view component has a non-integer offset compared to the sampling grid position of the depth view component or the sampling grids of the depth view component and the texture view component are not aligned/rectified. This could happen for example on purpose to reduce redundancy of data in one of the components or due to inaccuracy of the calibration/rectification process between a depth sensor and a color image sensor.

Ranging information of real-word 3D scene depends on the content and may vary for example from 0 to infinity. Different types of representation of such ranging information can be utilized. Below some non-limiting examples of such representations are given.

Depth Value.

Real-world 3D scene ranging information can be directly represented with a depth value (Z) in a fixed number of bits in a floating point or in fixed point arithmetic representation. This representation (type and accuracy) can be content and application specific. Z value can be converted to a depth map and disparity as it is shown below.

Depth Map Value.

To represent real-world depth value with a finite number of bits, e.g. 8 bits, depth values Z may be non-linearly quantized to produce depth map values d as shown below and the dynamical range of represented Z are limited with depth range parameters Znear/Zfar.

$$d = \left\lfloor (2^N - 1) \cdot \frac{\frac{1}{z} - \frac{1}{Z_{far}}}{\frac{1}{Z_{near}} - \frac{1}{Z_{far}}} + 0.5 \right\rfloor$$

In such representation, N is the number of bits to represent the quantization levels for the current depth map, the closest and farthest real-world depth values Znear and Zfar, corresponding to depth values ($2^N-1$) and 0 in depth maps, respectively. The equation above could be adapted for any number of quantization levels by replacing $2^N$ with the number of quantization levels. To perform forward and backward conversion between depth and depth map, depth map parameters (Znear/Zfar, the number of bits N to represent quantization levels) may be needed.

Disparity Map Value.

Every sample of the ranging data can be represented as a disparity value or vector (difference) of a current image sample location between two given stereo views. For conversion from depth to disparity, certain camera setup parameters (namely the focal length f and the translation distance l between the two cameras) may be required:

$$D = \frac{f \cdot l}{Z}$$

Disparity D may be calculated out of the depth map value v with the following equation:

$$D = f \cdot l \cdot \left( \frac{d}{(2^2 - 1)} \left( \frac{1}{Z_{near}} - \frac{1}{Z_{far}} \right) + \frac{1}{Z_{far}} \right)$$

Disparity D may be calculated out of the depth map value v with following equation:

$$D = (w*v+o)>>n,$$

where w is a scale factor, o is an offset value, and n is a shift parameter that depends on the required accuracy of the disparity vectors. An independent set of parameters w, o and n required for this conversion may be required for every pair of views.

Other forms of ranging information representation that take into consideration real world 3D scenery can be deployed.

A depth view refers to a view that represents distance information of a texture sample from the camera sensor, disparity or parallax information between a texture sample and a respective texture sample in another view, or similar information. A depth view may comprise depth pictures (a.k.a. depth maps) having one component, similar to the luma component of texture views. A depth map is an image with per-pixel depth information or similar. For example, each sample in a depth map represents the distance of the respective texture sample or samples from the plane on which the camera lies. In other words, if the z axis is along the shooting axis of the cameras (and hence orthogonal to the plane on which the cameras lie), a sample in a depth map represents the value on the z axis. The semantics of depth map values may for example include the following:

Each luma sample value in a coded depth view component represents an inverse of real-world distance (Z) value, i.e. 1/Z, normalized in the dynamic range of the luma samples, such to the range of 0 to 255, inclusive, for 8-bit luma representation. The normalization may be done in a manner where the quantization 1/Z is uniform in terms of disparity.

Each luma sample value in a coded depth view component represents an inverse of real-world distance (Z) value, i.e. 1/Z, which is mapped to the dynamic range of the luma samples, such to the range of 0 to 255, inclusive, for 8-bit luma representation, using a mapping function f(1/Z) or table, such as a piece-wise linear mapping. In other words, depth map values result in applying the function f(1/Z).

Each luma sample value in a coded depth view component represents a real-world distance (Z) value normalized in the dynamic range of the luma samples, such to the range of 0 to 255, inclusive, for 8-bit luma representation.

Each luma sample value in a coded depth view component represents a disparity or parallax value from the present depth view to another indicated or derived depth view or view position.

The semantics of depth map values may be indicated in the bitstream for example within a video parameter set syntax structure, a sequence parameter set syntax structure, a video usability information syntax structure, a picture parameter set syntax structure, a camera/depth/adaptation parameter set syntax structure, a supplemental enhancement information message, or anything alike.

While phrases such as depth view, depth view component, depth picture and depth map are used to describe various embodiments, it is to be understood that any semantics of depth map values may be used in various embodiments including but not limited to the ones described above. For example, embodiments of the invention may be applied for depth pictures where sample values indicate disparity values.

An encoding system or any other entity creating or modifying a bitstream including coded depth maps may create and include information on the semantics of depth samples and on the quantization scheme of depth samples into the bitstream. Such information on the semantics of depth samples and on the quantization scheme of depth samples may be for example included in a video parameter set structure, in a sequence parameter set structure, or in an SEI message.

A texture view component may be defined as a coded representation of the texture of a view in a single access unit. A texture view component in depth-enhanced video bitstream may be coded in a manner that is compatible with a single-view texture bitstream or a multi-view texture bitstream so that a single-view or multi-view decoder can decode the texture views even if it has no capability to decode depth views. For example, an H.264/AVC decoder may decode a single texture view from a depth-enhanced H.264/AVC bitstream. A texture view component may alternatively be coded in a manner that a decoder capable of single-view or multi-view texture decoding, such H.264/AVC or MVC decoder, is not able to decode the texture view component for example because it uses depth-based coding tools. A depth view component may be defined as a coded representation of the depth of a view in a single access unit. A view component pair may be defined as a texture view component and a depth view component of the same view within the same access unit.

Depth-enhanced video may be coded in a manner where texture and depth are coded independently of each other. For example, texture views may be coded as one MVC bitstream and depth views may be coded as another MVC bitstream. Depth-enhanced video may also be coded in a manner where texture and depth are jointly coded. In a form a joint coding of texture and depth views, some decoded samples of a texture picture or data elements for decoding of a texture picture are predicted or derived from some decoded samples of a depth picture or data elements obtained in the decoding process of a depth picture. Alternatively or in addition, some decoded samples of a depth picture or data elements for decoding of a depth picture are predicted or derived from some decoded samples of a texture picture or data elements obtained in the decoding process of a texture picture. In another option, coded video data of texture and coded video data of depth are not predicted from each other or one is not coded/decoded on the basis of the other one, but coded texture and depth view may be multiplexed into the same bitstream in the encoding and demultiplexed from the bitstream in the decoding. In yet another option, while coded video data of texture is not predicted from coded video data of depth in e.g. below slice layer, some of the high-level coding structures of texture views and depth views may be shared or predicted from each other. For example, a slice header of coded depth slice may be predicted from a slice header of a coded texture slice. Moreover, some of the parameter sets may be used by both coded texture views and coded depth views.

Texture views and depth views may be coded into a single bitstream where some of the texture views may be compatible with one or more video standards such as H.264/AVC and/or MVC. In other words, a decoder may be able to decode some of the texture views of such a bitstream and can omit the remaining texture views and depth views.

An amendment has been specified for the H.264/AVC for depth map coding. The amendment is called MVC extension for inclusion of depth maps and may be referred to as MVC+D. The MVC+D amendment specifies the encapsulation of texture views and depth views into the same bitstream in a manner that the texture views remain compatible with H.264/AVC and MVC so that an MVC decoder is able to decode all texture views of an MVC+D bitstream and an H.264/AVC decoder is able to decode the base texture view of an MVC+D bitstream. Furthermore, the VCL NAL units of the depth view use identical syntax, semantics, and decoding process to those of texture views below the NAL unit header.

Development of another amendment for the H.264/AVC is ongoing at the time of writing this patent application. This amendment, referred to as 3D-AVC, requires at least one texture view to be H.264/AVC compatible while further texture views may be (but need not be) MVC compatible.

An encoder that encodes one or more texture and depth views into a single H.264/AVC and/or MVC compatible bitstream may be called as a 3DV-ATM encoder. Bitstreams generated by such an encoder may be referred to as 3DV-ATM bitstreams and may be either MVC+D bitstreams or 3D-AVC bitstreams. The texture views of 3DV-ATM bitstreams are compatible with H.264/AVC (for the base view) and may be compatible with MVC (always in the case of MVC+D bitstreams and as selected by the encoder in 3D-AVC bitstreams). The depth views of 3DV-ATM bitstreams may be compatible with MVC+D (always in the case of MVC+D bitstreams and as selected by the encoder in 3D-AVC bitstreams). 3D-AVC bitstreams can include a selected number of AVC/MVC compatible texture views. Furthermore, 3D-AVC bitstreams can include a selected number of depth views that are coded using the coding tools of the AVC/MVC standard only. The other texture views (a.k.a. enhanced texture views) of an 3D-AVC bitstream may be jointly predicted from the texture and depth views and/or the other depth views of an 3D-AVC bitstream may use depth coding methods not included in the AVC/MVC/MVC+D standard presently. A decoder capable of decoding all views from 3DV-ATM bitstreams may be called as a 3DV-ATM decoder.

Codecs for multiview-video-plus-depth (MVD) may include depth-based coding tools for texture and/or texture-based coding tools for depth. For example, view synthesis prediction, described below, may be applied.

Inter-component prediction may be defined to comprise prediction of syntax element values, sample values, variable values used in the decoding process, or anything alike from a component picture of one type to a component picture of another type. Codecs for multiview-video-plus-depth (MVD) may utilize inter-component prediction between from texture to depth or vice versa. For example, inter-component prediction may comprise prediction of a texture view component from a depth view component, or vice versa.

Forward View Synthesis Prediction in 3DV Coding

Figure 7:
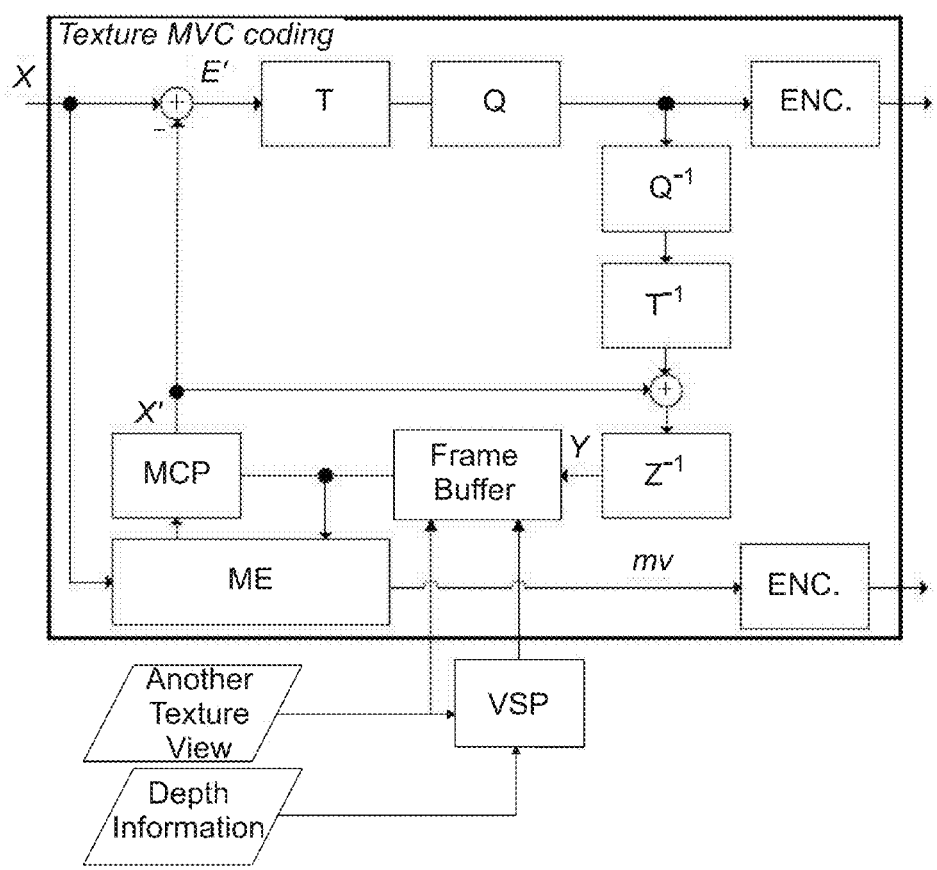
FIG. 7 shows a flowchart of VSP-enabled multi-view video encoder according to an embodiment.

View synthesis can be utilized in the loop of the codec, thus providing view synthesis prediction (VSP). A view synthesis picture (which may also be referred to as a synthetic reference component) is synthesized from coded texture views and depth views and contains samples that may be used for VSP, see FIG. 7.

In-loop View Synthesis Prediction (VSP) is supported in 3DV-ATM for enhanced texture coding although it could conceptually be used also as a depth coding tool. To enable VSP for coding of the current view, the previously coded texture and depth view components of the same access unit or the same time instant may be used for the view synthesis. Such a view synthesis that uses the previously coded texture and depth view components of the same access unit or the same time instant may be referred to as forward view synthesis or forward-projected view synthesis, and similarly VSP using such view synthesis may be referred to as forward VSP or forward-projected VSP.

View synthesis algorithm of VSP may use depth map (d) to disparity (D) conversion with following mapping pixels of source picture s(x,y) in a new pixel location in synthesized target image t(x+D,y).

$$t(\lfloor x + D \rfloor, y) = s(x, y),$$

$$D(s(x, y)) = \frac{f \cdot l}{z}$$

$$z = \left( \frac{d(s(x, y))}{255} \left( \frac{1}{Z_{near}} - \frac{1}{Z_{far}} \right) + \frac{1}{Z_{far}} \right)^{-1}$$

In the case of projection of a texture picture, s(x,y) is a sample of texture image, and d(s(x,y)) is the depth map value associated with s(x,y). If a reference frame used for synthesis uses 4:2:0 sampling (i.e. the chroma component pictures have a spatial resolution half of that of the luma component picture along both coordinate axes), the chroma components may be upsampled to 4:4:4 by repeating the sample value:

$$s'_{chroma}(x,y) = s_{chroma}(\lfloor x/2 \rfloor, \lfloor y/2 \rfloor)$$

where $s'_{chroma}(\cdot,\cdot)$ is the chroma sample value in full resolution, and $s_{chroma}(\cdot,\cdot)$ is the chroma sample value in half resolution.

In the case of projection of depth map values, s(x,y)=d(x,y) and this sample is projected using its own value d(s(x,y))=d(x,y).

VSP may include warping in sub-pixel accuracy, for which upsampling on the reference frame may be performed before warping and the synthesized frame may be downsampled back to the original resolution.

The view synthesis process may consist of two conceptual steps: forward warping and hole filling. In forward warping, each pixel of the reference image is mapped to a synthesized image for example using the equation above. When multiple pixels from reference frame are mapped to the same sample location in the synthesized view, the pixel associated with a larger depth value (closer to the camera) may be selected to represent that sample location. After warping all pixels, there may be some hole pixels left with no sample values mapped from the reference frame, and these hole pixels may be filled in for example with a line-based directional hole filling, in which a "hole" is defined as consecutive hole pixels in a horizontal line between two non-hole pixels. Hole pixels in a hole may be filled by one of the two adjacent non-hole pixels which has a smaller depth sample value (farther from the camera).

Warping and hole filling may be performed in a single processing loop for example as follows. Each pixel row of the input reference image is traversed from left to right, and each pixel in the input reference image is processed as follows:

1. The current pixel is mapped to the target synthesis image according to the depth-to-disparity mapping/warping equation above. Pixels around depth boundaries may use splatting, in which one pixel is mapped to two neighboring locations. A boundary detection may be performed every N pixels in each line of the reference image. A pixel may be considered a depth-boundary pixel if the difference between the depth sample value of the pixel and that of a neighboring one in the same line (which is N-pixel to the right of the pixel) exceeds a threshold (corresponding to a disparity difference of M pixels in integer warping precision to the synthesized image). The depth-boundary pixel and K neighboring pixels to the right of the depth-boundary pixel may use splatting. More specifically, N=4×UpRefs, M=4, K=16× UpRefs−1, where UpRefs is the upsampling ratio of the reference image before warping.

2. When the current pixel wins the z-buffering, i.e. when the current pixel is warped to a location without previously warped pixel or with a previously warped pixel having a smaller depth sample value, the iteration is defined to be effective and the following steps may be performed. Otherwise, the iteration is ineffective and the processing continues from the next pixel in the input reference image.

If there is a gap between the mapped locations of this iteration and the previous effective iteration, a hole may be identified.

If a hole was identified and the current mapped location is at the right of the previous one, the hole may be filled.

If a hole was identified and the current iteration mapped the pixel to the left of the mapped location of the previous effective iteration, consecutive pixels immediately to the left of this mapped location may be updated if they were holes.

To generate a view synthesized picture from left reference view, the reference image may be first flipped and then the above process of warping and hole filling may be used to generate an intermediate synthesized picture. At last, the intermediate synthesized picture may be flipped to obtain the synthesized picture. Alternatively, the process above may be altered to perform depth-to-disparity mapping, boundary-aware splatting, and other processes for view synthesis prediction basically with reverse assumptions on horizontal directions and order.

Another description of a view synthesis prediction process is provided in the following.

Inputs of this process are decoded a luma component of the texture view component srcPicY, two chroma components srcPicCb and srcPicCr up-sampled to the resolution of srcPicY, and a depth picture DisPic.

Outputs of this process is a sample array of a synthetic reference component vspPic which is produced through disparity-based warping:

```
for( j = 0; j < PicHeigh ; j++ ) {
    for( i = 0; i < PicWidth; i++ ) {
        dX = Disparity(DisPic(j,i));
        outputPicY[ i+dX, j ] = srcTexturePicY[ i, j ];
```

```
if( chroma_format_idc = = 1 ) {
    outputPicCb[ i+dX, j ] = normTexturePicCb[ i, j ]
    outputPicCr[ i+dX, j ] = normTexturePicCr[ i, j ]
  }
 }
}
``` where function "Disparity( )" converts a depth map value at spatial location i,j to a disparity value dX.

Disparity is computed taking into consideration camera settings, such as translation between two views b, camera's focal length f and parameters of depth map representation (Znear, Zfar) as shown below:

$$dX(i, j) = \frac{f \cdot b}{z(i, j)}; \quad (1)$$

$$z(i, j) = \frac{1}{\frac{DisPic(i, j)}{255}\left(\frac{1}{Z_{near}} - \frac{1}{Z_{far}}\right) + \frac{1}{Z_{far}}}$$

The vspPic picture resulting from described above process is typically features various warping artifacts, such as holes and/or occlusions and to suppress those artifacts, various post-processing operations may be applied.

However, these operations may be avoided to reduce computational complexity, since a view synthesis picture vspPic is utilized for a reference pictures for prediction and never outputted to a display.

A synthesized picture, e.g. {outputPicY, outputPicCb, outputPicCr}, may be included in the initial reference picture lists, such as List0 and List1, for example following temporal and inter-view reference frames. Alternatively or in addition, reference picture list modification syntax (i.e., RPLR commands) may be used to order VSP reference pictures in specific locations in the reference picture lists, such as List0 and List1, thus the encoder may select any ordering of reference picture lists.

Similarly processes of motion information derivation and their applications in VSP may remain similar or identical to processes specified for inter and inter-view prediction of H.264/AVC, clauses H.8.3. A VSP reference picture may be treated as a long-term reference picture in the process for motion-compensated prediction.

Therefore, introducing VSP in 3DV-ATM might not affect such low level operations as motion information signaling and decoding, thus preserving low-level compatibility with existing H.264/AVC coding standard.

Alternatively or in addition, specific coding modes for VSP may be specified and signaled by the encoder in the bitstream. For example, in a VSP skip/direct mode the motion vector difference (de)coding and the (de)coding of the residual prediction error for example using transform-based coding may also be may be omitted. For example, if an MB is indicated within the bitstream to be coded using a skip/direct mode, it may be further indicated within the bitstream whether a VSP frame is used as reference.

Forward VSP may be implemented in a frame level, i.e. synthesizing a complete frame to be used as reference picture, for example using one of the VSP processes described above. However, frame-based VSP implementation may be significantly burdensome in terms of computational complexity, storage requirement, and memory access bandwidth. It is possible to implement forward VSP for a set of pixel lines, e.g. covering a line of macroblocks or all macroblock lines covering the current slice, at a time. It is further possible to use a block-based forward VSP (BB-FVSP) using a two-way projection approach:

a. Ranging information d(Cb) in the view #1 is converted to a disparity values D(Cb).

b. Disparity samples of D(Cb) are analyzed to find minimal and maximal disparity values within the D(Cb) block, min_D and max_D correspondingly.

c. Disparity values min_D and max_D specify VSP source regions size of M×N in Texture (VSP_T) and depth images (VSP_D, such that VSP_D=d(VSP_T)) of view #0, where M is a size of the VSP source region in vertical direction (number of lines) and N=(max_D−min_D+1) is the size of source regions in horizontal direction.

d. Value K1 is estimated in such a way that arithmetic modulo operations with dividend (N+K1) and divisor n produces zero. Value K2 is estimated in such a way such that arithmetic modulo operations with dividend (M+K2) and divisor m produces zero e. VSP source blocks {VSP_T and VSP_D} are extended in horizontal direction by K1 and in vertical direction by K2 pixels in both or in either of sides, in order to form a VSP source region size of (M+K2)×(N+K1).

f. VSP source region (VSP_T and VSP_D) in view #0 is split in integer number of not-overlapping blocks (Projection Block Units (PBU) of a fixed size (m×n) and VS process of each PBU is performed separately.

g. VS process, such as those described above, utilizes VSP source information (VSP_T and VSP_D) of view #0 which is processed in a fixed-size PBUs and produces a referenced area R(Cb) in VSP frame associated with a coded frame of view #1.

Backward View Synthesis Prediction in 3DV Coding

As earlier VSP methods, coding/decoding of block Cb in texture/video of view #N is performed with usage of reference texture/video data of view #i (where i≠N), also referred to as Ti, that serves as a VSP-source and provides image samples for view synthesis process.

In the following, some characteristic aspects of B-VSP are summarized:

1. Availability of depth/disparity information d(Cb) prior to the respective texture block Cb in encoding/decoding. The coding/decoding of block Cb in texture/video view #N is performed with depth/depth map/disparity or any other ranging information d(Cb) which is associated with this texture information Cb and range information and is available prior to coding/decoding of texture block. For example a depth view component DN may precede in (de)coding and/or bitstream order the texture view component TN of the same view #N.

2. Reference area R(Cb) for VSP. VSP for a texture block Cb results in producing/calculation pixel/sample values in reference area R(Cb) in a reference image Ti. The reference area R(Cb) may be the prediction block for Cb, or the reference area R(Cb) may be used to derive the prediction block for Cb for example through motion-compensated prediction and/or sub-pixel value interpolation within R(Cb).

3. Backward projection. VSP is performed with a backward projection approach and may utilize at least some of the following steps:

a. Ranging information dN(Cb) associated with coded block Cb in the view #N is converted to a disparity information Di(Cb) which is specify spatial coordinates offset between samples of current view #N and reference view #i.

Conversion to disparity can be performed in a pixel-wise. For every reference view #i that is available at moment of coding/decoding of the current view #N independent Di(Cb) is computed/estimated. Alternatively, conversion to disparity can be done block-wise so that a value dN(Cb') is derived for example by averaging values of dN(Cb), applying a median filter to values of dN(Cb), or applying any other function or filter over all the samples in dN(Cb). Then, dN(Cb') may be converted to the respective disparity value Di(Cb') using conventional depth-to-disparity mapping. Alternatively, conversion to disparity can be done block-wise so that disparity information Di(Cb) is processed for example by averaging values of Di(Cb), applying a median filter to value os Di(Cb), or applying any other function or filter over all the samples in Di(Cb) to produce a value Di(Cb").

b. Disparity information of Di(Cb) (or respectively Di(Cb') or Di(Cb")) is utilized to locate sample values in texture of reference view #i and may be utilized to locate ranging information di(Cb), e.g. samples of depth map image in reference view #i, that are associated with texture samples. If Di(Cb) is a block of disparity values, then sample values of texture reference view #i may be located pixel-wise. If Di(Cb) represents a single disparity value for a block of pixels, then sample values of texture reference view #i may be located block-wise. The located samples are copied to R(Cb). The location and/or copying may also be referred to projecting, mapping, or warping.

c. Producing of R(Cb) may include various processing of pixels of reference view #i (i.e., Ti), e.g. spatial or temporal filtering, filtering using weighted prediction parameters to compensate luminance changes, or non-linear processing to handle occlusions or holes, or others. Such processing may performed before or after projecting the pixels to R(Cb).

A consequence of backward projection in the VSP is that arbitrary R(Cb) derivation order is supported. In other words that pixel values of R(Cb) may be produced independently for each Cb, and no dependency on the order of processed blocks is assumed. Therefore, identical pixel values of R(Cb) to be produced by a view synthesis process for a single Cb, or by view synthesis process entire a frame-level. This property enables implementation of the presented backward VSP as a frame-level or slice-level that does not require changes in the block-level coding/decoding compared to existing coding methods such as H.264/MVC. However, the property also enables block-level implementation, which may consume a smaller amount of memory.

In the following, some supplementary characteristic aspects of B-VSP are summarized. Zero or more of these aspects may be additionally used with the aspects listed above.

1. Block-based multi-hypothesis prediction from more than one VSP reference frame. The invention specifies that bi-prediction or any other type of multi-hypothesis prediction may use two or more VSP reference frames as reference. Bi-prediction may be weighted, for example to compensate illumination differences between views.

2. Sample-based R(Cb) derivation from multiple VSP source images. If multiple VSP-source images are available for R(Cb) sample value calculation, various processing may be applied to produce actual texture sample for R(Cb). This processing may include but is not limited to conditional selection (e.g. texture sample with closer depth value is selected, or smaller depth value is selected) or aggregating multiple candidates into a samples.

3. Depth/disparity-based R(Cb) derivation. Corresponding sample values of di(Cb) and dN(Cb) may be compared using different similarity or difference metrics, such as Sum of Absolute Differences (SAD). A difference metric may be derived for a block di(Cb) or individual samples of di(Cb). If a difference belong to a certain range, texture samples of reference view #i that are specified by disparity Di(Cb) are utilized for producing sample values of the reference area R(Cb).

Motion Vector Prediction and Multi-View Coding in 3D-ATM

The current design of MVP in 3D-ATM may considered to comprise the following prediction modes:

1) Temporal prediction (TP)
2) Inter-view prediction (IVP)
  a) Generic mode
  b) Inter-view Direct/Skip
3) View Synthesis prediction (VSP)
  a) Generic mode
  b) VSP Direct/VSP Skip mode In some embodiments, IVP.a and VSP.a (generic modes) are conceptually merged into a single prediction mode.

Inter-View Prediction (IVP) in Generic Mode, IVP.a

An encoder may perform a motion search in inter-view reference frame and include in a bitstream and/or signal to the decoder a reference index and a differential motion vector {refIdx, dMVx and dMVy}. The dMVx and dMVy components are predicted from the MVP process. In many cases MVP represents a Disparity(Cb) value.

Inter-View Direct/Skip Modes, IVP.b

Inter-view direct/skip modes may be considered to operate similarly to direct/skip modes for single-view H.264/AVC with the exception that one or more of the reference pictures involved in the prediction process may be inter-view reference pictures. As POC-based scaling of motion vectors could result into division by zero in some cases (due to the fact that pictures in the same access unit have the same POC), the temporal direct mode may be disabled.

View-Synthesis Prediction (VSP) in Generic Mode, VSP.a

The VSP.a coding mode can be considered a special case of inter-view prediction, such as IVP.a, with implicit signaling of motion vectors.

A VSP frame (which may also be known as a VSP picture or synthetic reference picture or VSP reference picture) may be generated (e.g. for all or some texture views from which the current view is indicated to be dependent on) by an encoder and/or a decoder for example using a backward view synthesis process, such as described above, at a certain block size which may be pre-defined for example in a coding standard or determined and indicated in a bitstream by the encoder and decoded from the bitstream by the decoder.

When using the VSP.a mode, an encoder may perform motion search in a VSP frame, which may be generated as an entire frame in the encoder side. The motion search in a VSP frame may be limited to a single motion vector (0,0) and may effectively result in a partition selection (4×4, 8×8 and so on) only. Following the selection of partitions, a reference index refIdx to indicate the VSP frame may be included in the bitstream and/or signaled to the decoder and dMVx and dMVy may not be included in the bitstream or signaled.

The decoder may decode the reference index refIdx from the bitstream and/or signaling and conclude that it indicates a VSP frame. Consequently, the decoder may conclude that the bitstream does not include dMVx and dMVy or may skip the decoding of dMVx and dMVy. Furthermore, the decoder may infer the motion vector for the current block to be {0,0}.

The coded block with such motion information {refIdx, 0,0} may be input to a view synthesis process for a given block or motion partition size.

In turn, the view synthesis (VS) may be implemented as a block-based process independent from motion partitioning. VS may be pre-defined to use a certain block size (for example in a coding standard) or the encoder may select a block size for VS and indicate it in the bitstream, for example in a sequence parameter set or in a picture parameter set. Every elementary block for the VS process features individual disparity vector. A disparity vector for a VS block may be computed for example as presented above for B-VSP. For every motion partition, a spatial splitting or partitioning into non-overlapping blocks of the VS block size may be performed in the encoder and/or in the decoder as part of the VSP. Then, independent motion or disparity vectors for each of the VS blocks may computed for example based on the corresponding disparity block d(Cb), for example using a maximum disparity value out of the four corner samples of the disparity block d(Cb).

Disparity Derivation

3D-AVC specifies DMVP and VSP coding tools that applied for coding of texture samples of dependent views with help of associated depth map samples. For these purposes, selected depth map samples are converted to disparity vectors and utilized by DMVP and VSP.

Disparity value D has a linear relationship with depth map value d as equation (1) shows:

$$D = f \cdot l \cdot \left( \frac{d}{(2^{BitDepth} - 1)} \left( \frac{1}{Z_{near}} - \frac{1}{Z_{far}} \right) + \frac{1}{Z_{far}} \right) \quad (1)$$

Depth to disparity conversion can be performed as in equation (1) and requires such camera parameters as Znear, Zfar, focal length f and translation between views 1. This method preserves a floating point representation of information and thus provides a high accuracy. However, such high accuracy of representation may be considered as unnecessary complicated as it requires floating point representation.

Simplified Calculations of Disparity utilizes a linear model to establish correspondence between depth map value d and disparity D as it shown in (2):

$$D = (d*DisparityScale + DisparityOffset << BitDepth) + (1 << (\log 2\ Div - 1))) >> \log 2\ Div \quad (2)$$

where d is a depth sample value derived by NDR lookup table as shown in Section 2.1.

DisparityScale is a scale factor, DisparityOffset is an offset value, BitDepth is equal to 8 and log 2 Div is a shift parameter that depends on the required accuracy of the disparity vectors. Parameters of conversion DisparityScale and DisparityOffset are transmitted within a bitstream with conventional variable length coding. For every pair of views (source view and target view) utilized in joint coding an independent set of parameters DisparityScale and DisparityOffset are transmitted.

To perform depth to disparity derivation (2), the association between a block of texture samples and a block of depth samples may be established for example through the following two alternatives:

Maximal Out of Four Corners

The disparity for currently coded texture block Cb vector may be derived from a block of depth map data d(Cb) associated with currently coded texture block Cb. Depth map samples located at spatial coordinates of four corners (top-left, top-right, bottom-left, bottom-right) of d(Cb) may be compared against each other and the maximal depth map value among them may be converted to disparity value, as specified in equation (2). In the case of reduced resolution depth map (compared to the resolution of the respective texture image), spatial coordinates of texture block corners may be downscaled to meet depth map resolution.

Neighboring Blocks Based Derivation

Another approach to derive disparity vector may be utilized for example in disparity based Skip and Direct modes. The disparity vector may be derived from motion information of blocks neighboring to the current Cb block and from the associated block d(Cb) of depth data. The block naming convention utilized in this section is shown in FIGS. 5a and 5b. The flowchart of derivation procedure is given in FIG. 5c.

Specifically, the disparity vector may be derived from the motion vectors of neighboring blocks A, B, and C (D). If only one of the neighboring blocks was coded with inter-view prediction, its motion vector may be interpreted as disparity vector for current Cb. If multiple inter-view prediction vectors are available in blocks A, B, C (D), the disparity vector may be derived as a median of available alternatives. If none of neighboring blocks A, B, C(D) was coded with inter-view prediction, another disparity derivation procedure may be used, such as the described maximal out of four corners. to derive disparity from depth map.

VSP Direct/VSP Skip Modes, VSP.b

VSP skip and direct modes may considered to be otherwise identical to the generic mode (VSP.a) above but the indication of the coding mode and the selection of VSP reference picture may be realized in differently in the syntax.

It may be indicated in the slice data syntax whether a macroblock uses a regular skip mode or a VSP skip mode. When context-adaptive VLC is in use, the indication may be done with a 1-bit flag (which may be called mb_skip_type_flag) indicated for each macroblock coded with a skip mode. When CABAC is in use and the macroblocks above and on the left have been coded with VSP skip mode, the syntax may include a CABAC-coded flag (which may be called mb_vsskip_flag), which, when equal to 1, indicates that the coding mode of the macroblock is VSP skip. If the flag is equal to 0, it may be followed by a CABAC-coded flag (which may be called mb_skip_flag) indicating whether or not a conventional skip mode is in use. When CABAC is in use but either or both the macroblocks above and on the left have not been coded with VSP skip mode, the flags may be in opposite order in the bitstream, i.e. the mb_skip_flag may appear first, followed by mb_vskip_flag in case mb_skip_flag is equal to 0.

When the macroblock is indicated to apply a direct mode (e.g. with the mb_type syntax element), an additional syntax element (which may be referred to as mb_direct_type_flag) may be included in the macroblock layer syntax. The syntax element may be coded with context-adaptive VLC or CABAC, depending on which entropy coding mode is in use. When equal to 0, the flag may indicate that a conventional direct mode is in use. When equal to 1, the flag may indicate that the VSP direct mode is in use.

The reference index and motion vector for VSP skip and direct modes may be set as follows. The reference index refIdxLX for a VSP skipped/direct macroblock is derived as the synthetic reference component that appears first in the reference picture list X, with X being replaced by 0 or 1. The motion vector applied in VSP direct/skip modes is equal to 0,0.

Examples

In the context of the present embodiments, various problems in the current development of 3D video coding have been determined. It is to be understood that determining these problems is not obvious to a skilled person without hindsight, and therefore, the identification of the problems can be considered as part of the invention.

Currently, there are two standardization developments conducted by the JCT-3V and MPEG 3DV targeting advanced depth enhanced 3D video coding. First is 3D-AVC which is based on H.264/AVC coding technology and second is 3D-HEVC, which utilizes HEVC as a base technology. Both of these developments considers VSP as a key component for improving inter-view redundancy present in MVD data. However, it is anticipated that current harmonization of VSP into the MCP process is not sufficient. We present a brief explanation of the problem for 3D-AVC design, however the same problem is valid for 3D-HEVC development.

The VSP.a includes the following operations related to refIdx, MVx and MVy.

A VSP reference picture is included in one or more reference picture lists. A VSP reference picture uses a different reference picture index than that for the inter-view reference picture (even though the sample arrays of these two pictures are identical).

As a different reference index is used for the respective VSP and inter-view reference pictures, there exists a greater number of reference pictures in one or more reference picture lists and hence the codewords to indicate which reference picture is in use for a particular block may become longer on average.

As respective VSP and inter-view reference pictures are logically different reference pictures, motion information of a block using a VSP reference picture is not used for motion vector prediction (as spatial and/or temporal neighbor) for a block using an inter-view reference picture or vice versa.

A current 3D-AVC draft standard sets MVx and MVy to {0,0} in the case refIdx is found to be a VSP picture.

It can be considered that the use of motion vector {0,0} in the case refIdx points to a VSP picture is based on an assumption that complete VSP frame is created, therefore VSP prediction should use collocated block with the same coordinates as current Cb. However, prediction blocks produced with BVSP are composed with no usage of MVx, and MVy. This block is split in non-overlapping blocks of predefined size (e.g. 2×2 or 4×4) and for each of these blocks disparity value is derived independently of motion partitions. Therefore, setting MVx and MVy to zero can be considered redundant.

The problems exposed above may penalize the coding performance of 3D-AVC.

The various embodiments harmonize coding of view synthesis prediction (VSP) and inter-view prediction (IVP). With various embodiments, VSP and IVP may be considered to become a part of an identical process with the only difference in deriving of motion vector information.

For any motion partition (MP) or Predicted Unit (PU), some embodiments specify the use of explicit signaling of motion information in the case of IVP and implicit signaling (decoder-derived) of motion information in the case of VSP.

Various embodiments provide motion partition/PU-level signaling of prediction direction or prediction mode selection between VSP and IVP modes (ivp_vsp_opt), which may control the presence of motion vectors or motion vector differences signaled in the bitstream for current MP/PU.

Various embodiments also provide signaling at higher levels (slice/tiles/picture/sequence) the mode for harmonized VSP/IVP signaling at the macroblock level (or alike) and/or below. For example in some circumstances, the encoder may choose to disable harmonized signaling.

Figure 8A:
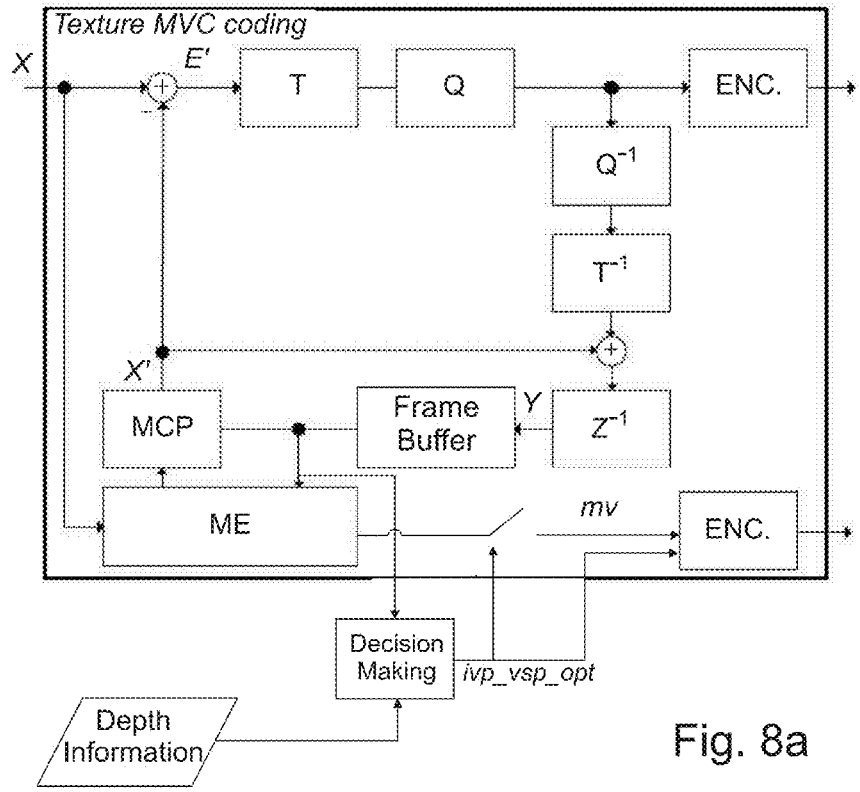
FIG. 8a shows a flowchart of ME/MCP chain for VSP-based encoding according to an embodiment.
Figure 8B:
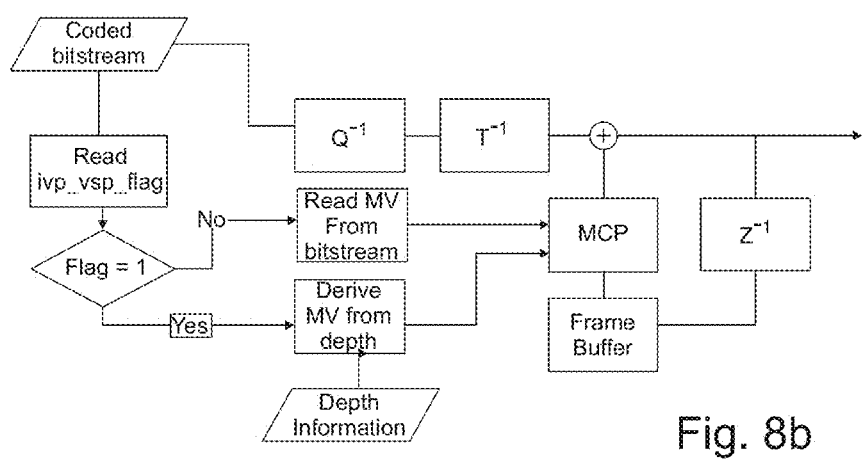
FIG. 8b shows a flowchart of ME/MCP chain for VSP-based decoding according to an embodiment.

FIGS. 8a and 8b show a block diagrams of ME/MCP chain of texture coding with use of the proposed VSP. Note that VSP does not necessarily produce a complete VSP frame, but produces only reference area R(Cb) on request from ME/MCP chain.

FIG. 8a shows an example of an encoding process with a method according to an embodiment. The conventional elements such as transform T, quantization Q and their inverse operations in the coding loop, the frame buffer, motion compensated prediction MCP, motion estimation ME and bitstream encoding ENC are shown. Additionally, switch operated on decision making between IVP or VSP is introduced, controlling whether or not motion vectors are encoded into the bitstream and correspondingly, whether motion vectors are constructed using depth information. Also, the signaling element, here called ivp_vsp_opt is encoded into the bitstream.

FIG. 8b shows an example of decoding process with a method according to an embodiment. Blocks marked in red color mark a processing module of a decoder that are either introduced to the conventional design or modified. Thus, reading ivp_vsp_flag from bitstream and making decision IVP or VSP is introduced as well as conditional application of reading MV from bitstream or deriving it from the depth map.

Figure 9:
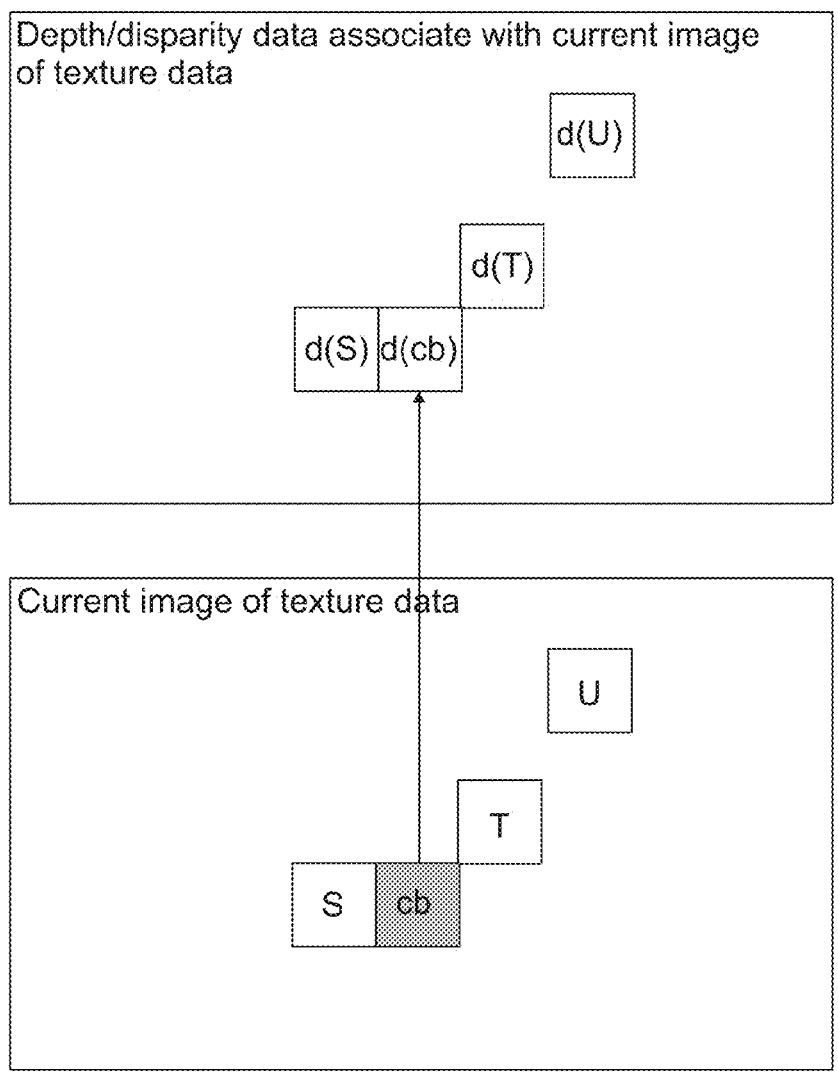
FIG. 9 illustrates the use of depth data with video data according to an embodiment.

FIG. 9 shows structure of video plus depth data and describes terminology, Cb—currently coded block of texture and d(Cb) is associated with this texture ranging information, e.g. depth map, likewise for blocks S, T, U.

Let's assume that coded MVD data consists of texture and depth map components which represents multiple videos typically captured with a parallel camera set up and these captured views being rectified.

Terms Ti and di represent texture and depth map components of view #i respectively. Texture and depth components of MVD data may be coded in different coding order, e.g. T0d0T1d1 or d0d1 T0T1. The method described in this invention, assumes that depth map component is available (decoded) prior to texture component Ti and di is utilized in the coding/decoding of Ti.

In some embodiments targeting coding MVD (multiview video plus depth), the proposed invention may include one or more following.

Harmonized Reference Picture Indication

IVP.a and VSP.a may use the same reference picture indication, such as the same reference picture index (e.g. referred to as ref_idx_IVP), with a difference in signaling of MV (explicit/implicit). That is, for the index of the reference picture list, an indication of the type of prediction to be used is provided, and this indication of the type of prediction is encoded in the encoded video data.

In an embodiment, for every indicated refIdx that is equal to ref_idx_IVP an additional flag (in block level), which may be called for example vsp_flag, is signaled after refIdx. vsp_flag may be CABAC-coded using e.g. the vsp_flag values of the adjacent neighbors on top and on the left side as its context. That is, an indication is provided as a syntax element indicating whether or not prediction from said picture of another view with disparity compensation is used. The semantics of vsp_flag may be specified for example as follow or in any similar manner.

a) If Vsp_flag==0, the current partition is coded as IVP.a and motion vector components are signaled in the bitstream.

b) If Vsp_flag==1, the current partition is coded as VSP.a and motion vector components are not signaled in the bitstream. In case b), an indication in the encoded video data is provided that motion vector information is not provided in the encoded video data for the video block, and motion vector information may be formed by employing depth information provided for the video block.

In an embodiment, the encoder and/or the decoder does not include VSP or view synthesis reference pictures in the conventional reference picture lists (e.g. reference picture list 0 and/or 1 of H.264/AVC). A combined VSP-IVP prediction mode may be specified for example as new values of the sub_mb_type[mbPartIdx] syntax element of H.264/AVC. When the combined VSP-IVP prediction mode is in use, the syntax may include one (for uni-prediction) or two (for bi-prediction) indexes to an inter-view reference picture list, which may only include inter-view reference pictures (and may exclude temporal reference pictures). Each index may be followed in vsp_flag as described above. The inter-view reference picture list may be conceptual and may be for example derived by walking through a conventional reference picture list (such as reference picture list 0 and 1) and maintaining a count or an index of inter-view reference pictures within that conventional reference picture list.

In an embodiment, new prediction types specified for example as new values of the sub_mb_type[mbPartIdx] may indicate the use of either VSP or IVP. When either VSP or IVP is indicated as the prediction mode, the syntax may include an index to an inter-view reference picture list, which may only include inter-view reference pictures (and may exclude temporal reference pictures).

An inter-view reference picture list may be derived by the encoder and/or the decoder using the indicated inter-view dependencies, such as those indicated by anchor_ref_l0, anchor_ref_l1, non_anchor_ref_l0 and non_anchor_ref_l1 syntax elements of MVC.

With this scheme, multidirectional VSP may be achieved, since bi-directional prediction is supported in IVP.

In some embodiments, the encoder and/or the decoder may use the same process or method for encoding/decoding IVP.a and VSP.a.

In some embodiments, one or more indications above the motion prediction unit layer (e.g. macroblock partition) may be used to indicate whether one or more of the above-described processes were used in the encoder and/or are to be used in the decoder. The one or more indications may for example reside in a slice header, a picture parameter set, and/or a sequence parameter set.

In some embodiments, one or more of the following may be indicated for example in a slice header, a picture parameter set, and/or a sequence parameter set:
both VSP and IVP may be used
VSP may be used but IVP is not used
IVP may be used but VSP is not used
neither VSP nor IVP is used The syntax and/or allowed syntax element or variable values of a lower layer (in a coding structure) may be modified according to the indication. For example, if it is indicated in a slice header that VSP may be used but IVP is not used, then vsp_flag may be absent (even if an inter-view/VSP reference picture is indicated) and its value may be inferred to indicate the use of VSP.

An example of syntax, semantics and decoding processes, which may be used to realize some aspects of one or more embodiments on the basis of 3D-AVC, are provided in the following paragraphs. In the presented syntax, the added parts relative to the current draft 3D-AVC standard are indicated with italics (e.g. added) and removed parts are indicated with strikethrough and italics (e.g. removed).

In 3D-AVC, an inter-view reference component may be defined as a reference picture containing samples that may be used for inter prediction of subsequent pictures in decoding order and inter-view prediction of subsequent view components in decoding order.

The slice header may be appended to include a syntax element (slice_vsp_flag in the example, as presented in the example syntax below) controlling block-level indication of the use of VSP or inter-view prediction. slice_vsp_flag or alike may be present only if the use of VSP is enabled in a higher layer. In the example, slice_vsp_flag is present if the use of VSP is allowed in the active sequence parameter set, i.e. if seq_view_synthesis_flag is equal to 1 in the active sequence parameter set. In the example, the semantics of slice_vsp_flag may be defined as follows: slice_vsp_flag equal to 0 specifies that either the decoding process for inter prediction samples or the prediction process for view synthesis prediction samples may be used when an inter-view reference picture is used as reference. slice_vsp_flag equal to 1 specifies that or the prediction process for view synthesis prediction samples is used when an inter-view reference picture is used as reference.

|  | C | Descriptor |
|---|---|---|
| slice_header( ) { | | |
| ... | | |
| if( seq_view_synthesis_flag ) | | |
| slice_vsp_flag | 2 | u(1) |
| ... | | |

The variable VspRefLXFlag[mbPartIdx] (for X being equal to 0 or 1 for reference picture list 0 or 1, respectively) may be specified to be equal to 1 if the reference index ref_idx_lX for the macroblock partition mbPartIdx points to an inter-view reference component in the reference picture list X and may be specified to be equal to 0 otherwise.

As shown in the macroblock prediction syntax structure below, the macroblock prediction syntax may be appended to include vsp_flag_lX[mbPartIdx]] (for X being equal to 0 or 1 for reference picture list 0 or 1, respectively) conditionally depending on whether the corresponding reference index points to an inter-view reference component. The semantics of vsp_flag_lX[mbPartIdx] may be defined as follows. vsp_flag_lX[mbPartIdx] (X being equal to 0 or 1) equal to 0 specifies that the decoding process for Inter prediction samples is used for the prediction from reference picture list X of macroblock partition mbPartIdx. vsp_flag_lX[mbPartIdx] equal to 1 specifies that the decoding process for view synthesis samples is used for the prediction from reference picture list X of macroblock partition mbPartIdx. When vsp_flag_lX[mbPartIdx] is not present and VspRefLXFlag[mbPartIdx] is equal to 0, vsp_flag_lX[mbPartIdx] is inferred to be equal to 0. When vsp_flag_lX[mbPartIdx] is not present and VspRefLXFlag[mbPartIdx] is equal to 1, vsp_flag_lX[mbPartIdx] is inferred to be equal to 1.

Furthermore, as shown in the syntax below, the differential motion vector mvd_lX (for X being equal to 0 or 1 for reference picture list 0 or 1, respectively) is not present when VSP is in use (i.e. is present only if the reference index ref_idx_lX points to an inter reference component or if reference index ref_idx_lX points to an inter-view reference component but VSP is not in use but rather conventional inter-view prediction is used).

| | C | Descriptor |
|---|---|---|
| mb_pred( mb_type ) { | | |
| ... | | |
|   } else if( MbPartPredMode( mb_type, 0 ) != Direct ) { | | |
|     for( mbPartIdx = 0; for mbPartIdx < NumMbPart( mb_type ); mbPartIdx++) | | |
|       if( ( num_ref_idx_l0_active_minus1 > 0 \|\| | | |
|         mb_field_decoding_flag != field_pic_flag ) && | | |
|       MbPartPredMode( mb_type, mbPartIdx ) != Pred_L1 && | | |
|       mb_alc_flag == 0 ) { | | |
|         ref_idx_l0[ mbPartIdx ] | 2 | te(v) \| ae(v) |
|         if( VspRefL0Flag[ mbPartIdx ] && !slice_vsp_flag ) | | |
|           vsp_flag_l0[ mbPartIdx ] | 2 | u(1) \| ae(v) |
|       } | | |
|     for( mbPartIdx = 0; mbPartIdx < NumMbPart( mb_type ); mbPartIdx++) | | |
|       if( ( num_ref_idx_l1_active_minus1 > 0 \|\| | | |
|         mb_field_decoding_flag != field_pic_flag ) && | | |
|       MbPartPredMode( mb_type, mbPartIdx ) != Pred_L0) { | | |
|         ref_idx_l1[ mbPartIdx ] | 2 | te(v) \| ae(v) |
|         if( VspRefL1Flag[ mbPartIdx ] && !slice_vsp_flag ) | | |
|           vsp_flag_l1[ mbPartIdx ] | 2 | u(1) \| ae(v) |
|       } | | |
|     for( mbPartIdx = 0; mbPartIdx < NumMbPart( mb_type ); mbPartIdx++) | | |
|       if( MbPartPredMode ( mb_type, mbPartIdx ) != Pred_L1 && | | |
|         ( !VspRefL0Flag[ mbPartIdx ] \|\| !vsp_flag_l0[ mbPartIdx ] ) | | |
|       ) | | |
|     ) | | |
|       for( compIdx = 0; compIdx < 2; compIdx++ ) | | |
|         mvd_l0[ mbPartIdx ][ 0 ][ compIdx ] | 2 | se(v) \| ae(v) |
|     for( mbPartIdx = 0; mbPartIdx < NumMbPart( mb_type ); mbPartIdx++) | | |
|       if( MbPartPredMode( mb_type, mbPartIdx ) != Pred_L0 && | | |
|         ( !VspRefL1Flag[ mbPartIdx ] \|\| !vsp_flag_l1[ mbPartIdx ] ) | | |
|       ) | | |
|     ) | | |
|       for( compIdx = 0; compIdx < 2; compIdx++ ) | | |
|         mvd_l1[ mbPartIdx ][ 0 ][ compIdx ] | 2 | se(v) \| ae(v) |
|   } | | |
| } | | |

It is noted that the sub-macroblock prediction syntax structure may be appended similarly to what is shown above for the macroblock prediction syntax structure.

It may be specified that when VSP in use (in the example, when VspRefLXFlag[mbPartIdx] is equal to 1 and vsp_flag_1X[mbPartIdx] is equal to 1), the motion vector is set to be {0,0}. Otherwise, a conventional motion vector prediction process may be used.

It may be specified that when VSP is in use (in the example, when the used reference index indicates an inter-view reference component and vsp_flag_1X[mbPartIdx] is equal to 1), the decoding process for view synthesis samples is used for the prediction from reference picture list X of macroblock partition mbPartIdx. Otherwise, the decoding process for Inter samples is used for the prediction from reference picture list X of macroblock partition mbPartIdx.

Selectable Reference Picture for View Synthesis Skip and Direct Modes and Alike

As described above, VSP skip and direct modes have been specified to use a certain VSP reference picture, such as the first VSP reference picture in a reference picture list. Furthermore, with the current VSP skip and direct modes it is not possible to select VSP reference picture to be used e.g. on macroblock basis.

In some embodiments, indications of skip and direct modes may in addition to indicating a choice between a conventional skip/direct mode and VSP skip/direct mode include or be followed by an indication of the VSP and/or inter-view reference picture used as a reference. The indication may be indicative for example of a reference index (e.g. to reference picture list 0 and/or 1) or an index to an inter-view reference picture list. The inter-view reference picture list may be for example derived as explained above or may be derived to include or consist of the inter-view reference pictures from reference picture list 0 and/or 1. In some embodiments, the encoder may indicate in the bitstream (and the decoder may decode from the bitstream indications of) one or more source reference picture lists (e.g. reference picture lists 0 and/or 1) used to form an inter-view reference picture list. In some embodiments, the encoder may indicate in the bitstream (and the decoder may decode from the bitstream indications of) a method or algorithm and/or its parameters. For example, the encoder may indicate that only the base view may available as reference for VSP skip/direct mode, or the encoder may indicate that an inter-view reference picture list is derived out of all inter-view reference picture available in reference picture list 0 and 1.

In an embodiment, mb_skip_type_flag or similar may be renamed to mb_skip_src_idc and be of type u(v). The semantics of mb_skip_src_idc may be specified for example as follows. If mb_skip_src_idc is equal to 0, a conventional skip mode is in use. Otherwise (mb_skip_src_idc is greater than 0), variable MbSkipRefIdx is equal to mb_skip_src_idc−1 and indicates the inter-view or VSP reference picture used as a reference for the VSP skip mode. The length of the syntax element may be chosen on the basis of the number of pictures to which the MbSkipRefIdx may point to, such as the number of pictures in the inter-view reference picture list.

In an embodiment, when CABAC is in use and the macroblocks above and on the left have been coded with VSP skip mode, the syntax may include a CABAC-coded syntax element (which may be called mb_vsskip_idc), which, when greater than 0, indicates that the coding mode of the macroblock is VSP skip. Similarly to above, MbSkipRefIdx may be set equal to mb_vsskip_idc−1 and may indicate the inter-view or VSP reference picture used as a reference for the VSP skip mode. If mb_vsskip_idc is equal to 0, it may be followed by a CABAC-coded flag (which may be called mb_skip_flag) indicating whether or not a conventional skip mode is in use. When CABAC is in use but either or both the macroblocks above and on the left have not been coded with VSP skip mode, the syntax elements may be in opposite order in the bitstream, i.e. the mb_skip_flag may appear first, followed by mb_vsskip_idc in case mb_skip_flag is equal to 0.

When the macroblock is indicated to apply a direct mode (e.g. with the mb_type syntax element), a syntax element (which may be referred to as mb_direct_type_idc) may be included in the macroblock layer syntax. The syntax element may be coded with context-adaptive VLC or CABAC, depending on which entropy coding mode is in use. When equal to 0, the flag may indicate that a conventional direct mode is in use. When greater than 0, the flag may indicate that the VSP direct mode is in use. Similarly to above, MbDirectRefIdx may be set equal to mb_direct_type_idc−1 and may indicate the inter-view or VSP reference picture used as a reference for the VSP direct mode.

In some embodiments, the slice data and/or macroblock layer syntax elements, such as mb_skip_src_idc and/or mb_direct_type_idc and/or potential similar syntax elements below the macroblock layer, may be absent if in the slice header or above (e.g. in a picture parameter set or a sequence parameter set) it is indicated that no VSP is in use e.g. for a particular picture or texture view component, a particular texture view, and/or a coded video sequence.

In some embodiments, the semantics of the slice data and/or macroblock layer syntax elements, such as mb_skip_src_idc and/or mb_direct_type_idc and/or potential similar syntax elements below the macroblock layer, may be modified to exclude the indication whether a conventional skip/direct mode or VSP skip/direct mode is in use if in the slice header or above (e.g. in a picture parameter set or a sequence parameter set) it is indicated that no conventional IVP skip/direct mode is in use e.g. for a particular slice, a particular picture or texture view component, a particular texture view, and/or a coded video sequence. In such a case, the slice data and/or macroblock layer syntax elements, such as mb_skip_src_idc and/or mb_direct_type_idc and/or potential similar syntax elements below the macroblock layer, may only indicate the inter-view or VSP reference picture used for the VSP skip/direct mode. Alternatively, the syntax may be modified to include two sets of syntax elements in the slice data and/or macroblock and/or below macroblock layer, one for the case when the selection of a conventional skip/direct mode and VSP direct/mode is indicated in that layer or below, and another one for the case when VSP direct/mode is indicated to be used whenever a skip/direct mode is indicated.

In some embodiments, the inter-view or VSP reference picture for skip and/or direct modes may be indicated by the encoder in the slice header and/or in a higher syntax layer (such as picture parameter set or sequence parameter set). The indication may be for example an index to an inter-view reference picture list, which may be derived for example using one of the methods described above. Alternatively, the indication may be for example a view order index or a view identifier (view_id) value indicating the texture view used for inter-view or VSP reference picture for skip and/or direct modes. The indications may be separate for skip and direct modes. For bi-prediction (e.g. when B slices are in use), there may be separate indications for two inter-view or VSP reference picture for skip and/or direct modes.

Mode and Motion Information Adjustment of Reconstructed/Decoded Blocks

In some embodiments, a VSP-coded block may be considered as a valid reference for motion information prediction for a block using inter-view prediction. After reconstructing (e.g. by the encoder) or decoding a block coded with VSP, its motion information may be adjusted in on or more of the following ways:

- Its prediction type may be changed to inter-view prediction.
- Its prediction type may be changed to uni-prediction or bi-prediction depending on whether one or two reference pictures were used for VSP
- Its reference index(es) may be set as if inter-view prediction were in use. For example, if a specific VSP skip/direct syntax was used to indicate the reference picture used in the VSP, the reference index(es) may be set to point to the same reference picture(s) as used in the VSP but available in reference picture list 0 and/or 1.
- The motion vector may be set to the disparity derived as part of the VSP process.
- The block partitioning may be changed to match to the view synthesis block size or granularity (instead of e.g. a coding unit or a prediction unit for which the use of VSP was indicated).

In some embodiments, the adjusted motion information may be used as a source for motion information prediction for a block using inter-view prediction. For example, the adjusted motion information may belong to or be associated with a block that is a spatial neighbor of a block using inter-view prediction. In another example, the adjusted motion information may belong to a picture that is used as collocated picture for TMVP or alike for a block using inter-view prediction.

In some embodiments, if inter-view prediction is applied for a current block being (de)coded and a candidate block (e.g. one of A0, A1, B0, B1, and B2 in FIG. 2a) for motion information prediction is considered unavailable for motion information prediction for example because intra coding has been applied for it or it has used a temporal/inter prediction reference picture, the following may be performed. An inter-view reference picture may be selected, for example the same inter-view reference picture as referred by the current block may be selected. Disparity vectors according to a view synthesis prediction process may be performed for the candidate block with reference to the selected inter-view reference picture. Zero or more other pieces of motion information for the candidate block may be adjusted or created as described above. The adjusted/created motion information for the candidate block may then be used in the motion information prediction process as if the candidate block was available for the motion information prediction.

In some embodiments, a motion field of a picture may be adjusted or derived using VSP e.g. in one or more ways described above. The motion field adjustment may performed for example when the view or layer represented by the corresponding picture may be used as inter-layer or inter-view reference, or it may be performed for example when the corresponding picture is used as a collocated picture or alike for TMVP or alike. For example, a current picture being (de)coded may represent a texture view component of a non-base view and en encoder may select a collocated picture to be a texture view component of the same non-base view (and of a different time instant than the current picture). Furthermore, the encoder may select the target picture for TMVP or alike to be the texture view component of the base view (and of the same time instant than that the current picture).

In some embodiments, the motion field adjustment is performed unconditionally, while in some embodiments the encoder may indicate in the bitstream and the decoder may decode from the bitstream conditions when the adjustment is in use, while in some embodiments the conditions when the adjustment is in use are pre-defined for example in a coding standard. For example, it may be specified or indicated by the encoder in the bitstream that the adjustment is in use whenever a block in the collocated picture used a different view as reference for prediction than that of the target picture (or alike) for TMVP. In some embodiments, it may be indicated by the encoder in and decoded by the decoder from the slice header or slice segment header or alike that motion field adjustment is performed. In addition, the type of motion field adjustment may be indication. For example, it may be indicated that adjustment similar to disparity derivation of VSP is performed or that scaling of inter-view motion vectors is performed e.g. according to relative view distances.

In some embodiments, the decoded/reconstructed motion field of a picture is maintained e.g. to be used in motion information prediction of subsequent pictures of the same view and the adjusted motion field is created separately from the decoded/reconstructed motion field. In some embodiments, the adjusted motion field may be created in place of the decoded/reconstructed motion field, and the adjusted motion field may be adjusted again in order to be used for motion information prediction of subsequent pictures of the same view.

The motion field of the collocated picture or alike may be adjusted for example as follows:

Prediction type may be set to inter-view prediction.

Prediction type may be changed to uni-prediction or bi-prediction depending on whether one or two reference pictures were used for VSP.

Reference index(es) or alike may be set as if inter-view prediction were in use.

VSP reference pictures indicated by the adjusted motion information may considered to have been marked as "used for long-term reference". Thus, motion vector scaling in TMVP or alike may be omitted, when both the picture pointed to by the collocated motion vector and the target picture are marked as "used for long-term reference".

The motion vector may be set to the disparity derived as part of the VSP process. If the target picture represents a different view than the current picture, the disparity may be scaled or the view synthesis process may be applied in a manner that the obtained disparity is applicable between the current picture and the target picture.

The block partitioning may be changed to match to the view synthesis block size or granularity (instead of e.g. a coding unit or a prediction unit for which the use of VSP was indicated).

Consequently, a prediction block correspond to the temporal motion vector candidate may be considered similar to a prediction block of VSP. The encoder may indicate the use of the temporal candidate (e.g. instead of one or more spatial candidates) for example with AMVP and/or merge mode and/or alike.

In some embodiments, the motion field of the collocated picture is adjusted only for those blocks for which the reference picture of the collocated block has a different prediction direction than the target picture in relation to the current picture. In other words, if the collocated block uses temporal prediction (within a view) and the target picture is in the same view as the current picture, the motion information of the collocated block is not adjusted. If the collocated block uses temporal prediction (within a view) and the target picture has a different view than that of the current picture, the motion information of the collocated block is adjusted and derived from the depth information for the collocated block. Additionally or alternatively, in some embodiments, the motion field of the collocated picture may be adjusted for those blocks for which the reference picture of the collocated block is different from the target picture. For example, if the reference picture of the collocated block represents view 1 and the target picture represents view 0, the motion field of the collocated picture may be adjusted and derived from the depth information for the collocated block, where the depth information may be converted and/or scaled to represent a disparity between the current picture and the target picture.

In some embodiments, when the use of the temporal candidate for a block is indicated and the indication is decoded by the decoder, the decoder may perform the operations to adjust the motion field. The motion field of only a part of the collocated picture (or alike) may be adjusted. For example, if it is indicated in the slice header or slice segment header or alike that motion field adjustment such as describe above is performed, only the motion information that overlaps with the corresponding slice may be adjusted. In another example, only the motion information for a block for which temporal candidate is chosen is adjusted.

In some embodiments, disparity between the current picture or block representing a first view and the collocated picture (or alike) representing a second view may be taken into account when determining the collocated block (or alike) within the collocated picture (or alike). For example, a horizontal offset or a disparity as indicated by the encoder in the bitstream and/or decoded by the decoder from the bitstream or as determined from the depth information of the current block may be added to the horizontal location of the current block in order to obtain the horizontal location of the collocated block. Likewise, the spatial resolutions of the current picture and the collocated picture, the sample size of the current picture and the collocated picture, and/or the relative sampling grid positions of the current picture and the collocated picture may be taken into account when determining the location of the collocated block.

In some embodiments, a motion field of a source picture (a.k.a. collocated picture) may be accessed for example through a function of a computer software executable rather than the array of motion information itself. For example, when the motion field is accessed for non-base view decoding, a disparity may be added to the coordinates of the current block when deriving the location of a collocated block for TMVP or other motion prediction using a source picture from a different view than that of the current picture. When the same motion field is accessed for motion prediction of a picture of the same view, the collocated block for TMVP or alike may have the same coordinates as those of the current block, i.e. there may be no change compared to the operation of TMVP in HEVC, for example.

In some embodiments, the motion field of the source picture or the adjusted motion field (e.g. derived as described above) may be warped or shifted based on one or more disparity values for use of motion prediction for the current picture. In some embodiments, mapping or shifting the motion information according the one or more disparity values may be a part of the process or method to derived the adjusted motion field. Zero or more subsequent motion field disparity adjustments may take place prior to using the motion field for prediction for other layers than views than those represented by the source picture and/or the pictures for which the motion field had previously been disparity-adjusted for. If the original motion field was modified, it may be adjusted back prior to using it for prediction of a picture in the same layer or view as that of the source picture. For example, if a motion information location was shifted by an offset (delta_x, delta_y) in motion field disparity adjustment, it may be adjusted back by shifting the motion information location by (−delta_x, −delta_y). If the original motion field was maintained in motion field disparity adjustment, then it may be associated with the source picture when using the source picture for motion prediction of picture(s) in the same layer or view as the source picture.

In some embodiments, an encoder may select, for example on slice basis, an inter-view picture as the collocated picture for TMVP or alike. The encoder may for example use rate-distortion optimization for this selection. The encoder may indicate the inter-view reference picture to be used as collocated picture for TMVP or alike, for example using the collocated_ref_idx syntax element of HEVC.

In addition to or instead of indicating a collocated picture for TMVP or alike using a reference index, there may be other means to indicate the collocated picture for TMVP or alike. In some embodiments, an encoder may indicate in the bitstream and the decoder may decode from the bitstream whether a collocated picture for TMVP or alike is indicated through a reference index to a reference picture list or one or more other means. In the case that the collocated picture is indicated by other means, the encoder may indicate in the bitstream and the decoder may decode from the bitstream a layer on which the collocated picture resides. The encoder may indicate in the bitstream and the decoder may decode from the bitstream an identifier of the picture, such as POC value or a long-term reference index, within a layer, or the encoder and/or the decoder may infer the picture within an indicated layer to be used as collocated picture, for example on the basis of having the same POC value as the current picture being (de)coded.

An example of the syntax which may be used to realize the inter-layer collocated picture as described in the previous paragraph in HEVC or its extensions is now described. Example syntax of the slice segment header is provided below with changed or new parts compared to a draft HEVC specification indicated by italics. When the encoder indicates a collocated picture by other means than a reference index, it sets the num_extra_slice_header_bits in the picture parameter set (PPS) to a value greater than 0 (e.g. to 1). The syntax element alt_collocated_indication_flag has been added to the slice segment header syntax. When 0, it indicates that a collocated picture is indicated through a reference index (as in a draft HEVC standard). When 1, it indicates that a collocated picture is indicated through other means and the encoder sets the slice_segment_header_extension_length syntax element to a value greater than 0. The slice segment header extension in this example includes the collocated_nuh_layer_id syntax element, which indicates the layer of the collocated picture. In this example, the collocated picture is a picture having nuh_layer_id equal to collocated_nuh_layer_id and picture order count equal to that of the current (de)coded picture. It is noted that the layer of the collocated picture could be indicated by other means too, such as an index to enumerated reference layers of the current layer. In this example, collocated_offset_x and collocated_offset_y provide respectively the horizontal and vertical offset in the units of compressed motion field (i.e. 16 luma samples). It is noted that collocated_offset_x and collocated_offset_y could be absent in some embodiments. Particularly in the case of parallel camera setup in multiview coding, collocated_offset_y may always be equal to 0 and may therefore be removed from the presented syntax too. The encoder and/or the decoder may use the offset in motion field disparity adjustment as described above. The semantics of collocated_vsp_flag may be specified as follows: when equal to 0, collocated_vsp_flag specifies that a conventional motion field derivation or upsampling is used (and motion field may be disparity-adjusted if collocated_offset_x or collocated_offset_y is non-zero); when equal to 1, collocated_vsp_flag specifies that the motion field may be adjusted through depth information e.g. in view synthesis. The function moreSliceSegmentHeaderExtensionBytes( ) may be specified to return 0, when there are no further bytes in the slice segment header extension, and 1, when there are further bytes in the slice segment header extension.

| | Descriptor |
|---|---|
| slice_segment_header( ) { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     extraSliceHeaderBitPos = 0 | |
|     if( sps_temporal_mvp_enabled && num_extra_slice_header_bits > 0 ) { | |
|       alt_collocated_indication_flag | u(1) |
|       extraSliceHeaderBitPos++ | |
|     } | |

|  | Descriptor |
|---|---|
|     for( i = extraSliceHeaderBitPos; i < num_extra_slice_header_bits; i++ ) | |
|       slice_reserved_flag[ i ] | u(1) |
|     ... | |
|     if( slice_type = = P \| \| slice_type = = B ) { | |
|       num_ref_idx_active_override_flag | u(1) |
|       if( num_ref_idx_active_override_flag ) { | |
|         num_ref_idx_l0_active_minus1 | ue(v) |
|         if( slice_type = = B ) | |
|           num_ref_idx_l1_active_minus1 | ue(v) |
|       } | |
|       if( lists_modification_present_flag && NumPocTotalCurr > 1 ) | |
|         ref_pic_lists_modification( ) | |
|       if( slice_type = = B ) | |
|         mvd_l1_zero_flag | u(1) |
|       if( cabac_init_present_flag ) | |
|         cabac_init_flag | u(1) |
|       if( slice_temporal_mvp_enabled_flag && !alt_collocated_indication_flag ) | |
| { | |
|         if( slice_type = = B ) | |
|           collocated_from_l0_flag | u(1) |
|         if( ( collocated_from_l0_flag && num_ref_idx_l0_active_minus1 > 0 ) \| | |
| \| | |
|         ( !collocated_from_l0_flag && num_ref_idx_l1_active_minus1 > 0 ) ) | |
|           collocated_ref_idx | ue(v) |
|       } | |
|       if( ( weighted_pred_flag && slice_type = = P ) \| \| | |
|         ( weighted_bipred_flag && slice_type = = B ) ) | |
|         pred_weight_table( ) | |
|       five_minus_max_num_merge_cand | ue(v) |
|     } | |
|   } | |
|   ... | |
|   if( slice_segment_header_extension_present_flag ) { | |
|     slice_segment_header_extension_length | ue(v) |
|     if( slice_segment_header_extension_length > 0) { | |
|       if( alt_collocated_indication_flag ) { | |
|         collocated_nuh_layer_id | u(6) |
|         collocated_offset_x | se(v) |
|         collocated_offset_y | se(v) |
|       } | |
|       collocated_vsp_flag | u(1) |
|       byte_alignment( ) | |
|     } | |
|     while( moreSliceSegmentHeaderExtensionBytes( ) ) | |
|       slice_segment_header_extension_data_byte | u(8) |
|   } | |
|   byte_alignment( ) | |
| } | |

Granularity of View Synthesis Process

In the encoder, the motion partition selection resulting for example from motion estimation and/or a rate-distortion optimization (RDO) process in VSP.a may be used to select the granularity of VS process. In the encoder and/or the decoder, the indicated motion partition may be used in the derivation of the disparity vector. For example, if the motion partition is 4×4, the respective disparity vector may be derived from a 4×4 block. Likewise, if a motion partition is 8×8, the disparity vector may be derived from an 8×8 block, and so on.

In some embodiments, the encoder may indicate in the bitstream e.g. with one or more syntax elements and/or syntax element values and the decoder may decode from the bitstream if the granularity of the VS process is identical to that of the motion partition. That is, an indication on the granularity of use of the depth information may be provided in the bitstream.

In some embodiments, the granularity of the VS process is limited by the motion partitioning but a finer granularity may be indicated in the bitstream by the encoder and/or decoded from the bitstream by the decoder. For example, an entropy-coded VS granularity syntax element may be included in a motion partition syntax, such as macroblock partition syntax. The VS granularity syntax element may be CABAC-coded and/or the entropy (de)coding may utilize the constraints governed by the motion partitioning. For example, if the block size for a motion partition is 8×8, the VS granularity may be indicated in some embodiments to be 8×8 or 4×4.

In some embodiments, the granularity of the VS process may be pre-defined for example in a coding standard or indicated by the encoder in the bitstream and/or decoded from the bitstream by the decoder. For example, it may be indicated in a sequence-level syntax structure, such as the sequence parameter set, that 8×8 blocks are used in the VSP process. In some embodiments, the motion partitioning that the encoder can select for a VSP-predicted partition may be limited by the pre-defined or indicated VSP granularity. In some embodiments, the entropy coding of the motion partitioning may be modified so that whenever VSP is indicated the entropy coding motion partitioning does not use a smaller partition size than the VSP granularity e.g. in a code table.

In some embodiments, the granularity of the VS process may be identical in the VSP general mode (and/or alike) and in the VSP skip/direct mode (and/or alike). In some embodiments, the granularity of the VS process may be separately indicated by the encoder and decoded by the decoder for the VSP general mode (and/or alike) and in the VSP skip/direct mode (and/or alike).

Choice of VSP or IVP

In some embodiments, the encoder may be implemented as in the following pseudo-code algorithm:
If the encoder determines and signals e.g. in slice header that the use of VSP or IVP is signaled in the block-level, perform the following:
   In loop over refIdx, if ref_idx==IVP,
   Produce IVP_cost by running ME over this ref_idx
   Produce VSP_Cost with MV=Disparity, and no MVx, MVy signaling!
   If IVP_cost>VSP_Cost
   vsp_flag=1;
   else
   vSP_flag=0;
   Store MV and ref_idx of best candidate (VSP block==IVP block for MVP purposes).
   Signal vsp_flag after refIdx for every motion partition
   if (vsp_flag=0)
   do regular signaling for IVP, including dMVx, dMVy
   if (vsp_flag=1)
   don't signal dMVx, dMVy
Otherwise (the encoder determines and may signal e.g. in slice header that VSP is not used and conventional IVP is used), do regular MVC signaling for IVP.

Higher than Block Level Signaling of VSP/IVP Mode

In some embodiments, the decoder may be implemented as in the following pseudo-code algorithm:
   Decode from the bitstream, e.g. from the slice header, whether the use of VSP or IVP is signaled in the block level. For example, let variable SliceIVPredIdc be equal to
      3 when both VSP and IVP may be used in block level
      2 when VSP may be used in block level but IVP is not used in block level
      1 when IVP may be used in block level but VSP is not used in block level
      0 when neither VSP nor IVP is used is in block level
   If either or both of VSP and IVP may be used in block level (e.g. if SliceIVPredIdc is greater than 0), decode a reference index and conclude if it refers to an inter-view reference picture
   If (an inter-view reference picture is referred and both VSP and IVP may be used in the block level), read vsp_flag or alike
   If (an inter-view reference picture is referred and either SliceIVPredIdc is equal to 2 or vsp_flag is equal to 1), derive disparity using the VSP granularity. Then, set vertical motion vector to 0, and horizontal motion vector equal to the derived disparity.
   If (an inter-view reference picture is referred and either SliceIVPredIdc is equal to 1 or vsp_flag is equal to 0), perform regular IVP process for parsing the motion vector.
   Perform MCP using the motion vector as derived above.
In one example, an indication in the encoded video data of omitting motion vector information is provided, wherein the indication of omitting motion vector information is provided in a level higher than the video block, for example in a slice header, a picture parameter set, or a sequence parameter set.

Derivation of the Depth Information

Some embodiments above refer for example to depth information provided for a video block or use similar phrasing to indicate that depth information corresponds to or is associated with a block in a texture view component. There may be various ways to obtain such depth information in the encoding and/or decoding, including but not limited to one or more of the following:

A depth view component may precede, in (de)coding order, the texture view component of the same view and the same time instance. Thus, a decoded/reconstructed depth view component is available when (de)coding the respective texture view component.

A depth view component may be synthesized, e.g. using a DIBR algorithm, from reconstructed/decoded depth view components representing other viewpoints.

Depth information for a block may be estimated or derived for example motion vectors of adjacent depth blocks to derive a motion vector for the current depth block and deriving depth information from the prediction block corresponding to that derived motion vector.

FIGS. 10*a*, 10*b*, 10*c* and 10*d* show methods for encoding video data according to embodiments. It is clear that the corresponding decoding methods operate in a manner that reflects the encoding. FIG. 10*a* corresponds at least to the labeled example E1. FIG. 10*b* corresponds at least to the labeled example E6. FIG. 10*c* corresponds at least to the labeled example E13. FIG. 10*d* corresponds at least to the labeled example E14.

Figure 11:
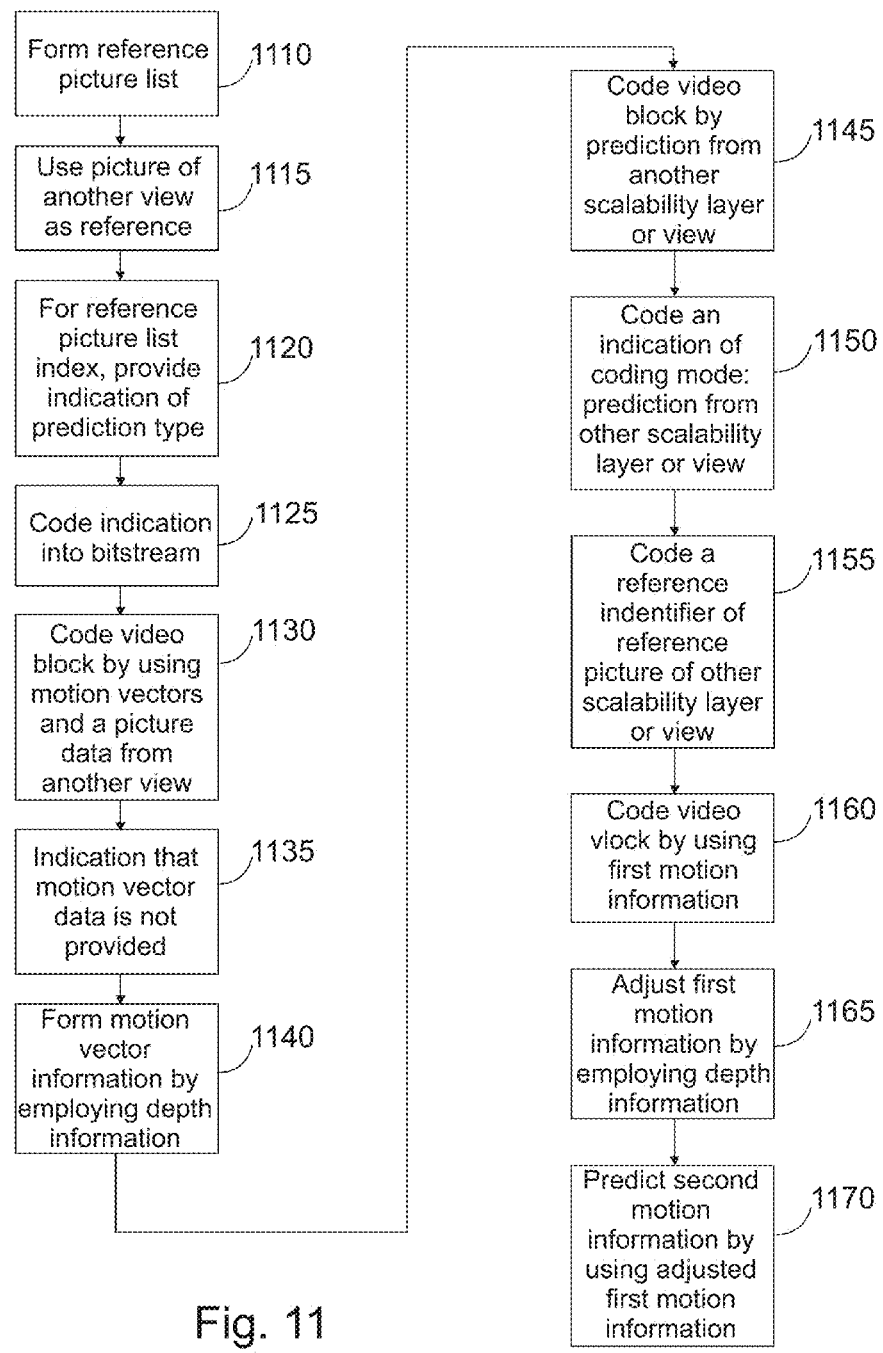
FIG. 11 shows a flow chart of video coding according to an embodiment.

FIG. 11 illustrates that various embodiments may be combined. For example, different parts of the video stream may be coded with different embodiments. Also, the same part of a coded video stream may employ several embodiments.

Figure 12A:
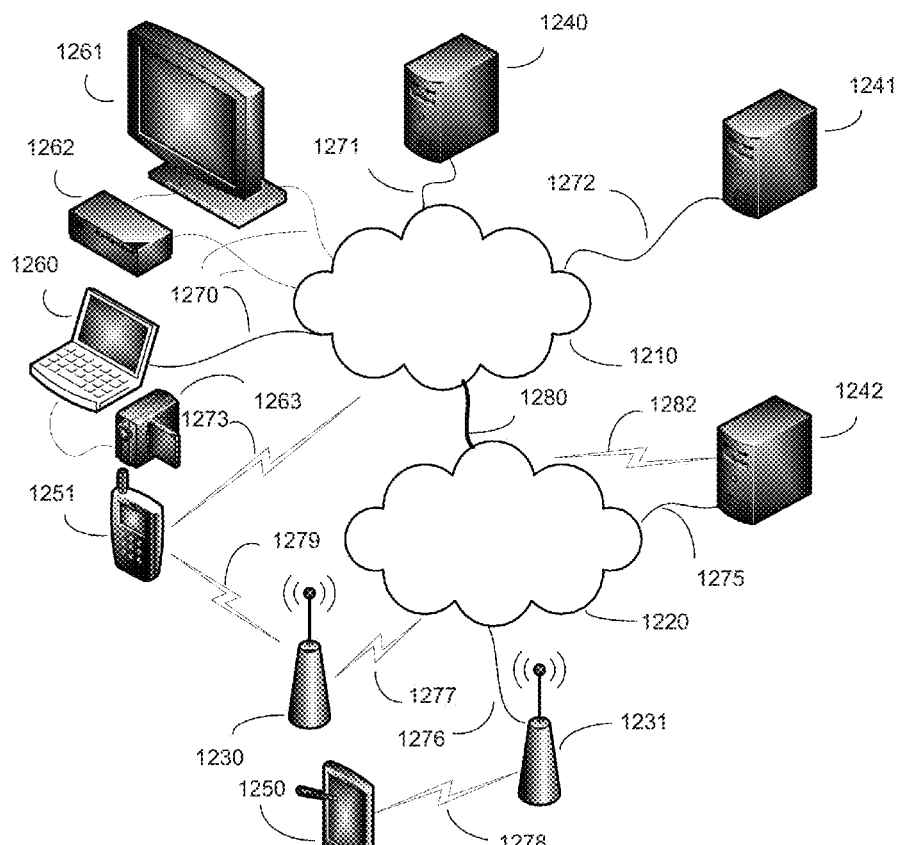
FIGS. 12a and 12b show a system and apparatuses for carrying out video coding according to example embodiments.
Figure 12B:
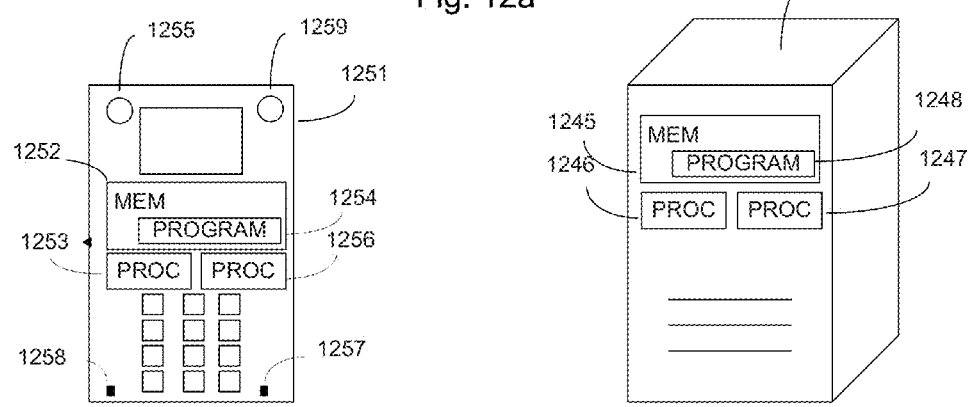

FIGS. 12*a* and 12*b* show a system and devices for video coding according to an embodiment. In FIG. 12*a*, the different devices may be connected via a fixed network 1210 such as the Internet or a local area network; or a mobile communication network 1220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks are connected to each other by means of a communication interface 1280. The networks comprise network elements such as routers and switches to handle data (not shown), and communication interfaces such as the base stations 1230 and 1231 in order for providing access for the different devices to the network, and the base stations 1230, 1231 are themselves connected to the mobile network 1220 via a fixed connection 1276 or a wireless connection 1277.

There may be a number of servers connected to the network, and in the example of FIG. 12*a* are shown a server 1240 for offering a network service for video streaming and connected to the fixed network 1210, a server 1241 for storing video data structures as presented earlier and connected to the fixed network 1210, and a server 1242 for offering a video streaming service and connected to the mobile network 1220. Some of the above devices, for example the computers 1240, 1241, 1242 may be such that they make up the Internet with the communication elements residing in the fixed network 1210. Some of the communication elements may provide video capability, e.g. by acting as gateways that are able to receive an incoming video stream, possibly transcode the video stream and provide it to the terminal in a suitable format. For example, a network element may decode a depth-enhanced video stream coded according to the above embodiments and provide a stereo video stream to the client device.

There are also a number of end-user devices such as mobile phones and smart phones 1251, Internet access devices (Internet tablets) 1250, personal computers 1260 of various sizes and formats, televisions and other viewing devices 1261, video decoders and players 1262, as well as video cameras 1263 and other encoders. These devices 1250, 1251, 1260, 1261, 1262 and 1263 can also be made of multiple parts. The various devices may be connected to the networks 1210 and 1220 via communication connections such as a fixed connection 1270, 1271, 1272 and 1280 to the internet, a wireless connection 1273 to the internet 1210, a fixed connection 1275 to the mobile network 1220, and a wireless connection 1278, 1279 and 1282 to the mobile network 1220. The connections 1271-1282 are implemented by means of communication interfaces at the respective ends of the communication connection.

Video data structures (video bitstream and/or video files) may be stored in any of the user devices, or in any of the servers, and accessed from there over a communication connection or internally in the device.

FIG. 12*b* shows devices for video coding according to an embodiment. As shown in FIG. 12*b*, the server 1240 contains memory 1245, one or more processors 1246, 1247, and computer program code 1248 residing in the memory 1245 for implementing, for example, video encoder and/or video decoder functionality or other functionality for processing video. The different servers 1241, 1242 may contain at least these same elements for employing functionality relevant to each server. Similarly, the end-user device 1251 contains memory 1252, at least one processor 1253 and 1256, and computer program code 1254 residing in the memory 1252 for implementing, for example, a video encoder or a video decoder. The end-user device may also have one or more cameras 1255 and 1259 for capturing image data, for example video. The end-user device may also contain one, two or more microphones 1257 and 1258 for capturing sound. The different end-user devices 1250, 1260 may contain at least these same elements for employing functionality relevant to each device. The end user devices may also comprise a screen for viewing a graphical user interface, and may comprise a screen for viewing 3D video as presented earlier. The end-user devices and servers may also comprise various communication modules or communication functionalities implemented in one module for communicating with other devices and for transmitting video data between devices.

The various end-user devices and servers may take the form of communication devices, or other devices having communication capability. For example, the devices may be toys, home appliances like kitchen machines, entertainment devices (TV, music/media devices), or even parts of the building, clothes, vehicles, or any other devices that may communicate with each other and whose discovery may thus be carried out.

It needs to be understood that different embodiments allow different parts to be carried out in different elements. For example, capturing and encoding video data may be carried out entirely in one user device like 250, 251 or 260, or in one server device 240, 241, or 242, or across multiple user devices 250, 251, 260 or across multiple network devices 240, 241, 242, or across both user devices 250, 251, 260 and network devices 240, 241, 242. For example, the capture of video data may happen in one or more user devices, the processing of video data to a multi-view video format may take place in another user or server device and the provision of the video data for consumption may be carried out in a third device (e.g. a server). The relevant software for carrying out the functionality may reside on one device or distributed across several devices, as mentioned above, for example so that the devices (e.g. servers) form a so-called cloud.

The different embodiments may be implemented as software running on mobile devices and optionally on servers. The mobile phones may be equipped at least with a memory, processor, display, keypad, motion detector hardware, and communication means such as 2G, 3G, WLAN, or other. The different devices may have hardware like a touch screen (single-touch or multi-touch) and means for positioning like network positioning or a global positioning system (GPS) module. There may be various applications on the devices such as a calendar application, a contacts application, a map application, a messaging application, a browser application, a gallery application, a video player application and various other applications for office and/or private use. The devices may have various communication modules for communicating with other devices and sending and receiving video data.

The different examples given above are intended to illustrate exemplary technical options for carrying out the various embodiments. In the embodiments, features from different examples may be combined. For example, features explained with reference to H.264/AVC may be combined with features explained with reference to H.265/HEVC, and again, combined with features explained without reference to any technical specifications.

The presented embodiments may offer advantages. For example, compression efficiency of harmonized IVP/VSP solution may be improved, average computational complexity of VSP may be reduced, due to its alignment with MCP of H.264/AVC or H.265/HEVC, instead of usage of partitions of fixed sizes (e.g. 2×2 or 4×4), and/or implementation complexity of VSP may be reduced, due to its alignment with MCP of H.264/AVC or H.265/HEVC, instead of usage of partitions of fixed sizes (e.g. 2×2 or 4×4).

In the above, some embodiments have been described with reference to specific terms for example regarding blocks within pictures or coding modes. It needs to be understood that embodiments could be realized with reference to other terminology having similar semantics.

In the above, some embodiments have been described with reference to specific prediction processes. It needs to be understood that embodiments could be realized with any similar prediction processes. For example, in the above, some embodiments have been described in relation to the TMVP process of HEVC. It needs to be understood, however, that embodiments could be realized with any similar motion vector prediction process.

In the above, some embodiments have been described with reference to specific syntax structures and/or syntax elements. It needs to be understood, however, that embodiments could alternatively or additionally be realized with other syntax structures and/or syntax elements.

In the above, some embodiments have been described with reference to specific entropy coding and/or decoding methods, such as CABAC. It needs to be understood, however, that that embodiments could alternatively or additionally be realized with other entropy coding and/or decoding methods.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices. For example, in some embodiments, an indication according to any embodiment above may be coded into a video parameter set or a sequence parameter set, which is conveyed externally from a coded video sequence for example using a control protocol, such as SDP. Continuing the same example, a receiver may obtain the video parameter set or the sequence parameter set, for example using the control protocol, and provide the video parameter set or the sequence parameter set for decoding.

In the above, some embodiments have been described for harmonizing inter-view prediction and view synthesis prediction applied for texture views. It needs to be understood that embodiments can be applied additionally or alternatively for other types of views and/or pictures. For example, embodiments can be applied for harmonizing the inter-view prediction and view synthesis prediction for depth views.

In the above, some of the example embodiments have been described with the help of syntax of the bitstream. It needs to be understood, however, that the corresponding structure and/or computer program may reside at the encoder for generating the bitstream and/or at the decoder for decoding the bitstream. Likewise, where the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder.

Some of the embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatuses, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys Inc., of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Below, some labeled examples of the various embodiments are given.

E1. A method of providing encoded video data, comprising:
forming a reference picture list for managing reference pictures to be used in encoding said video data,
using at least one picture of another view as a reference picture in said encoding, said picture of another view corresponding to an index of said reference picture list,
for said index of said reference picture list, providing an indication of the type of prediction to be used, and
encoding said indication of the type of prediction in the encoded video data.

E2. A method according to example E1, wherein said type of prediction indicated by said indication is inter-view prediction.

E3. A method according to example E1, wherein said type of prediction indicated by said indication is prediction based on disparity compensation such as view synthesis prediction.

E4. A method according to any of the examples E1 to E3, wherein said indication is a syntax element indicating whether or not prediction from said picture of another view with disparity compensation is used.

E5. A method according to example E4, wherein the syntax element is coded as a binary flag into said encoded video data or arithmetically coded into said encoded video data.

E6. A method of providing encoded video data, comprising:
forming encoded video data of a video block by using prediction from a picture of another view, wherein said prediction comprises using motion vectors for said prediction,
providing an indication in said encoded video data that motion vector information is not provided in said encoded video data for said video block, and
forming motion vector information by employing depth information provided for said video block.

E7. A method according to example E6, comprising:
forming encoded video data of a video block by using prediction from a picture of another view, wherein said prediction comprises using said formed motion vector information for said prediction.

E8. A method according to example E6 or E7, wherein said method comprises:
providing an indication on the granularity of use of said depth information.

E9. A method according to example E6 or E7, wherein said method comprises:
indicating a single prediction mode for the video block,
partitioning the video block into one or more block partitions,
forming motion vector information separately for each of the one or more block partitions.

E10. A method according to any of the examples E6 to E9, comprising:
providing in said encoded video data an indication of omitting motion vector information, wherein said indication of omitting motion vector information is provided in a level higher than said video block.

E11. A method according to any of the examples E6 to E10, comprising:
providing in said encoded video data an indication of omitting motion vector information, wherein said indication of omitting motion vector information is provided in at least one from the group of a slice header, a picture parameter set, and a sequence parameter set.

E12. A method according to example E6, wherein said indication is a flag indicating if motion vector information should be formed by the decoder by employing motion vector information of the neighbors of the block.

E13. A method of providing encoded video data, comprising:
forming encoded video data of a video block of a first picture of a first scalability layer or a first view by using prediction from a second picture of another scalability layer or view,
forming into said encoded video data an indication of a coding mode, said coding mode employing prediction from a picture of another scalability layer or view,
forming into said encoded video data a reference identifier of the first picture among a reference list of multiple pictures of other scalability layers or views.

E14. A method of providing encoded video data, comprising:
forming encoded video data of a first video block, wherein said first video block is associated with first motion information;
adjusting the first motion information by employing depth information provided for said first video block to obtain adjusted first motion information;
predicting second motion information, said second motion information being associated with a second video block, by using the adjusted first motion information.

E15. A method according to example E14, wherein said encoded video data of the first video block comprises at least one of the group of a reference index identifying a reference picture and a differential motion vector.

E16. A method according to example E14, wherein
the adjusted first motion information comprises at least one parameter of the group of:
a prediction type of the first video block to inter-view prediction;
a reference index to indicate an inter-view reference picture;
a motion vector equal to a disparity derived from the depth information;
a block partitioning according to granularity of said disparity derivation from said depth information; and the method comprises:
setting a value of said at least one parameter in the adjusting.

E17. A method of any of the examples E14 to E16, comprising:
forming encoded video data of said second video block associated with the second motion information, wherein said first video block resides in a first picture and said second video block resides in a second picture different from the first picture.

D1. A method of decoding encoded video data, comprising:
forming a reference picture list for managing reference pictures to be used in decoding said video data,
using at least one picture of another view as a reference picture in said decoding, said picture of another view corresponding to an index of said reference picture list,
for said index of said reference picture list, retrieving from said encoded video data an indication of the type of prediction to be used.

D2. A method according to example D1, wherein said type of prediction indicated by said indication is inter-view prediction.

D3. A method according to example D1, wherein said type of prediction indicated by said indication is prediction based on disparity compensation such as view synthesis prediction.

D4. A method according to any of the examples D1 to D3, wherein said indication is a syntax element indicating whether or not prediction from said picture of another view with disparity compensation is used.

D5. A method according to example D4, wherein the syntax element is coded as a binary flag into said encoded video data or arithmetically coded into said encoded video data.

D6. A method of decoding encoded video data, comprising:
decoding encoded video data of a video block by using prediction from a picture of another view, wherein said prediction comprises using motion vectors for said prediction,
retrieving from said encoded video data an indication that motion vector information is not provided in said encoded video data for said video block, and
forming motion vector information by employing depth information provided for said video block.

D7. A method according to example D6, comprising:
decoding encoded video data of a video block by using prediction from a picture of another view, wherein said prediction comprises using said formed motion vector information for said prediction.

D8. A method according to example D6 or D7, wherein said method comprises:
providing an indication on the granularity of use of said depth information.

D9. A method according to example D6 or D7, wherein said method comprises:
retrieving from said encoded video data an indication of a single prediction mode for the video block,
partitioning the video block into one or more block partitions,
forming motion vector information separately for each of the one or more block partitions.

D10. A method according to any of the examples D6 to D9, comprising:
retrieving from said encoded video data an indication of omitting motion vector information, wherein said indication of omitting motion vector information is in a level higher than said video block.

D11. A method according to any of the examples D6 to D10, comprising:
retrieving from said encoded video data an indication of omitting motion vector information, wherein said indication of omitting motion vector information is retrieved from at least one from the group of a slice header, a picture parameter set, and a sequence parameter set.

D12. A method according to example D6, wherein said indication is a flag indicating if motion vector information should be formed by the decoder by employing motion vector information of the neighbors of the block.

D13. A method of decoding encoded video data, comprising:
decoding encoded video data of a video block of a first picture of a first scalability layer or a first view by using prediction from a second picture of another scalability layer or view,
decoding from said encoded video data an indication of a coding mode, said coding mode employing prediction from a picture of another scalability layer or view,
decoding from said encoded video data a reference identifier of the first picture among a reference list of multiple pictures of other scalability layers or views for use in decoding.

D14. A method of decoding encoded video data, comprising:
decoding encoded video data of a first video block, wherein said first video block is associated with first motion information;
adjusting the first motion information by employing depth information provided for said first video block to obtain adjusted first motion information;
predicting second motion information, said second motion information being associated with a second video block, by using the adjusted first motion information.

D15. A method according to example D14, wherein said encoded video data of the first video block comprises at least one of the group of a reference index identifying a reference picture and a differential motion vector.

D16. A method according to example D14, wherein the adjusted first motion information comprises at least one parameter of the group of:
a prediction type of the first video block to inter-view prediction;
a reference index to indicate an inter-view reference picture;
a motion vector equal to a disparity derived from the depth information;
a block partitioning according to granularity of said disparity derivation from said depth information; and the method comprises:
setting a value of said at least one parameter in the adjusting.

D17. A method of any of the examples D14 to D16, comprising:
decoding encoded video data of said second video block associated with the second motion information, wherein said first video block resides in a first picture and said second video block resides in a second picture different from the first picture.

S1. A data structure embodied on a non-transitory computer-readable medium, said data structure comprising instruction elements for controlling decoding of encoded video data on a computer, said data structure comprising a first instruction element for choosing a type of prediction to be used in decoding a picture element, said prediction using at least one picture of another view as a reference picture in said decoding, said picture of another view corresponding to an index of a reference picture list, said reference picture list for managing reference pictures to be used in decoding said encoded video data.

S2. A data structure according to example S1, wherein said type of prediction indicated by said first instruction element is inter-view prediction.

S3. A data structure according to example S1, wherein said type of prediction indicated by said first instruction element is prediction based on disparity compensation such as view synthesis prediction.

S4. A data structure according to any of the examples S1 to S3, wherein said first instruction element is a syntax element indicating whether or not prediction from said picture of another view with disparity compensation is used.

S5. A data structure according to example S4, wherein the syntax element is coded as a binary flag into said encoded video data or arithmetically coded into said encoded video data.

S6. A data structure embodied on a non-transitory computer-readable medium, said data structure comprising instruction elements for controlling decoding of encoded video data on a computer, said data structure comprising a second instruction element indicating that motion vector information is not provided in said encoded video data for a video block being decoded and that motion vector information should be formed by employing depth information provided for said video block.

S7. A data structure according to example S6, comprising an indication on the granularity of use of said depth information.

S8. A data structure according to example S6 or S7, said data structure comprising instruction elements an indication of omitting motion vector information, wherein said indication of omitting motion vector information is provided in a level higher than said video block.

S9. A data structure according to example S8, wherein said indication of omitting motion vector information is provided in at least one from the group of a slice header, a picture parameter set, and a sequence parameter set.

S10. A data structure according to example S8, wherein said indication is a flag indicating if motion vector information should be formed by the decoder by employing motion vector information of the neighbors of the block.

S11. A data structure embodied on a non-transitory computer-readable medium, said data structure comprising an indication of a coding mode, said coding mode employing prediction from a picture of another scalability layer or view, and a reference identifier of a picture among a reference list of multiple pictures of other scalability layers or views.

ED1. An apparatus, comprising at least one processor, memory, and computer program code in said memory, said computer program code being configured to, when executed on said at least one processor, cause the apparatus to:
form a reference picture list for managing reference pictures to be used in encoding said video data,
use at least one picture of another view as a reference picture in said encoding, said picture of another view corresponding to an index of said reference picture list,
for said index of said reference picture list, provide an indication of the type of prediction to be used, and
encode said indication of the type of prediction in the encoded video data.

ED2. An apparatus according to example ED1, wherein said type of prediction indicated by said indication is inter-view prediction.

ED3. An apparatus according to example ED1, wherein said type of prediction indicated by said indication is prediction based on disparity compensation such as view synthesis prediction.

ED4. An apparatus according to any of the examples ED1 to ED3, wherein said indication is a syntax element indicating whether or not prediction from said picture of another view with disparity compensation is used.

ED5. An apparatus according to example ED4, wherein the syntax element is coded as a binary flag into said encoded video data or arithmetically coded into said encoded video data.

ED6. An apparatus, comprising at least one processor, memory, and computer program code in said memory, said computer program code being configured to, when executed on said at least one processor, cause the apparatus to:
form encoded video data of a video block by using prediction from a picture of another view, wherein said prediction comprises using motion vectors for said prediction,
provide an indication in said encoded video data that motion vector information is not provided in said encoded video data for said video block, and
form motion vector information by employing depth information provided for said video block.

ED7. An apparatus according to example ED6, comprising computer program code arranged to cause the apparatus to:
form encoded video data of a video block by using prediction from a picture of another view, wherein said prediction comprises using said formed motion vector information for said prediction.

ED8. An apparatus according to example ED6 or ED7, comprising computer program code arranged to cause the apparatus to:
provide an indication on the granularity of use of said depth information.

ED9. An apparatus according to example ED6 or ED7, comprising computer program code arranged to cause the apparatus to:
indicate a single prediction mode for the video block,
partition the video block into one or more block partitions,
form motion vector information separately for each of the one or more block partitions.

ED10. An apparatus according to any of the examples ED6 to ED9, comprising computer program code arranged to cause the apparatus to:
provide in said encoded video data an indication of omitting motion vector information, wherein said indication of omitting motion vector information is provided in a level higher than said video block.

ED11. An apparatus according to any of the examples ED6 to ED10, comprising computer program code arranged to cause the apparatus to:
provide in said encoded video data an indication of omitting motion vector information, wherein said indication of omitting motion vector information is provided in at least one from the group of a slice header, a picture parameter set, and a sequence parameter set.

ED12. An apparatus according to example ED6, wherein said indication is a flag indicating if motion vector information should be formed by the decoder by employing motion vector information of the neighbors of the block.

ED13. An apparatus, comprising at least one processor, memory, and computer program code in said memory, said computer program code being configured to, when executed on said at least one processor, cause the apparatus to:

form encoded video data of a video block of a first picture of a first scalability layer or a first view by using prediction from a second picture of another scalability layer or view,
form into said encoded video data an indication of a coding mode, said coding mode employing prediction from a picture of another scalability layer or view,
form into said encoded video data a reference identifier of the first picture among a reference list of multiple pictures of other scalability layers or views.

ED14. An apparatus, comprising at least one processor, memory, and computer program code in said memory, said computer program code being configured to, when executed on said at least one processor, cause the apparatus to:
form encoded video data of a first video block, wherein said first video block is associated with first motion information;
adjust the first motion information by employing depth information provided for said first video block to obtain adjusted first motion information;
predict second motion information, said second motion information being associated with a second video block, by using the adjusted first motion information.

ED15. An apparatus according to example ED14, wherein said encoded video data of the first video block comprises at least one of the group of a reference index identifying a reference picture and a differential motion vector.

ED16. An apparatus according to example ED14, wherein the adjusted first motion information comprises at least one parameter of the group of:
a prediction type of the first video block to inter-view prediction;
a reference index to indicate an inter-view reference picture;
a motion vector equal to a disparity derived from the depth information;
a block partitioning according to granularity of said disparity derivation from said depth information; and the apparatus comprises computer program code causing the apparatus to:
set a value of said at least one parameter in the adjusting.

ED17. An apparatus of any of the examples ED14 to ED16, comprising computer program code arranged to cause the apparatus to:
form encoded video data of said second video block associated with the second motion information, wherein said first video block resides in a first picture and said second video block resides in a second picture different from the first picture.

ED18. An apparatus comprising means for carrying out a method according to any of the claims E1 to E17.

EC1. A computer program product for encoding video data embodied on a non-transitory computer readable medium, said computer program product comprising computer program code arranged to, when said computer program code is executed on a processor, cause an apparatus to carry out a method according to any of the claims E1 to E17.

DD1. An apparatus, comprising at least one processor, memory, and computer program code in said memory, said computer program code being configured to, when executed on said at least one processor, cause the apparatus to:
form a reference picture list for managing reference pictures to be used in decoding said video data,
use at least one picture of another view as a reference picture in said decoding, said picture of another view corresponding to an index of said reference picture list,
for said index of said reference picture list, retrieve from said encoded video data an indication of the type of prediction to be used.

DD2. An apparatus according to example DD1, wherein said type of prediction indicated by said indication is inter-view prediction.

DD3. An apparatus according to example DD1, wherein said type of prediction indicated by said indication is prediction based on disparity compensation such as view synthesis prediction.

DD4. An apparatus according to any of the examples DD1 to DD3, wherein said indication is a syntax element indicating whether or not prediction from said picture of another view with disparity compensation is used.

DD5. An apparatus according to example DD4, wherein the syntax element is coded as a binary flag into said encoded video data or arithmetically coded into said encoded video data.

DD6. An apparatus, comprising at least one processor, memory, and computer program code in said memory, said computer program code being configured to, when executed on said at least one processor, cause the apparatus to:
decode encoded video data of a video block by using prediction from a picture of another view, wherein said prediction comprises using motion vectors for said prediction,
retrieve from said encoded video data an indication that motion vector information is not provided in said encoded video data for said video block, and
form motion vector information by employing depth information provided for said video block.

DD7. An apparatus according to example DD6, comprising computer program code arranged to cause the apparatus to:
decode encoded video data of a video block by using prediction from a picture of another view, wherein said prediction comprises using said formed motion vector information for said prediction.

DD8. An apparatus according to example DD6 or DD7, comprising computer program code arranged to cause the apparatus to:
provide an indication on the granularity of use of said depth information.

DD9. An apparatus according to example DD6 or DD7, comprising computer program code arranged to cause the apparatus to:
retrieve from said encoded video data an indication of a single prediction mode for the video block,
partition the video block into one or more block partitions,
form motion vector information separately for each of the one or more block partitions.

DD10. An apparatus according to any of the examples DD6 to DD9, comprising:
retrieve from said encoded video data an indication of omitting motion vector information, wherein said indication of omitting motion vector information is in a level higher than said video block.

DD11. An apparatus according to any of the examples DD6 to DD10, comprising computer program code arranged to cause the apparatus to:
retrieve from said encoded video data an indication of omitting motion vector information, wherein said indication of omitting motion vector information is retrieved from at least one from the group of a slice header, a picture parameter set, and a sequence parameter set.

DD12. An apparatus according to example DD6, wherein said indication is a flag indicating if motion vector information should be formed by the decoder by employing motion vector information of the neighbors of the block.

DD13. An apparatus, comprising at least one processor, memory, and computer program code in said memory, said computer program code being configured to, when executed on said at least one processor, cause the apparatus to:

decode encoded video data of a video block of a first picture of a first scalability layer or a first view by using prediction from a second picture of another scalability layer or view, decode from said encoded video data an indication of a coding mode, said coding mode employing prediction from a picture of another scalability layer or view, decode from said encoded video data a reference identifier of the first picture among a reference list of multiple pictures of other scalability layers or views for use in decoding.

DD14. An apparatus, comprising at least one processor, memory, and computer program code in said memory, said computer program code being configured to, when executed on said at least one processor, cause the apparatus to:

decode encoded video data of a first video block, wherein said first video block is associated with first motion information;

adjust the first motion information by employing depth information provided for said first video block to obtain adjusted first motion information;

predict second motion information, said second motion information being associated with a second video block, by using the adjusted first motion information.

DD15. An apparatus according to example DD14, wherein said encoded video data of the first video block comprises at least one of the group of a reference index identifying a reference picture and a differential motion vector.

DD16. An apparatus according to example DD14, wherein the adjusted first motion information comprises at least one parameter of the group of:

a prediction type of the first video block to inter-view prediction;

a reference index to indicate an inter-view reference picture;

a motion vector equal to a disparity derived from the depth information;

a block partitioning according to granularity of said disparity derivation from said depth information; and the apparatus computer program code arranged to cause the apparatus to:

set a value of said at least one parameter in the adjusting.

DD17. An apparatus of any of the examples DD14 to DD16, comprising computer program code arranged to cause the apparatus to:

decode encoded video data of said second video block associated with the second motion information, wherein said first video block resides in a first picture and said second video block resides in a second picture different from the first picture.

DD18. An apparatus comprising means for carrying out a method according to any of the claims D1 to D17.

DC1. A computer program product for decoding video data embodied on a non-transitory computer readable medium, said computer program product comprising computer program code arranged to, when said computer program code is executed on a processor, cause an apparatus to carry out a method according to any of the claims D1 to D17.

SS1. A system for video transmission comprising one or more apparatuses according to any of the claims ED1 to ED18 and one or more apparatuses according to any of the claims DD1 to DD18.

The invention claimed is:

1. A method of providing encoded video data, comprising:

forming, by a processor, a reference picture list for managing reference pictures to be used in encoding said video data, providing in said video data as encoded an index of said reference picture list in said encoding, wherein said index identifies available reference pictures to be used for decoding a block, using, by the processor, at least one picture of another view as a reference picture in said encoding, said picture of another view corresponding to said index of said reference picture list, conditioned by said index of said reference picture list corresponding to a picture of another view, providing an indication of a type of prediction to be used for decoding the block, wherein said type of prediction indicated by said indication is an inter-view prediction (IVP) or a prediction based on disparity compensation that comprises a view synthesis prediction (VSP), wherein the indication indicates a VSP direct coding mode or a VSP skip coding mode, and encoding, by the processor, said indication of the type of prediction in the encoded video data and, in an instance in which the type of prediction is IVP but not in an instance in which the type of prediction is VSP, also encoding motion vector components in the encoded video data.

2. A method according to claim 1, wherein said indication is a syntax element indicating whether or not prediction from said picture of another view with disparity compensation is used.

3. A method according to claim 2, wherein the syntax element is coded as a binary flag into said encoded video data or arithmetically coded into said encoded video data.

4. A method of decoding encoded video data, comprising:

forming, by a processor, a reference picture list for managing reference pictures to be used in decoding said video data, decoding from said video data as encoded an index of said reference picture list, wherein said index identifies a reference picture to be used for decoding a block, using, by a processor, at least one picture of another view as a reference picture in said decoding, said picture of another view corresponding to said index of said reference picture list, and conditioned by said index of said reference picture list corresponding to a picture of another view, retrieving from said encoded video data an indication of a type of prediction to be used for decoding the block, wherein said type of prediction indicated by said indication is an inter-view prediction (IVP) or a prediction based on disparity compensation that comprises a view synthesis prediction (VSP), wherein the indication indicates a VSP direct coding mode or a VSP skip coding mode, and wherein, in an instance in which the type of prediction is IVP but not in an instance in which the type of prediction is VSP, also retrieving motion vector components from said encoded video data.

5. A method according to claim 4, wherein said indication is a syntax element indicating whether or not prediction from said picture of another view with disparity compensation is used.

6. A method according to claim 5, wherein the syntax element is coded as a binary flag into said encoded video data or arithmetically coded into said encoded video data.

7. An apparatus, comprising at least one processor, and memory storing computer program code, said memory and the computer program code being configured to, when executed on said at least one processor, cause the apparatus to:
- form a reference picture list for managing reference pictures to be used in encoding said video data,
- provide in said video data as encoded an index of said reference picture list in said encoding, wherein said index identifies available reference pictures to be used for decoding a block,
- use at least one picture of another view as a reference picture in said encoding, said picture of another view corresponding to said index of said reference picture list,
- conditioned by said index of said reference picture list corresponding to a picture of another view, provide an indication of a type of prediction to be used for decoding the block, wherein said type of prediction indicated by said indication is an inter-view prediction (IVP) or a prediction based on disparity compensation that comprises a view synthesis prediction (VSP), wherein the indication indicates a VSP direct coding mode or a VSP skip coding mode, and
- encode said indication of the type of prediction in the encoded video data and, in an instance in which the type of prediction is IVP but not in an instance in which the type of prediction is VSP, also encode motion vector components in the encoded video data.

8. An apparatus according to claim 7, wherein said indication is a syntax element indicating whether or not prediction from said picture of another view with disparity compensation is used.

9. A computer program product for encoding video data, the computer program product comprising a non-transitory computer readable medium having computer program code stored therein with said computer program code, upon execution by a processor, causing an apparatus to:
- form a reference picture list for managing reference pictures to be used in encoding said video data,
- provide in said video data as encoded an index of said reference picture list in said encoding, wherein said index identifies available reference picture to be used for decoding a block,
- use at least one picture of another view as a reference picture in said encoding, said picture of another view corresponding to said index of said reference picture list,
- conditioned by said index of said reference picture list corresponding to a picture of another view, provide an indication of a type of prediction to be used for decoding the block, wherein said type of prediction indicated by said indication is an inter-view prediction (IVP) or a prediction based on disparity compensation that comprises a view synthesis prediction (VSP), wherein the indication indicates a VSP direct coding mode or a VSP skip coding mode, and
- encode said indication of the type of prediction in the encoded video data and, in an instance in which the type of prediction is IVP but not in an instance in which the type of prediction is VSP, also encode motion vector components in the encoded video data.

10. An apparatus, comprising at least one processor, and memory storing computer program code, the memory and said computer program code being configured to, when executed on said at least one processor, cause the apparatus to:
- form a reference picture list for managing reference pictures to be used in decoding said video data,
- decode from said video data as encoded an index of said reference picture list in said decoding, wherein said index identifies available reference pictures to be used for decoding a block,
- use at least one picture of another view as a reference picture in said decoding, said picture of another view corresponding to said index of said reference picture list, and
- conditioned by said index of said reference picture list corresponding to a picture of another view, retrieve from said encoded video data an indication of a type of prediction to be used for decoding the block, wherein said type of prediction indicated by said indication is an inter-view prediction (IVP) or a prediction based on disparity compensation that comprises a view synthesis prediction (VSP), wherein the indication indicates a VSP direct coding mode or a VSP skip coding mode, and wherein, in an instance in which the type of prediction is IVP but not in an instance in which the type of prediction is VSP, also retrieve motion vector components from said encoded video data.

11. An apparatus according to claim 10, wherein said indication is a syntax element indicating whether or not prediction from said picture of another view with disparity compensation is used.

12. A computer program product for decoding video data, the computer program product comprising a non-transitory computer readable medium having computer program code stored therein with said computer program code, upon execution by a processor, causing an apparatus to:
- form a reference picture list for managing reference pictures to be used in decoding said video data,
- decode from said video data as encoded an index of said reference picture list in said decoding, wherein said index identifies available reference pictures to be used for decoding a block,
- use at least one picture of another view as a reference picture in said decoding, said picture of another view corresponding to said index of said reference picture list,
- conditioned by said index of said reference picture list corresponding to a picture of another view, retrieve from said encoded video data an indication of a type of prediction to be used for decoding the block, wherein said type of prediction indicated by said indication is an inter-view prediction (IVP) or a prediction based on disparity compensation that comprises a view synthesis prediction (VSP), wherein the indication indicates a VSP direct coding mode or a VSP skip coding mode, and wherein, in an instance in which the type of prediction is IVP but not in an instance in which the type of prediction is VSP, also retrieve motion vector components from said encoded video data.

13. A method according to claim 3, wherein the syntax element is coded as IVP with motion vector components signaled in a bitstream in an instance that the binary flag equals to 0, and the syntax element is coded as VSP with motion vector components not being signaled in the bitstream in an instance that the binary flag equals to 1.

14. A method according to claim 6, wherein the syntax element is coded as IVP with motion vector components signaled in a bitstream in an instance that the binary flag equals to 0, and the syntax element is coded as VSP with motion vector components not being signaled in the bitstream in an instance that the binary flag equals to 1.

15. A method according to claim 8, wherein the syntax element is coded as IVP with motion vector components signaled in a bitstream in an instance that a binary flag equals to 0, and the syntax element is coded as VSP with motion vector components not being signaled in the bitstream in an instance that a binary flag equals to 1.

16. A method according to claim 11, wherein the syntax element is coded as IVP with motion vector components signaled in a bitstream in an instance that a binary flag equals to 0, and the syntax element is coded as VSP with motion vector components not being signaled in the bitstream in an instance that a binary flag equals to 1.

* * * * *